United States Patent
Kane et al.

(10) Patent No.: US 8,165,838 B2
(45) Date of Patent: Apr. 24, 2012

(54) LASER SYSTEM CALIBRATION

(75) Inventors: Robert William Kane, Draper, UT (US); John Kennedy, Layton, UT (US)

(73) Assignee: Lumenis Ltd., Yokneam (IL)

( * ) Notice: Subject to any disclaimer, the term of this patent is extended or adjusted under 35 U.S.C. 154(b) by 313 days.

(21) Appl. No.: 12/131,585

(22) Filed: Jun. 2, 2008

(65) Prior Publication Data

US 2009/0299693 A1 Dec. 3, 2009

(51) Int. Cl.
*G01D 18/00* (2006.01)
(52) U.S. Cl. ............................ 702/85; 702/40; 702/182
(58) Field of Classification Search .................... 702/40, 702/85, 109, 120
See application file for complete search history.

(56) References Cited

U.S. PATENT DOCUMENTS

| | | | | |
|---|---|---|---|---|
| 3,469,087 A * | 9/1969 | Seaton | | 356/3 |
| 3,750,670 A | 8/1973 | Palanos et al. | | 128/303.1 |
| 4,255,782 A * | 3/1981 | Joyce | | 363/8 |
| 4,530,600 A | 7/1985 | Lopez | | 356/5 |
| 5,703,713 A | 12/1997 | Leong et al. | | 359/352 |
| 8,004,665 B2 * | 8/2011 | Cooley | | 356/221 |
| 2002/0167581 A1* | 11/2002 | Cordingley et al. | | 347/173 |
| 2003/0002452 A1* | 1/2003 | Sahota | | 370/318 |
| 2004/0215175 A1 | 10/2004 | Feklistov et al. | | 606/4 |
| 2006/0072634 A1* | 4/2006 | Daiber | | 372/20 |
| 2006/0098156 A1* | 5/2006 | Frisken et al. | | 349/193 |
| 2007/0047081 A1* | 3/2007 | Hodgson et al. | | 359/499 |
| 2007/0093794 A1 | 4/2007 | Wang et al. | | 606/6 |

OTHER PUBLICATIONS

Abdi, Hervé, Least Squares, In: Lewis-Beck, M., Bryman, A., Futing, T. (Eds.) (2003). Encyclopedia of Social Sociences Research Methods. Thousand Oaks (CA): Sage, pp. 1-4.*

Abdi, Hervé, Singular Value Decomposition (SVD) and Generalized Singular Value Decomposition (GSVD), In: Neil Salkind (Ed.) (2007). Enclopedia of Measurement and Statistics. Thousand Oaks (CA): Sage, pp. 1-14.*

* cited by examiner

*Primary Examiner* — Drew A Dunn
*Assistant Examiner* — Mischita Henson
(74) *Attorney, Agent, or Firm* — Fogg & Powers LLC

(57) ABSTRACT

Disclosed is a method to determine behavior characteristics of one or more modules of a laser system. The method includes applying inputs to the one or more modules of the laser system, measuring outputs resulting from the application of the inputs, and determining an equation-based mathematical relationship relating the inputs to the resultant outputs of the one or more modules of the laser system.

33 Claims, 32 Drawing Sheets

LASER SYSTEM CALIBRATION

BACKGROUND

The present disclosure relates to calibration systems and method, and more particularly to systems and methods to calibrate a laser system.

Laser systems have to be calibrated before they can be used in regular operation. Calibration of laser system refers to the process of characterizing the various subsystems of the laser system so as to enable proper control of the laser system's operation. Thus, in the course of calibrating a particular subsystem (or module) of the laser system, the relationship between inputs and the resultant outputs needs to be determined. Generally, such relationships (e.g., between independent input variables of the laser system's modules and their dependent output variables) are expressed as lookup tables. Such lookup tables are typically simple to understand and relatively simple to implement. Such lookup tables typically entail significant storage requirements, particularly if a large number of input/output variables have to be characterized and/or if the range of possible values for such variables is large. Additionally, because lookup tables contain discrete values of the input/output variable used to characterize the subsystems of laser system, the use of lookup tables typically also entails the use of interpolation techniques when values other than those specified in the lookup tables are used.

SUMMARY

In the systems and methods described herein, characterizations of the behavior of laser systems are expressed as mathematical equations which are derived from experimental data using, for example, regression analysis techniques such as least squares techniques. The use of derived equations relating the inputs applied to one or more modules of the laser systems to the resultant outputs thus avoids the potentially large storage requirements of lookup tables because generally only the coefficients of such equations need to be stored. Additionally, the use of such equations avoids the need to apply interpolation schemes because the equations represent a continuous mathematical relationship model for the behavior of a subsystem rather than a collection of discrete values to characterize such behaviors.

In one aspect, a method to determine behavior characteristics of one or more modules of a laser system is disclosed. The method includes applying inputs to the one or more modules of the laser system, measuring outputs resulting from the application of the inputs, and determining an equation-based mathematical relationship relating the inputs to the resultant outputs of the one or more modules of the laser system.

Embodiments of the method may include one or more of the following features.

Determining the mathematical relationship may include applying a regression technique to the inputs and to the measured outputs resulting from the application of the inputs. Applying the regression technique may include applying a least-squares technique to the inputs and to the measured outputs to determine the equation-based mathematical relationship. Applying the regression technique may include applying a singular value decomposition (SVD) technique.

Applying inputs to the one or more modules of the laser system may include applying incremental voltage step levels to a laser device of the laser system, and determining the mathematical relationship may include determining threshold voltage levels required to cause the laser device to emit laser pulses and respective firing voltage levels, the firing voltage levels having values that are higher than the values of the respective threshold voltage levels. Determining the threshold voltage levels and the firing voltages required to cause the laser device to emit laser pulses may include determining the firing voltage levels required to cause the laser device to emit one or more of, for example, a single pulse, a double pulse and/or a triple pulse. Determining the threshold voltage levels and the firing voltage levels required to cause the laser device to emit laser pulses may include determining the firing voltage levels required to cause the laser device to emit laser pulses as a function of temperature of the laser system. Applying inputs to the one or more modules may include causing the laser device to be fired to increase the temperature of the laser device.

Measuring the outputs resulting from the application of the inputs may include measuring the temperature of the laser device corresponding to the voltage level required to cause the laser device to emit one or more of, for example, a single pulse, a double pulse and/or a triple pulse.

Applying inputs may include causing a laser device of the laser system to emit one or more laser shots, and determining the equation-based mathematical relationship may include determining a gain step value applied to a sensor signal generated by a sensor in response to the one or more laser shots. Determining the gain step value may be based on one of, for example, an attenuated signal of the one or more laser shots and/or an unattenuated signal of the one or more laser shots. The sensor may be a photodiode configured to generate electrical current in response to laser radiation incident on the photodiode. Determining the gain step value may include repeatedly incrementing the gain step from an initial value, and, for every incremented gain step value, recording a resultant value generated by a monitor in response to a monitor input signal generated using the sensor signal and the current gain step value.

The method may further include computing a linear gain curve based on the recorded values generated by the monitor. The method may further include selecting the gain setting for the energy monitor from the gain curve which allows sufficient resolution for accurate energy measurements and sufficient range for determining when energy outputs exceed or are below expected outputs.

Applying inputs may include causing a laser device of the laser system to emit one or more laser shots, and determining the equations-based mathematical relationship may include determining a maximum attenuation position of a half-wave plate relative to an output port of the laser device such that the radiation output from the half-wave plate is minimized.

Applying inputs may include causing a laser device of the laser system to emit one or more laser pulses, and determining the equation-based relationship may include determining the attenuation levels at multiple radial portions of a half-wave plate. Determining the attenuation levels at multiple positions of the half-wave plate may include rotating the half-wave plate to a plurality of radial positions that are each at different orientations with respect to the output port of the laser device, and at each of the plurality of radial positions causing a series of laser radiation shots to be emitted at the half-wave plate.

The method may further include at each of the plurality of positions measuring a level of laser radiation exiting the half-wave plate, and computing an associated attenuation value based on the measured level of laser radiation exiting the half-wave plate and the level of the series of laser radiation shots emitted at the output port of the laser device.

The method may further include computing from the respective associated computed attenuation values at least one of a cubic, quadratic, and $n^{th}$ order polynomial equation, each of the at least one computed equation representing the relationship between attenuation level and the radial position of the half-wave plate.

The method may further include selecting from the at least one computed equation the equation representing the relationship between the attenuation level of the half-wave plate and the radial position of the half-wave plate that best matches actual expected output.

In another aspect, a laser system is disclosed. The system includes one or more laser system modules, and a calibration module to calibrate one or more modules of the laser system. The calibration module includes a processor-based device, and a storage device that includes computer instructions that when executed on the processor-based device cause the processor-based device to record measured outputs resulting from inputs applied to the one or more modules of the laser system, and determine an equation-based mathematical relationship relating the inputs to the resultant outputs of the one or more modules of the laser system.

Embodiments of the laser system may include any of the features described in relation to the method.

In a further aspect, a computer program product to calibrate one or more modules of a laser system is disclosed. The computer program product includes computer instructions stored on a computer readable medium, that, when executed, cause a processor-based device to record measured outputs resulting from inputs applied to the one or more modules of the laser system, and determine an equation-based mathematical relationship relating the inputs to the resultant outputs of the one or more modules of the laser system. Embodiments of the computer program product may include any of the features described in relation to the method and/or the laser system.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Described herein are methods, systems and computer program products to calibrate the modules (subsystems) of a laser system to determine behavior characteristics of one or more modules of the laser system. The methods described herein include applying inputs to the one or more modules of the laser system, measuring outputs resulting from the application of the inputs, and determining an equation-based mathematical relationship relating the inputs to the resultant outputs of the one or more modules of the laser system. Some of the modules and behaviors of the laser system that may be calibrated include the laser device (i.e., the laser engine generating the laser radiation emissions) and the voltage threshold level required to cause the laser device to emit one or more pulses, the energy sensors (referred to as energy monitors) of the laser system that, for example, measure the energy level of the radiation emission, and the half-wave plate attenuator and its attenuator behavior.

Determination of the equation-based mathematical relationships may be performed, in some embodiments, using regression techniques, including, for example, least-squares computational techniques.

The Laser Systems

Figure 1:
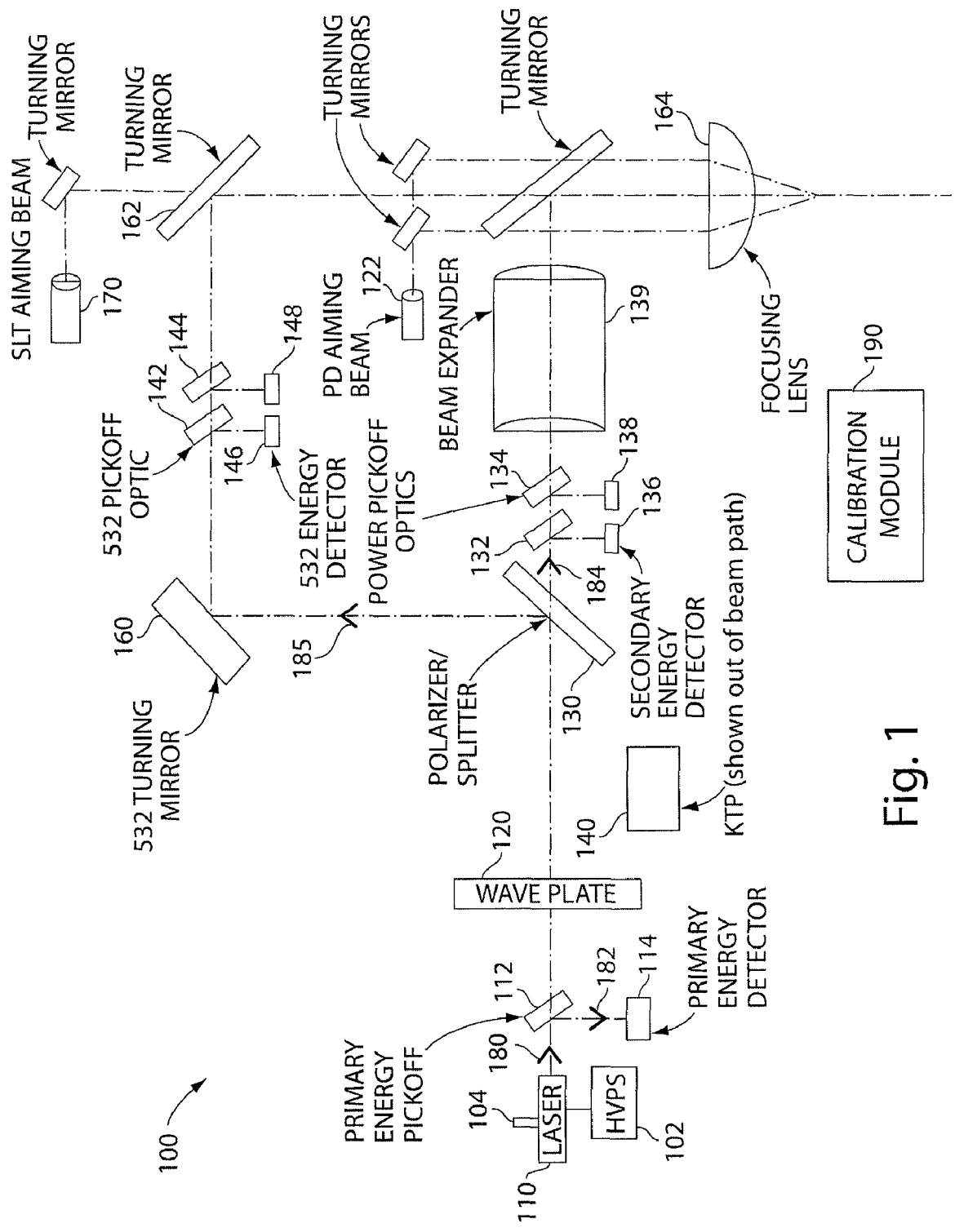
FIG. 1 is a schematic diagram of an exemplary laser system.

Referring to FIG. 1, a schematic diagram of an exemplary laser system 100 is shown. In some embodiments, the laser system 100 may be a dual-path ophthalmic laser system to enable an operator to select a mode of treatment to be administered to a patient by altering the configuration of the system by, for example, inserting a suitable optical element into the light path, e.g., a frequency multiplier 140 such as a KTP crystal. As shown, the laser system 100 includes a laser device 110 to generate and emit laser radiation. The laser device 110 may be any suitable laser, including, for example, a Q-switched Nd:YAG laser operating in the infrared spectrum at, for example, a wavelength of 1064 nm and having pulse widths of, for example, less than 5 nanoseconds. A laser operating in pulsed mode, e.g., a Q-switched Nd:YAG includes an optical switch that is inserted in the laser cavity that opens upon reaching a maximum population inversion (i.e., achieving a state in which sufficient atoms in the laser cavity are in an excited state), thus resulting in an emission one or more pulses. Other laser devices, such as, for example Nd:YLF lasers, Yb:YAG lasers, etc., may also be employed. The laser device 110 is configured to fire one or more pulsed based on the voltage level applied to it by a high voltage power supply (HVPS) 102. Generally, a particular voltage level (referred to as a threshold voltage) associated with the laser device 110 will cause a single pulse emission to occur, whereas other threshold voltage levels associated with the laser device will cause additional pulses to be emitted. The threshold value for a laser device operating in pulsed mode depends, at least partly, on the laser device's temperature.

In some embodiments, radiation 180 emitted by the laser device 110 is measured by an energy measurement device 114 configured to determine whether one or more radiation pulses have been emitted by the laser device 110 and/or measure the energy level associated with radiation pulses generated and discharged by the laser device (i.e., the radiation source). Generally, the occurrence of radiation pulses is measured closer to the source point of the radiation emission because the occurrence of pulses becomes more difficult as the radiation level degrades and becomes attenuated farther away from the source, thus increasing the likelihood that a false determination of a pulse occurrence would be made by an energy measurement device. The energy device 114 is thus disposed in relative physical proximity to the output port of the laser device and can thus measure energy levels at a point where little, if any, radiation level attenuation has occurred to the source radiation 180. Energy measurements devices that are positioned close to the source generating device are referred to as primary energy detectors (or PEM—Primary Energy Monitor). The emitted radiation 180 is generally directed at an optical beam splitter 112 that causes most of the energy to continue propagating in substantially the same direction the emission was traveling at before crossing the splitter, while diverting a small portion of the radiation (e.g., 3.5% of the energy in the radiation incident on the splitter 112) towards the energy measurement device 114, e.g., at an angle of approximately 90° relative to the direction of propagation of the radiation emission 180. Beam splitter 112 is an ordinary optic coated for 1064 nm. This optic extracts 3.5% of the treatment beam as it passes through it.

As will be described in greater detail below, the radiation incident on the energy measurement device 114 may cause a photodiode detector incorporated in the device to generate current at a level proportional to the level of the diverted radiation 182, and thus in proportion to the source radiation emission 180. The signal formed by the charge accumulated on a holding capacitor of the energy measurement device 114 (representative of the energy level of the radiation emission 180) is filtered and amplified, and directed into an analog-to-digital converter of the device 114 that converts the signal to a digital value representative of the energy level of the radiation emission 180.

The portion of the source radiation 180 not diverted to the energy measurement device 214 is directed, in some embodiments, to an attenuator, such as, for example, a half-wave plate attenuator 120. The attenuator 120 is configured to attenuate the energy level of the incident radiation to a level suitable for therapeutic applications. For example, in some embodiments, the laser device 110 may generate laser radiation having an energy level of 20 mJ. Therapeutic application, on the other hand, may require energy levels lower than that (e.g., in the range of 1-10 mJ).

The half-wave plate attenuator 120 is configured to resolve linearly polarized light (the radiation emissions produced by the radiation device 110 are, in some embodiments, linearly polarized) entering a half-wave plate into two waves, e.g., a wave parallel to the optical axis of the plate and a wave perpendicular to the optical axis of the wave plate. In the half-wave plate 120, the parallel wave propagates slightly slower than the perpendicular one such that at the far side of the plate, the parallel wave is approximately half of a wavelength delayed relative to the perpendicular wave, thus and the resulting waves are orthogonally polarized compared to its entrance state. The half-wave plate 120 thus reflects certain portions of the wavelength spectrum and transmit other portions.

The level of attenuation (and thus the level of energy of the exiting radiation) may be controlled, for example, by changing the orientation/position of the half-wave plate attenuator 120 relative to the source radiation source 110, controlling the temperature of the attenuator 120, and other mechanisms and/or procedures for controlling and/or regulating the radiation entering the half-wave plate attenuator. For example, in some embodiments, the attenuator 120 is implemented using a birefringent material which may be mechanically or electrically controlled to vary the amount of polarization rotation it produces. Such a birefringent half-wave plate may be rotateable about an axis substantially parallel to the propagation path of the laser beam and having its optic axis aligned, for example, perpendicular to the axis of rotation. The relative angular position of the half-wave plate implementation of the variable attenuator relative to the general propagation direction of the incoming input radiation emission may be controlled, for example, using a rotational mechanism. Rotational mechanisms may include a motor (e.g., an electrical motor) that rotates the half-wave waveplate. Control of the waveplate could be provided, for example, by a stepper motor utilizing a gear reduction ratio (e.g. 64:1) to provide an accurate waveplate position. The stepper motor controller provides the signals required to move the stepper motor. The stepper motor has a gear attached to the output shaft. The motor gear interfaces with a larger gear on the waveplate assembly. The ratio between the motor drive gear and waveplate gear may be, in some embodiments, 2.75:1.

In some embodiments, the laser system 100 may be operated at two wavelengths. Specifically, in one configuration, radiation for use in photodisruptive (PD) treatment procedures (e.g., to treat conditions such as secondary cataract) may be required. Treatment of PD is generally performed with radiation emissions at around 1064 nanometers and energy levels of, for example, 0.3-10 mJ in an 8-10 µm spot. Thus, in performing PD treatment procedures using a laser source emitting radiation at approximately 1064 nanometer, the energy level direct to the treatment area may need to be adjusted (e.g., by adjusting the attenuator 120).

In another configuration, radiation with a wavelength suitable for performing Selective Laser Trabeculoplasty (SLT) to treat, for example, glaucoma, may be required. Treatment of SLT is generally performed with radiation emission at around 532 nanometers (i.e., radiation frequency approximately double the radiation frequency required for PD treatments) and energy levels of, for example, 2 mJ, or less, in an 8-10 µm spot. To obtain radiation emission with the required SLT wavelength of approximately 532 nanometers a frequency multiplier device 140, for example, a KTP crystal, may be disposed between the half-wave plate attenuator 120 and a beam splitter 130. The frequency multiplier device 140 may be placed into the light path manually, or automatically, for example by a motor activated by a button depressed by the operator of the device. In some embodiments, the frequency multiplier device 140 may be disposed along other points in the optical paths depicted in FIG. 1. For example, the frequency multiplier device 140 may be disposed at a point beyond the beam splitter 130 used to direct the radiation from the half-wave plate 120 along an optical path 184 corresponding to the PD treatment procedure or along a path 185 corresponding to the SLT treatment procedure.

Beam splitter 130 (also referred to as a separator-polarizer) may transmit and/or reflect varying amounts of the incident light based on its polarization direction. In some embodiments, the reflectance at separator-polarizer 140 due to polarization direction may be mostly attributed to light, whose wavelength is in the IR region. Accordingly, by adjusting the half-wave plate attenuator 120, the intensity of light in the IR region may be affected after being reflected off or transmitted by the splitter 130. For example, the adjustment of the half-wave plate 120 may lead to a P-polarization pattern of the light in the IR region striking the beam splitter 130 such that a substantial portion of the radiation, e.g., more than 95% of the radiation energy for a wavelength of 1064 nm, may be transmitted through the beam splitter 130 and into the PD path 184. On the other hand, if the adjustment of the half-wave plate attenuator 120 leads to an S-polarization pattern of the light, which may be in the IR region, a substantial portion of the radiation, e.g., more than 98% of the radiation energy for a wavelength of 1064 nm, may be reflected by the beam splitter 140. Thus, the light may be reflected into the SLT path 185.

As further shown in FIG. 1, positioned along the optical paths at points beyond the position of the beam splitter 130 are one or more additional energy measurement devices, each of which may be implemented in a manner similar to the energy measurement system 100 and/or the energy measurement device 114. Energy measurement devices positioned to detect and measure the energy of radiation processed (e.g., attenuated) by one or more optical devices (e.g., a half-wave plate attenuator) are referred to as secondary energy monitors (or SEM). In some embodiments, secondary energy monitors are implemented so that they include the energy measurement modules amplify module and/or the processing module), but do not include the modules implementing the pulse-detection functionality. For example, a primary energy monitor (e.g., the energy measurement device 114) may be configured to perform the pulse-detection operations (the energy level of radiation incident on a primary energy monitor is generally higher than the energy level of the radiation at point farther down the optical path), and communicate, through electrical and/or wireless connections, control signals indicating detection of a pulse to other energy measurement devices deployed in the laser system 100.

Thus, the system 100 includes energy measurement devices 136 and 138 which receive portions of the radiation directed along the path 184 (e.g., radiation at wavelength of, for example, 1064 nanometers, and energy levels of up to 10 mJ, for performing PD treatment procedures) and, based on the signal samples held at their respective sample-and-hold modules, determine the energy levels corresponding to the radiation propagating along the optical path 184. The portion of radiation incident on the radiation sensor of the energy measurement device 130 (e.g., a corresponding photodiode of that energy measurement device) is, in some embodiments, 3.5% of the energy of the radiation directed by the beam splitter 130 along the path 184. The portion of radiation incident on the radiation sensor of the energy measurement device 138 is, for example, 3.5% of the remaining energy level of the radiation that was not diverted to the energy measurement device 136. The portions of radiation directed to these respective devices are diverted by energy diverters 132 and 134, which are similar to the diverter 112 used to divert the portion of the source radiation 180 to the energy measurement device 114.

The use of two or more energy measurement devices (device 136 and 138 in the embodiment depicted in FIG. 1) along the optical path 184 may enable more reliable energy measurements as the separate independent measurement devices can provide measurement corroboration. Additional devices may be deployed along the path 184 to improve the reliability of the energy measurements. As will be described below in greater detail, prior to commencing regular operation of the energy measurement devices 136 and 138, the devices are calibrated to determine the relationship between the energy level measured (and indicated) by the energy measurement devices, and the energy level of the radiation being directed to the target area to be treated. That calibration is performed to determine the relationship in situation where radiation emission for PD treatments are being used (different relationship are determined when the radiation emissions are for SLT treatments). Because the energy measurement devices 136 and 138 may be detecting different energy levels (because, for example, the energy measurement device is positioned farther down the path than the device 136), the two measurement devices have to, in some embodiments, be calibrated separately and independently.

In some embodiments, the energy monitors are configured to obtain multiple samples of the signal generated by the respective photo detectors of the monitors (the signals being representative of the energy levels of the attenuated or unattenuated radiation) to reduce the effects of noise and provide more accurate energy measurements.

The system 100 further includes energy measurement devices 146 and 148 which receive portions of the radiation directed along the path 185 (e.g., radiation at wavelength of, for example, 532 nanometers, and energy levels of up to 2 mJ, for performing SLT treatment procedures) and determine the energy levels corresponding to the radiation propagating along the optical path 189. The path 189 along which the radiation propagates, is defined, for example, by use of optical devices such as turning mirrors 160 and 162. As with the energy measurement devices 136 and 138, the radiation incident on the devices' respective radiation sensors is diverted by optical diverters, such as diverters 142 and 144.

In some embodiments, the radiation propagating along either of the paths 184 or 185 is directed to a waveguide, e.g., an optical fiber (not shown), that transmits the radiation to the target area (e.g., a patient's eye). The radiation may be coupled to such a waveguide using, for example, a focusing lens 164. In some embodiments, the radiation propagating along either of the paths 184 or 185 may be directed to a steering optic (not shown), e.g., a fold mirror, an optical fiber, etc., that transmits the radiation to the target area (e.g., a patient's eye).

Other wavelengths may be suitable for other ophthalmic applications, in which case the frequency multiplier device 140 may triple or quadruple the wavelength of the light emitted from laser module 110. In some applications, a tunable frequency multiplier device, such as an optical parametric oscillator, may be used. Other optical elements, for example, lenses, beam shapers, beam expanders (such as beam expander 139 shown in FIG. 1), attenuators and the like may be used in some embodiments.

Additional descriptions of laser systems which may include one or more of the energy measurement systems/devices described herein are provided, for example, in U.S. patent application Ser. No. 11/399,623 (PG Publication No. 2007/0093794), entitled "Device, System and Method for Dual-Path Ophthalmic Device," the content of which is hereby incorporated by reference in its entirety.

As further shown in FIG. 1, the laser system 100 includes a calibration module 190 to perform and/or control the calibration procedures performed with respect to the various laser system 100 subsystems. The calibration module 190 may include one or more programmable processing-based devices executing one or more computer programs to perform calibration procedures that include determining, based on inputs provided to the one or more subsystems of the laser system 100 and the resultant outputs, equations-based mathematical relationship to describe the behavior and characteristics of those subsystems. In some embodiments, the calibration procedures described herein may also be performed by, for example, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer used in the course of performing such calibration operations include one or more memory storage media and/or devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The calibration module 190 may include a user interface to enable input-output functionality. The user interface may include a display device, e.g., a CRT (cathode ray tube) or LCD (liquid crystal display) monitor, for displaying information to the user and a keyboard and a pointing device, e.g., a mouse or a trackball, by which the user can provide input to the computer.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The calibration module 190 may also include one or more communication devices (not shown), e.g., transceivers to communicate with the various subsystems that are to be calibrated, as well as with other sensory devices from which the calibration module may receive data. Some of the subsystem and other devices with which the calibration module 190 may communicate include, for example, the laser device 110, the HVPS 102 that powers that laser device 110, the energy monitors deployed in the laser system 100, external energy meters (not shown in FIG. 1), the half-wave plate attenuator 130. The calibration module 190 may generate control signals that are transmitted to controllable subsystems (e.g., the half-wave plate attenuator 130) so that those subsystems could be controlled (e.g., actuated) in accordance with such control signals. For example, and as will be described in greater detail below, the calibration system sends control signals to the half-wave plate attenuator 130 during performance of attenuator calibration operation to actuate the attenuator motor, which in turn causes the half-wave plate attenuator 130 to change its rotational position and thus the attenuation level applied to incoming radiation emissions. The one or more communication devices of the calibration module 190 may also receive data regarding the calibration procedures performed on the laser system's subsystems. For example, the calibration module 190 may receive energy levels data measured by the various energy sensors used in conjunction with the laser system 100. Those energy levels may subsequently be used to determine the equation-based relationships that describe the subsystems' behavior and through which control of the subsystems may be realized.

Laser System Calibrations

As described herein, modules of the laser system 100 are calibrated before the laser system 100 is used in regular operations. In some embodiments, the calibration procedures are only active during laser calibration. The calibration results and computation may be saved in non-volatile memory and checked upon system start-up.

Figure 2:
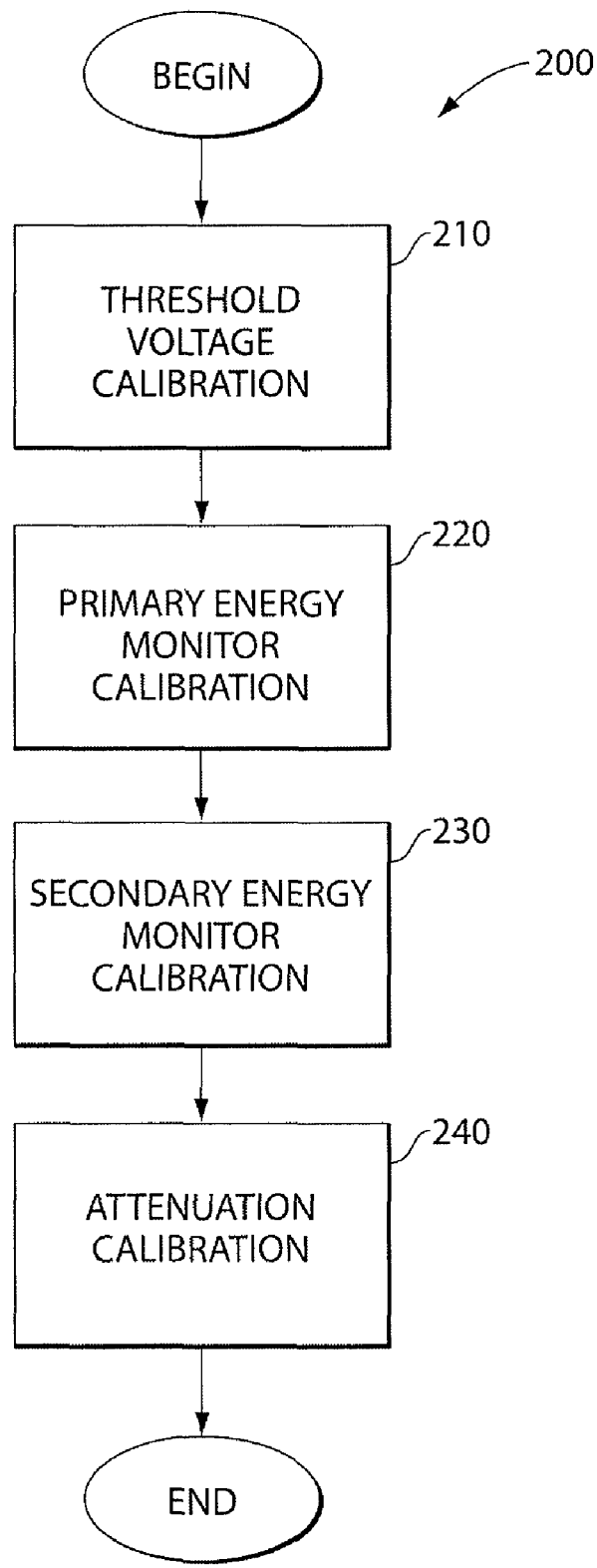
FIG. 2 is a flow diagram of an exemplary calibration management procedure.

Referring to FIG. 2, a flow diagram of an exemplary calibration management procedure 200 is shown. The procedure 200 controls the performance of the calibration procedures for the individual modules, and may be performed using the calibration module 190. Calibration of the modules may begin by performing 210 threshold voltage calibration. As will become apparent below, the threshold calibration procedure enables determination of the voltage levels that have to be applied to the laser device 10 to produce one or more radiation pulses. Primary energy monitor calibration is performed 220. Performance of this calibration enables the determination of equation(s) describing the relationship between radiation measured by the monitor's sensor and the values outputted by the primary monitor's ADC. The procedure 200 also includes performing 230 secondary energy monitor calibration to determine an equation(s) describing the relationship between radiation measured by the secondary monitors' sensors and the values outputted by the monitors' ADC's. As further shown, the procedure 200 also includes performing 240 attenuator calibration which determines an equation(s) describing the relationship between the attenuator's position/orientation (e.g., rotational position) and the level of attenuation.

Although the procedure 200 is depicted as a sequence of operations or tasks, in some embodiments, the various calibration procedures for the various laser system modules may be performed in parallel, or in some partly sequential, partly parallel order.

Threshold Voltage Calibration

As noted, calibration of the laser system 100 includes determining the threshold voltages for the laser device 10, i.e., the threshold voltages that have to be applied to the laser device 110 to cause the laser device to generate and emit one or more pulses. This determination enables an operator of the laser system 100 to set the voltage level of the laser device 10 (e.g., via an input control interface, such as a key pad, knobs and/or dials) to the appropriate voltage level for the laser device 110 at which a pulse(s) would be generated and emitted. In some embodiments, the threshold voltage at which the laser device 110 emits one, two, three or more pulses is determined. Additionally, because the threshold voltages of a laser device required to cause that laser device to generate and emit radiation pulses are dependent, at least in part, on the temperature of the laser device, in some embodiments, the calibration procedure also includes determining the threshold voltages for different temperatures, and based on such determinations, computing equation-based mathematical relationship relating the laser device's temperature to the threshold voltage that will result in one, two, three or more pulses being generated and emitted by the laser device. Thus, in performing threshold voltage calibration, the calibration procedure includes threshold voltage determination at an initial temperature (corresponding to the temperature at which the initial determination is made) and threshold voltage vs. temperature calibration determinations to relate the effect of temperature on the threshold voltages.

Figure 3:
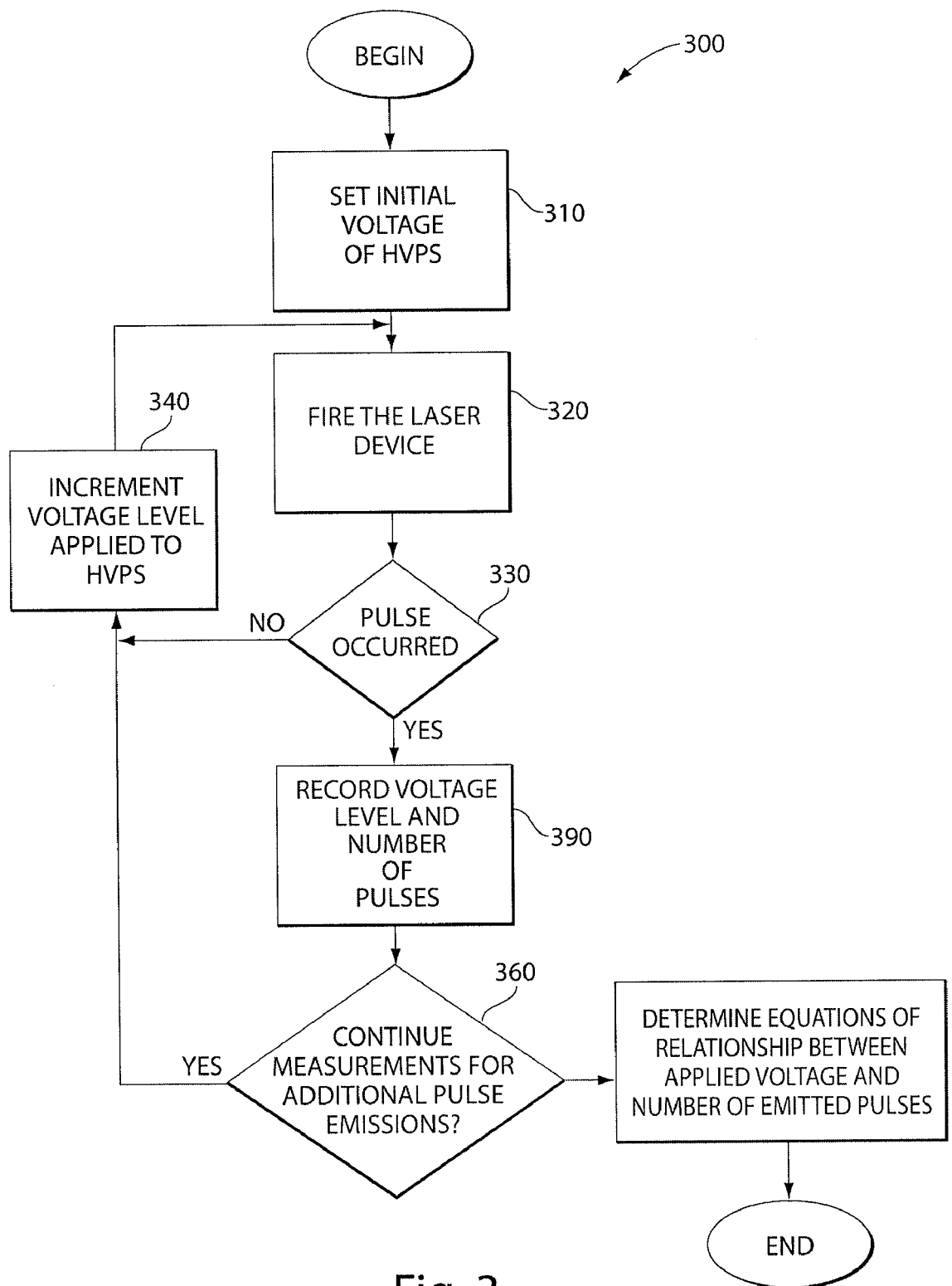
FIG. 3 is a flowchart of an exemplary procedure to perform threshold voltage calibration.

Thus, with reference to FIG. 3, a flowchart of an exemplary procedure 300 to perform threshold voltage calibration is shown. The initial voltage to be applied by the high voltage power supply (HVPS) 102 to the laser device 110 is set 310 to a voltage known to be below the single pulse emission threshold value for the laser device 10 (e.g., 470 V for a Q-switched Nd:YAG laser device). The initial test voltage that is used can be determined, for example, based on known operating parameters for the particular laser device used in the laser system 100. The HVPS 102 may be controlled through a user-interface device (not shown) to set the output voltage of the HVPS 102. At the initial set voltage, the laser device 110 is fired 320 to determine if a pulse is emitted.

Once the laser device 10 has been fired for the current applied voltage level, a determination is made 330 as to whether one or more pulses have been emitted as a result of the application of the current voltage level. This determination can be performed, for example, automatically using sensor devices configured to detect the occurrence and number of laser pulses.

If as a result of the application of the current voltage level no pulse is emitted by the laser device 10, the HVPS voltage level is increased 340 by, for example, uniform voltage increments (e.g., 5 volts). In some embodiments, non-uniform increments may be used. Additionally and/or alternatively, voltage increments that are based on a pre-determined voltage increment profile may be used to determine the voltage increase for the HVPS. The operations of applying the HVPS voltage, but using the newly increase voltage level, firing 320 the laser device 110, and determining whether and/or how many pulses are emitted by the laser device as a result thereof are repeated. The procedure of incrementing the voltage level, applying the voltage to the laser device 110 and firing the laser device is repeated until laser radiation pulse emission occur.

When the application of a particular voltage level results in the emissions of laser pulses, the HVPS voltage level and/or the number of pulses that were emitted are recorded 350, for example, in a storage device of the calibration module 190. A determination is then made 360 of whether the number of emitted pulses is less than the number of pulses with respect to which the threshold voltage of laser device 10 is to be calibrated. Particularly, in some embodiments, the laser system 100 is configured to emit a maximum (e.g., 3-5) of pulses, and it is therefore not required to ascertain the voltage levels that would result in the sequential emission of a higher number of pulses. Thus, if it is determined that the number of recorded pulses is less than the pre-defined number of pulses with respect to which calibration is to be performed (e.g., calibration for up to three pulses is to be performed and the current voltage level applied resulted in a sequential emission of two pulses), the voltage level continues to be incremented 340 and the procedure of firing 320 the laser device 110, determining whether pulses had been emitted 330 and recording 320 the voltage level and number of pulses emitted when an emission does occur is repeated.

If, the maximum pre-defined number of pulses with respect to which calibration is being performed has been reached, computation 370 is performed to determine the equations based relationship between the voltage applied to the laser device and the number of emitted pulses.

Thus, for example, when a single pulse occurs, the voltage applied by the HVPS 102 (e.g., $V_1$) to the laser device 10 (as indicated, for example, by a user input/output interface device) is recorded and stored for subsequent processing and computation of the mathematical relationship between the input variable of the laser device (e.g., the voltage applied by the HVPS to the laser device) and the laser device's output variable (e.g., the emission of the a single pulse by the laser device).

Having identified the voltage $V_1$ at which a single pulse emission by the laser device 110 occurs, the values of applied voltages that would cause additional pulses to be emitted is determined. Specifically, the HVPS voltage continues to be stepped up by, for example, 5 volt increments to cause incremental voltage steps to be applied to the laser device 110. At each incremented step, the laser is fired at until double pulse occurs. When a double pulse occurs, the voltage applied by the HVPS 102 ($V_2$) to the laser device 110 is recorded and stored. Thereafter, the HVPS voltage continues to be stepped up (e.g., by 5 volt increments) and the laser is fired at each voltage step until triple pulse occurs. The voltage value that resulted in the emission of a triple pulse is recorded.

For subsequent calibration procedures performed with respect to one, two and three pulses, the firing voltage is determined using the threshold voltages that were previously determined and recorded The firing voltages for the calibration mode are computed as follows:

$$V_{F1} = V_{T1} + (V_{T2} - V_{T1})/2 \qquad (1)$$

$$V_{F2} = V_{F2} + (V_{T3} - V_{T2})/2 \qquad (2)$$

$$V_{F3} = V_{T3} + (V_{T3} - V_{T2})/2 \qquad (3)$$

The firing voltages are computed so that the emission of a single, double and/or triple pulses can be substantially assured. That is, in the case of the firing voltage for a single pulse ($V_{F1}$), the computed value, as computed by Equation 1, is a value that falls between the single pulse threshold voltage $V_{T1}$ (the actual voltage value that resulted in the emission of a single pulse during the calibration procedure) and the voltage $V_{T2}$ (the value that resulted in a double pulse emission). Thus, the computed values provide a reasonably high confidence level that the use of those computed threshold voltage values will result in the desired number of pulses upon the firing of the laser device 110.

The computed firing voltages do not take into account the temperature of the laser device 10. For calibration purposes, the computed firing voltages may be used in subsequent calibration procedures by firing the laser at a rate that will not introduce significant temperature effects on the laser threshold voltages. In some embodiments, determination of equation-based relationships to describe the behavior between the threshold voltage input variable and the emission of one or more pulses when the laser device is used in a Q-switched mode that factor in the effect of temperature may be performed. An assumption that may be made for the purpose of incorporating the effect of the temperature on the threshold voltage is that threshold voltages exhibit a roughly linear relationship with temperature. In some embodiments, non-linear model to describe the behavior of threshold voltage and/or firing voltages (for one or more pulses) for different temperatures may be used.

Figure 4:
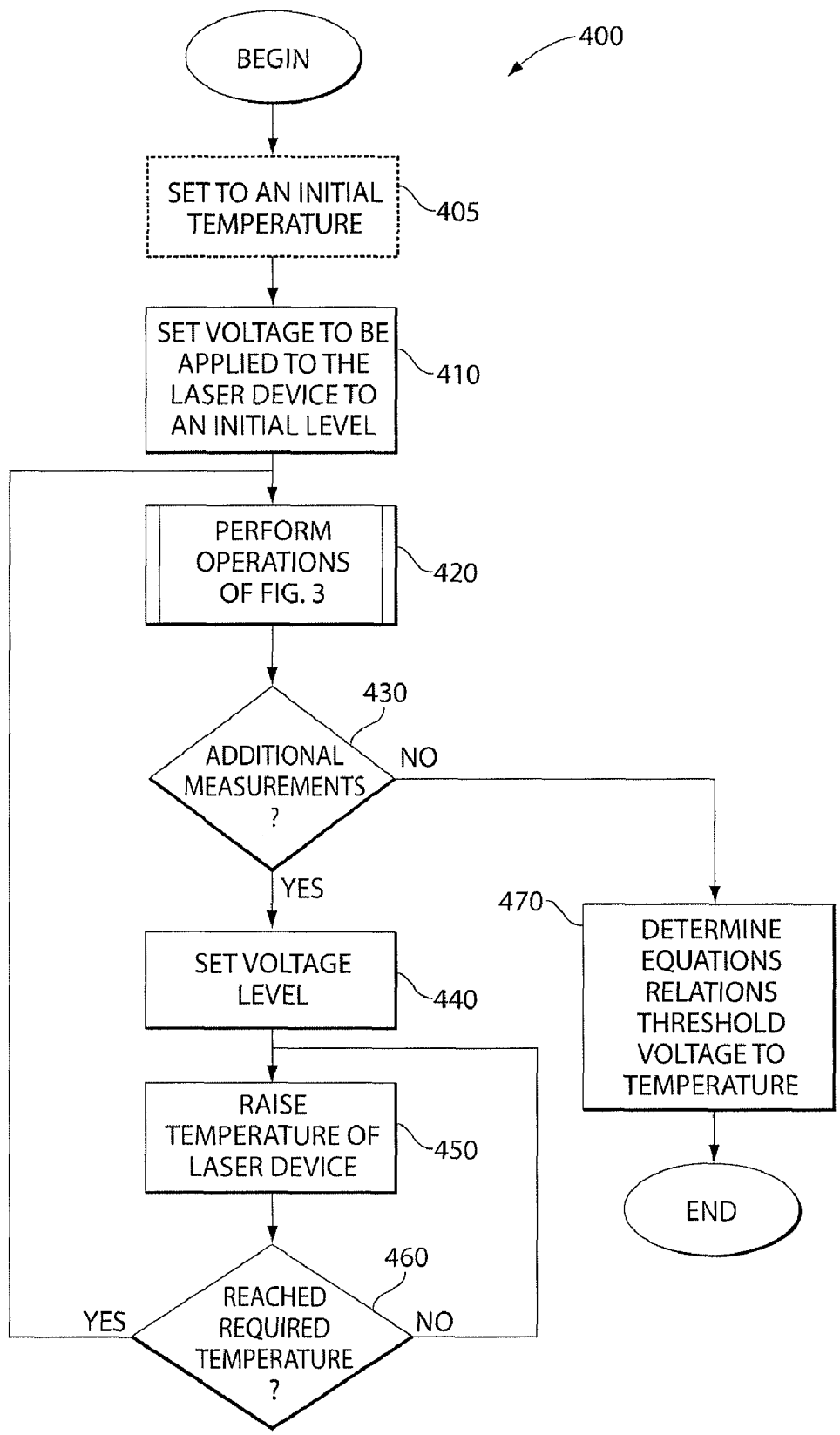
FIG. 4 is a flowchart of an exemplary threshold voltage vs. temperature calibration procedure.

The temperature of the laser device may be monitored by a temperature sensor device such as a negative temperature coefficient (NTC) thermistor 104 (shown in FIG. 1) that is in thermal communication with the laser device 10. In some embodiments, the thermistor 104 is configured in a voltage divider circuit which feeds an analog to digital converter (ADC). The voltage divider is designed so that the output voltage of the divider is approximately linear over the usable temperature range of the laser device. The readings from the ADC converter of the thermistor 104 are inversely proportional to the temperature of the laser engine. The values monitored by the thermistor 104 may be communicated to the calibration module 140 for further processing and to enable control of the calibration process. Referring to FIG. 4, a flowchart of an exemplary threshold voltage vs. temperature calibration procedure 400 is shown. Prior to commencing the temperature-based threshold calibration procedure 400, the laser device's temperature is monitored to ensure that it is in a range of, for example, 20° C. and 30° C. If the measured temperature (measured using, for example, the thermistor 104) is outside the range, the temperature of the laser device 110 can be controlled to either lower it (if the temperature is higher than the specified high value of the range) by letting the laser device cool down and/or using cooling mechanism (e.g., fans) to cool it. Conversely, if the temperature of the laser device 110 is below the permissible lower value of the temperature range, the temperature of the laser device 110 can be raised by, for example, applying heat from an external source or by firing the laser device to cause its temperature to rise. Optionally, in some embodiments the temperature is set 405 to an initial temperature at the threshold voltage calibration procedure 400 will commence. The temperature the laser device was set to is then recorded.

Having placed the laser device 110 in an appropriate initial temperature range (or even a specific initial temperature), the initial voltage to be applied by the HVPS 102 to the laser device is set 410 to an initial voltage (e.g., 470V) that is known to be below the threshold voltage, at the set temperature, to cause a single pulse to be emitted. The setting of the initial voltage may be based on known operational specifications for the laser device 110 being used. For the initial set temperature, and starting at the initial set voltage level corresponding to that temperature, operations similar to operations described in relation to the threshold voltage calibration procedure 300 (depicted in FIG. 3) are performed 420. Particularly, and as described in relation to procedure 300 above, the laser device is fired up, and a determination is made of whether and/or the number of pulses that were emitted for the particular voltage level applied to the laser device 110. The HVPS voltage is subsequently stepped up (see 340 of FIG. 3) by a particular increment (e.g., uniform 5 V step increments) and the laser is fired at each voltage step until single pulse occurs. When a single pulse occurs the HVPS value and the laser devices temperature (computed based on the measurements performed by the thermistor 104) are saved. If voltage levels required to cause multiple pulse emissions is to be determined, the HVPS voltage continues to be incremented by, for example, 5 volt increments and the laser is fired at each voltage step until double pulse occurs. When double pulse occurs the HVPS voltage value and laser engine temperature are recorded. The HVPS voltage continues to be stepped up by 5 volt increments and the laser is fired at each voltage step until triple pulse occurs. When triple pulse occurs the HVPS value and the laser engine temperature are recorded.

Turning back to FIG. 4, after the operation of procedure 300 have been performed, a determination is made 430 as to whether additional measurements are required. In some embodiments, a pre-defined number of required measurement sets is used to control the performance of the procedure 400. If additional measurements sets are required, the HVPS voltage is set 440 to a voltage level that is known to be below the threshold voltage level that would result in a single pulse emission at the current temperature of the laser device (the laser device 110 would have been heated to a temperature higher than the laser-device's initial temperature due to the continued laser firing). The laser device 110 is then fired 450 to raise the temperature of the laser device by a pre-determined amount from the current temperature of the laser device 110. In some embodiments, a determination is made that the temperature of the laser device 110 is sufficiently low enough before firing the device to raise its temperature to ensure that the laser device is not damaged due to high temperature conditions. In some embodiments, the temperature of the laser device is raised by about 7° C. before the next set of threshold voltage measurements is to be performed.

After every firing of the laser device, the temperature of the laser device 110 is measured and a determination made 460 is the temperature of the laser device required for the performance of the next set of measurements has been reached. If the required temperature for performing the next set of threshold voltage measurements has not been reached, the laser is fired again 450. If the required temperature has been reached, the threshold voltage calibration procedure 300 is performed 420 to determine the threshold voltages for single pulse, double pulse, and triple pulse, with respect to the new temperature value(s).

The above sequence of operation is repeated, in some embodiments, for additional temperature points, with each temperature point being approximately 7° C. higher than the previous temperature point. Thus, in such embodiments, a total of five (5) measurement sets are performed, with each measurement set determining threshold voltage values resulting in the emission of a single, double and triple pulses, at different temperatures. Once the threshold voltage and temperature data has been acquired, a determination is made 470 of equation-based mathematical relationships relating the threshold voltages to cause one or more pulse emissions at different temperatures. In some embodiments, this determination is performed by computing a linear curve fit that best matches the acquired data using regression analysis techniques to perform the computation. Particularly, separate linear curves that relate the threshold voltage required to cause the emission of a single, double and triple pulses, at different temperatures are determined by computing the linear curves that best fit the collection of point gathered in the course of performing the procedure 400.

As described herein, in some embodiments, performance of regression analysis on the acquired data to determine an equation-based relationship to describe the behavior of the laser system's modules is performed using, for example, least squares techniques. Often, the data on which least squares technique, for example, is applied is taken from noisy measurements. Least squares is formulated such that it minimizes the sum of the squares of the residuals between the measured data points and curve modeling the measured data points. Thus, least squares by its very formulation tends to minimize the effects of noisy data. Least squares generally provides a "best fit" model in a statistical sense of the measured data (although a resultant "best fit" curve may not necessary correspond to an optimum estimate in a statistical maximum likelihood sense). In some embodiments, a mathematical technique known as the singular value decomposition (SVD) may be used to solve the least squares problem. SVD is a computationally robust technique to determine a matrix pseudo inverse even when the underlying matrix is singular or ill conditioned. A singular or ill conditioned matrix often results in practice with experimental data derived from noisy measurements. Hence, the SVD is suitable for these types of applications. Experimental measurements occasionally produce data points that differ significantly from the average (e.g., more than 3 sigmas from the statistical mean). Such data points are known as outliers. To minimize the effects of these outliers, in some embodiments, multiple measurements are taken and the median values of these measurements are used in the subsequent least squares computations using the SVD.

Implementation of the procedures to perform regression analysis (e.g., least squares) may be based on use of commercially or publicly available software libraries that include implementations of matrix algebra, SVD, etc. For example, public software libraries that include implementations for regression analysis tools are available from the *Mathematical and Computational Sciences Division of the National Institute of Standards and Technology* (NIST). One software library that may be used includes the Template Numerical Toolkit (TNT) which includes C++ template-based implementations of various vectors and matrices. Another software library that may be used includes a C++ translation of the Java Matrix Library by the Mathworks (producers of MatLab) and NIST called JAMA/C++ which provides C++ template based implementations of various linear algebra routines including the SVD. The software libraries may be accessed and downloaded to the calibration module 190 that performs the calibration procedures for the modules of the laser system 100.

Figure 5A:
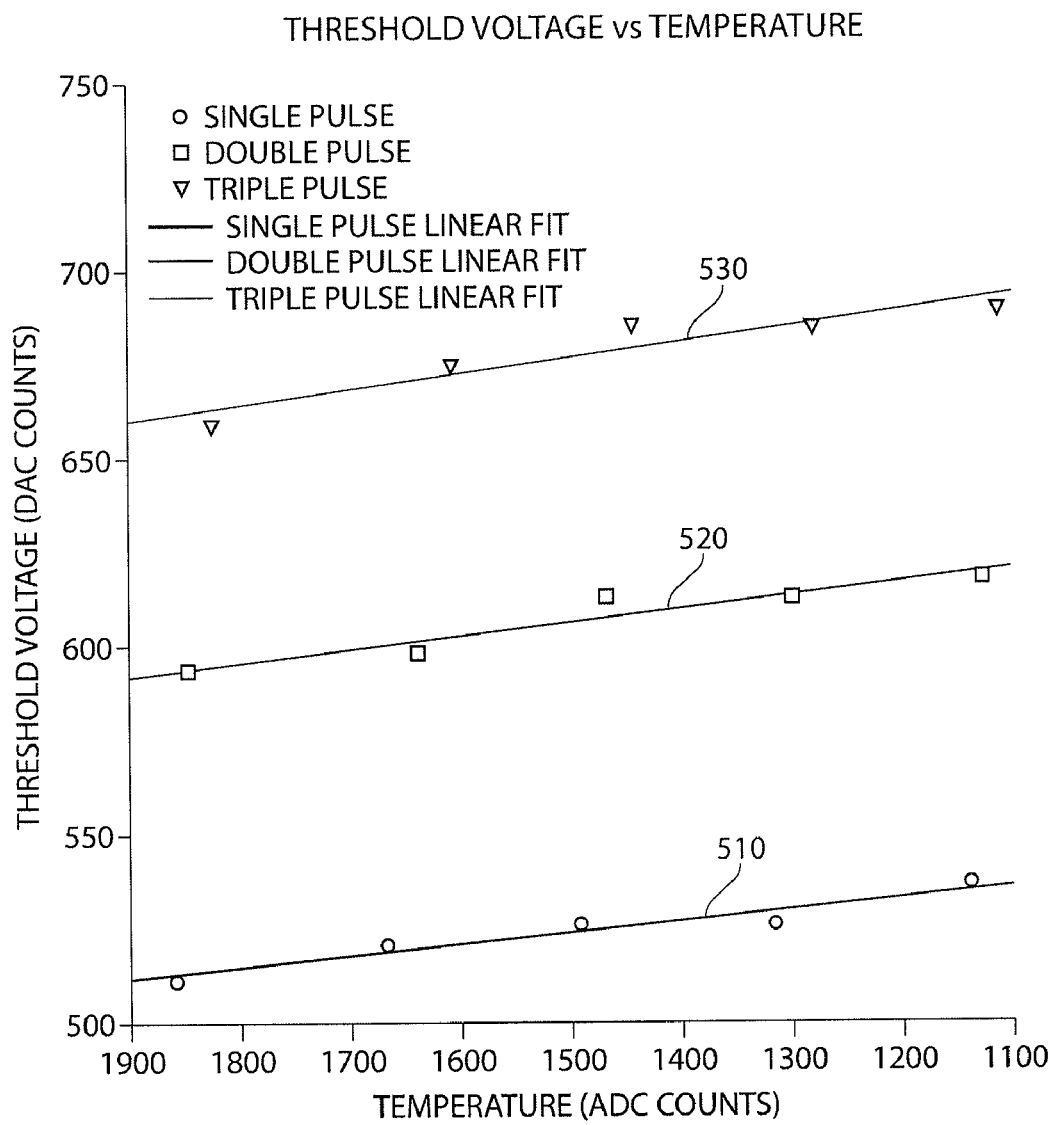
FIG. 5A are exemplary graphs of linear curves corresponding to the threshold voltages, as functions of temperature, that cause a single, double and triple pulses, respectively, to be emitted.

Referring to FIG. 5A, exemplary graphs showing linear curves corresponding to the threshold voltages, as functions of temperature, at which a single, double and triple pulses, respectively, are emitted are shown. For example, curve 510 depicts the relationship between the threshold voltage required to cause a single pulse laser emission and the temperature. As can be seen, the higher the temperature (the temperature is indicated, in FIG. 5, as the output of the analog-to-digital converter coupled to the thermistor 104, which is representative of the temperature of the laser device 110) the higher the threshold voltage that would be required to cause a single pulse emission. Similarly, curves 520 and 530 show that the threshold voltages required to cause a double and triple pulse emissions, respectively, are represented as linear functions of the temperature of the laser device. As noted, typically, the firing voltage that is to be applied to the laser device to cause a particular number of emissions is selected to be a value exceeding the threshold voltage that was determined to cause this number of emissions and the next determined threshold voltage (i.e., the threshold voltage that would result in the emission of an additional pulse over the number of pulses emitted as a result of the application of the first threshold voltage). That is, firing voltages are located in the "flat part" of the steps that graphically characterize the threshold behavior of the laser device. It is to be noted that it is possible (on some laser devices) that the illustrated curves may overlap. For example, the threshold voltage for single pulse at a high temperature point may be greater than the threshold voltage for double pulse at a lower temperature point. Accordingly, it is for this reason a fixed threshold voltage cannot be picked that will work across the entire temperature range.

The curves illustrated in FIG. 5A can be computed, e.g., using least square techniques, and be represented in the following form:

$$V_{T1}=a_1 \cdot t+b_1 \quad (4)$$

$$V_{T2}=a_2 \cdot t+b_2 \quad (5)$$

$$V_{T3}=a_3 \cdot t+b_3 \quad (6)$$

where $V_{T1}$, $V_{T2}$ and $V_{T3}$ are the single, double and triple pulse threshold voltage, respectively, and t is the temperature at which the laser device is operating at. The coefficients $a_1$, $a_2$, $a_3$, $b_1$, $b_2$, and $b_3$ are the coefficients for the linear threshold voltage curves computed, for example, using least squares techniques.

As explained herein in relation to FIG. 3 and procedure 300, to reasonably assure that selected voltages would result in the required number of pulses in the resultant emission, the actual voltage applied should correspond to a value above the threshold voltage that would cause the required emission sequence (e.g., a single emission), but safely below the threshold voltage that would cause a double emission (so as to avoid situations in which a single pulse emission is require, but the selected voltage accidentally causes a double laser pulse to be emitted). Thus, in some embodiments, the actual firing voltages $V_{F1}$, $V_{F2}$, $V_{F3}$ for a particular temperature t, that should be used when a single, double or triple pulse emissions are required can be computed as follows:

$$V_{F1}=V_{T1}+(V_{T2}-V_{T1})/2 \quad (7)$$

$$V_{F2}=V_{T2}+(V_{T3}-V_{T2})/2 \quad (8)$$

$$V_{F3}=V_{T3}+(V_{T3}-V_{T2})/2 \quad (9)$$

Figure 5B:
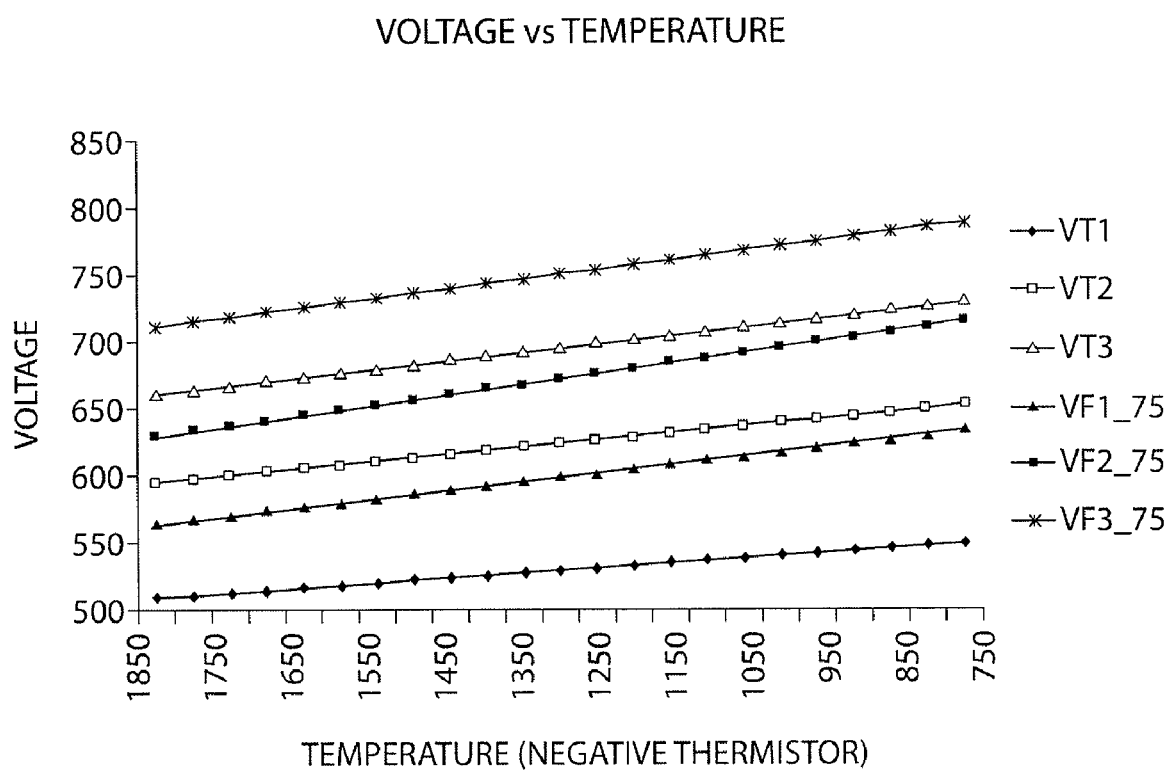
FIG. 5B are exemplary curves representing the voltage (threshold and firing) vs. temperature behavior of the laser device.

In this case, the values $V_{T1}$, $V_{T2}$ and $V_{T3}$ have been previously computed using, for example, the above threshold voltage equations (4)-(6) at the particular temperature of operation t. In some embodiments, the firing voltages are computed so that 75% of the voltage difference between threshold voltage levels of successive pulses are used. Thus, under those circumstances, the last term in each of the above equation (Equations (7)-(9)) would be multiplied by a factor of ¾. For example, Equation 7 would be computed using the term $(V_{T2}-V_{T1})*¾$. Referring to FIG. 5B, exemplary curves representing the voltage (threshold and firing) vs. temperature behavior of the laser device are shown. In the figure $V_{T1}$ is the threshold voltage for a single pulse, $V_{T2}$ is the threshold voltage for double pulse emissions and $V_{T3}$ is the threshold voltage for triple pulse emissions. As shown, $V_{F1}$ is the firing voltage for a single pulse and is set to approximately 75% of the values between single and double threshold voltage vs. temperature curves. $V_{F2}$ is the firing voltage for double pulse, and is set to 75% of the values between the double and triple threshold voltage vs. temperature curves. $V_{F3}$ is the firing voltage for triple pulse emissions, and is set so that an offset of 75% of the values between double and triple pulse threshold voltage vs. temperature curve values are added to the threshold voltage levels for triple pulse.

It is to be noted that, in some embodiments, the HVPS 102 may further include a "snubbing circuit" to safely discharge any excess voltage if the requested number of pulses has already been detected. Particularly, such a snubbing circuit causes excess voltage to be discharged if, for example, the number of detected emitted pulses matches the number of required emissions. Such a snubbing circuit results in a safer system that prevents delivering pulses in excess of what was requested by a user and enables selection of firing voltage levels from the high-end of acceptable computed ranges for the firing voltages, thus reducing the risk of getting fewer pulses than requested. A snubbing circuit is particularly useful in circumstances in which the performance of the laser device degrades over time, which in turn results in higher threshold voltages.

Energy Monitor Calibration

Energy monitors, such as the energy monitors 114 and 136 shown in FIG. 1, are included in the laser system 100 to provide output to an operation which is representative of the energy levels of the emitted radiation (e.g., laser radiation) at the various points in the laser system in which the energy monitors are deployed. These monitors enable accurate measurements of the energy levels of the radiation and thus enable performing necessary adjustments to the various control parameters associated with the laser system 100 (e.g., controlling the HVPS voltage levels, controlling the attenuation level, as will be described more particularly below, etc.). Primary energy monitors may be placed so that they can detect, for example, the source energy level produced by the energy device 110 (i.e., prior to any processing or attenuation of the radiation). Secondary energy monitors can be placed at a position relative to the laser system 100 that would enable it to detect processed or attenuated radiation that correspond to the radiation delivered to the targets (e.g., the eye). Such energy monitors are referred to as secondary energy monitors. Such monitors can be placed, for example, at a position proximate the half-wave plate attenuator 120 to enable those monitors to detect the radiation level resulting from the radiation's interaction with the half-wave plate.

Figure 6:
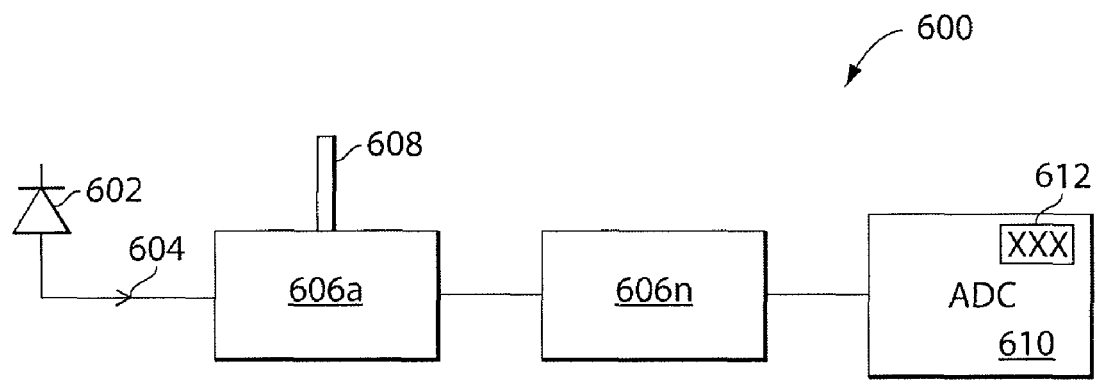
FIG. 6 is a block diagram of an exemplary energy monitor.

Exemplary embodiments of energy monitors that may be used with the laser system 100 are described in the concurrently filed U.S. patent application entitled "Energy Measurement Systems and Method", the content of which is hereby incorporated by reference in its entirety. Briefly, and with reference to FIG. 6, an exemplary energy monitor 600 (which may be similar to any of the energy monitors used in the laser system 100) includes a radiation sensor 602, such as a photodiode, that is configured to detect radiation pulses and, in response to detected radiation pulses, generate an electrical current 604 whose level is proportional to the energy level of the radiation. As noted, the laser system 100 may include an optical diversion mechanism to direct at least a portion of the radiation that is to be measured to the energy sensor. The signal level produced by the energy sensor (e.g., photodiode) is generally small and accordingly, the signal is directed through one or more amplification stages 606a and 606n to amplify the signal and/or perform filtering operations on the signals (e.g., low-pass filtering). At least one of the amplification stages 606a and 606n may include a corresponding gain-step adjustment control mechanism 608 to control the amplification of the corresponding stage, and thus enable a user to adjust the gain realized individually by at least one amplification stage, and collectively by the one or more stages of energy monitor 600. In some embodiments, the gain-step adjustment control mechanism may be a potentiometer, such as an eight-bit digital potentiometer (digipot), with each step (position) of the potentiometer causing a change in the gain of the corresponding amplification stage. The amplified signal is directed to an analog-to-digital converter (ADC) 610 that may also include a user-interface output device 612 to display the output value (referred to as "count) representative of the converter analog signal. In some embodiments, the output device may include a 12-bit, and is thus capable of representing analog signals as digital values in a range of 0-4095 ($2^{12}-1=4095$). In some embodiments, at least one of the energy monitors may also include pulse-detection mechanisms to detect the occurrence of radiation pulses. Based on the detected pulse, the pulse detection mechanisms may generate control equal to regulate the operation of the energy monitor.

To determine from the signal generated by an energy monitor in response to radiation incident on the energy sensor (or from a signal amplified from the signal generated by the energy sensor) the energy level of the incident radiation that is to be measured. The energy monitor is calibrated so that meaningful output can be provided to the operator indicative of the energy level measured. Calibration of primary and secondary energy monitors generally follows similar procedures, and therefore the description provided herein will correspond to the calibration of an energy monitored positioned anywhere in the laser system 110 (to the extent that there are some differences (those differences will be described). Energy monitor calibration procedure includes two principal stages: energy monitor gain calibration, and energy vs. ADC counts calibration.

The energy monitor gain calibration stage is used to determine the relationship between the step-settings of the adjustment control mechanism 608 (e.g., the gain-step setting of the digitpot) and the resultant gain realized by the corresponding amplification stage. In some embodiments, the energy monitors use a twelve bit (12-bit) 3.3 V Analog-to-Digital Converters (ADCs). Due to circuit design limits, the ADC input voltage cannot reach the 3.3V rail, and thus the maximum ADC output used count is approximately 4000 counts (rather than 4095). As described herein, the energy monitor gain can be controlled using a potentiometer that adjusts the gain of one or more of the amplification stages used in the energy monitors. Where the potentiometer used is an eight-bit digital potentiometer the digital potentiometer's gain step can be set to any value from 0 (minimum gain) to 255 (maximum gain).

Figure 7:
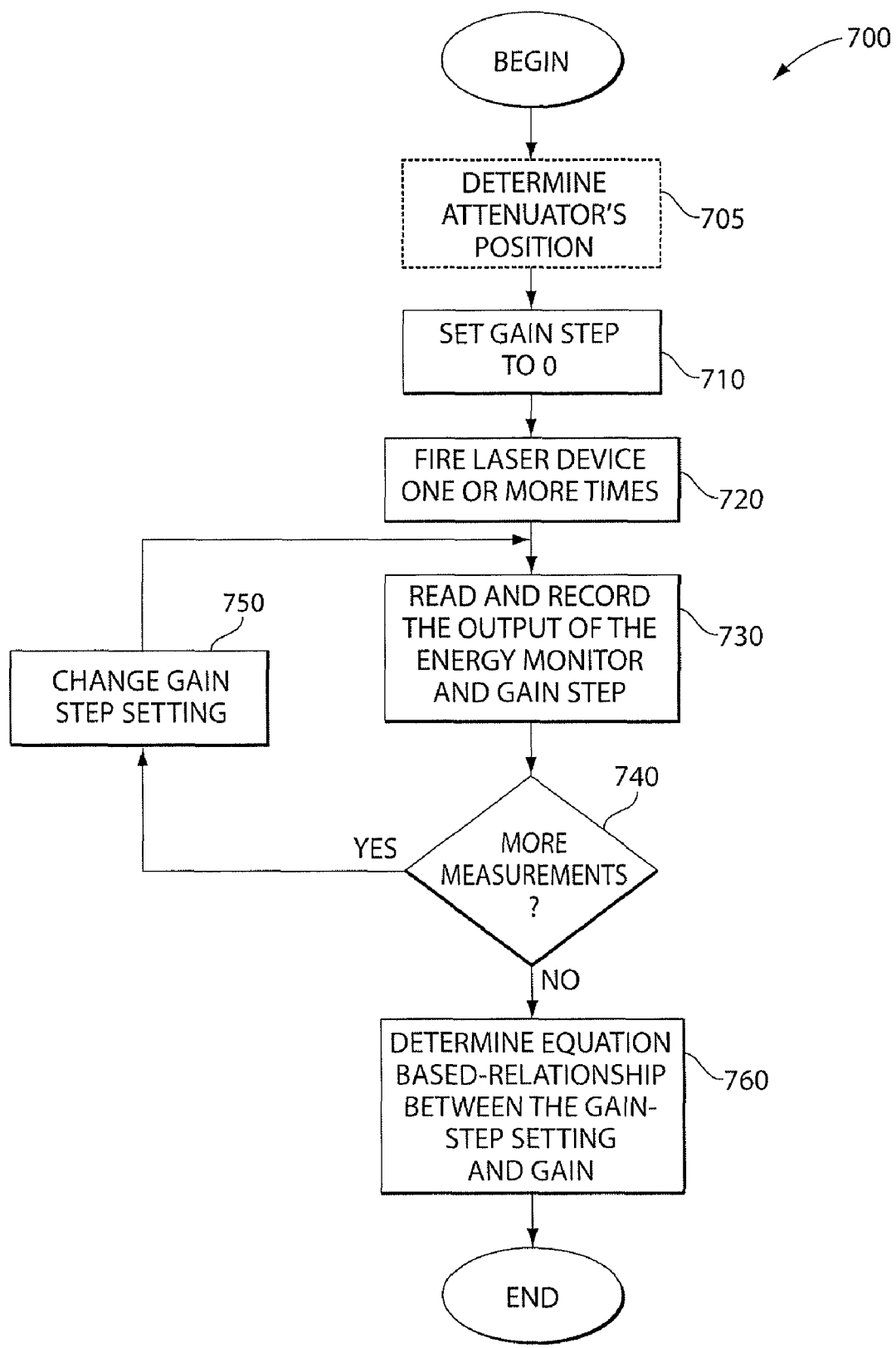
FIG. 7 is a flowchart of an exemplary energy monitor gain calibration procedure.

Referring to FIG. 7, a flowchart of an exemplary embodiment of an energy monitor gain calibration procedure 700 is shown. As will be described in greater details below, in some embodiments, when calibrating secondary energy monitors, the attenuator's position, particularly when calibrating secondary energy monitors, may initially have to be determined 705. Thus, when calibrating secondary energy monitors, the half wave plate is stepped through a series of positions and the laser is fired at each position to find the position resulting in a maximum energy output while using an external measurement device such as an energy meter to measure the outputted energy. The maximum energy output should be slightly above the maximum energy range used in therapeutic procedures to be performed using system 100. For example if in normal operation, the PD therapeutic procedure requires 10 mJ of energy, the maximum energy setting for calibration may be 11 mJ. As for the SLT procedure, if this procedure requires 2 mJ of energy, the maximum energy setting for calibration may be 3 mJ.

When calibrating the energy monitors (primary and/or secondary), the gain step of the digital potentiometer (digipot) 608 of the amplification stage 606a is set 710 to zero (0) and the laser is fired one or more times, e.g., 4 times, with that particular gain setting (at 720). The output device 612 of the ADC 610 of the energy monitor 600 is read and recorded 730 with the corresponding gain step of the digitpot that was used for the series of shots (initially, a gain setting corresponding to 0).

A determination is subsequently made 740 if additional measurements are required for the energy monitor gain calibration. That determination is performed, for example, by comparing the number of measurements already performed to a pre-defined measurement parameter indicative of the number of measurements that need to be performed. Alternatively, a determination is made whether the maximum gain step (255 for an 8-bit digipot) has been reached, or whether the value of the output device 612 of the ADC 610 has exceeded 4000 (for a 12-bit ADC). It is to be noted that generally data corresponding to at least two gain-steps setting would be required to determine the relationship between the gain-step setting and the realized gain of the corresponding amplification stage (or of the entire energy monitor 600) in circumstances in which a linear curve is used as express that relationship.

If it is determined that additional measurements have to be performed, then the digipot's gain step setting is changed 750 by a particular gain-step increment. Changing of the gain step setting can be performed automatically by a control mechanism to actuate the gain-step adjustment control mechanism 608, or it can be performed manually by an operator manually moving the gain setting of the gain-step adjustment control mechanism. The operations 720-740 are then repeated to fire one or more shots using the current gain step setting of the digitpot. When no additional measurements need to be performed, the equation-based mathematical relationship between the gain-step setting of the gain adjustment mechanism and the resultant gain realized by the corresponding energy monitor device is determined 760. Particularly, where a linear curve is used to express the relationship between the gain-step setting and the gain realized by the energy monitor (e.g., the energy monitor 600), a least-square technique, for example, may be used to determine the best fit curve to the data collected during the measurements performed in the course of performing the procedure 700.

Figure 8:
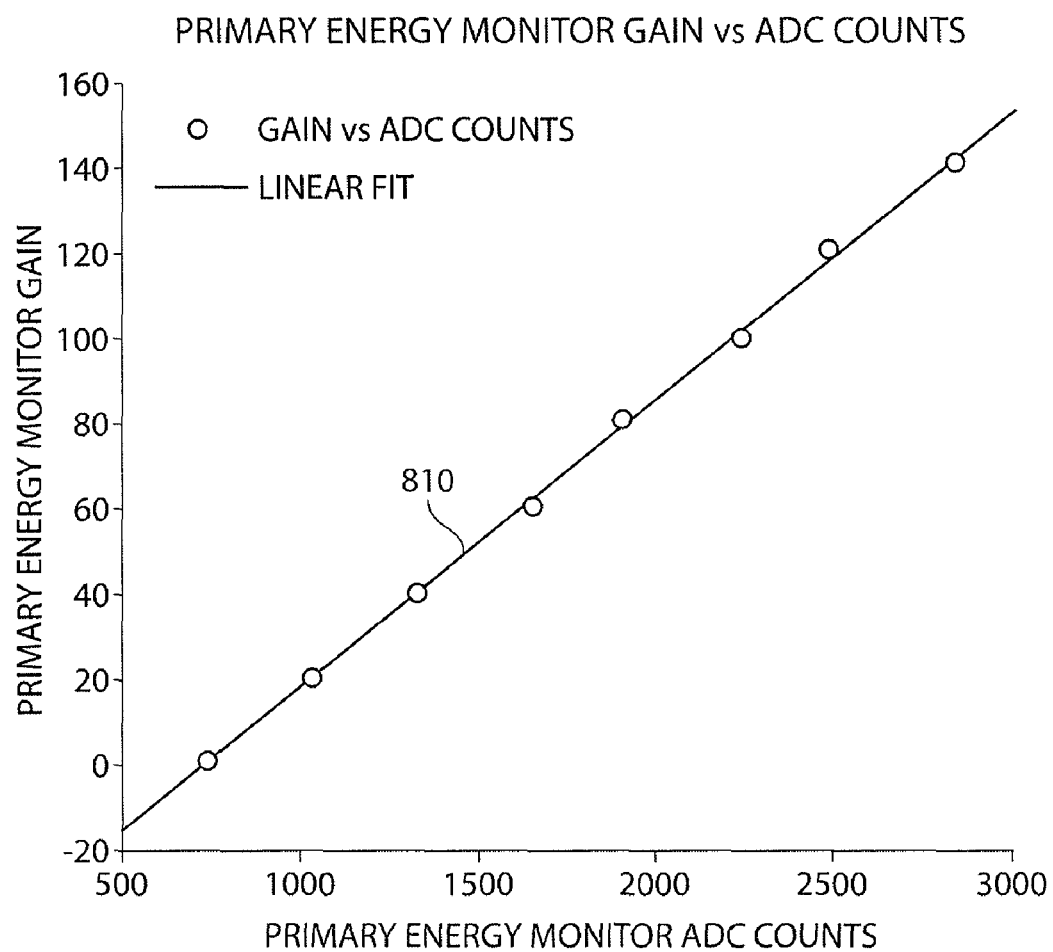
FIG. 8 is a graph of an exemplary plot of the energy monitor gain set vs. the ADC values.

Referring to FIG. 8, a graph of an exemplary plot of the energy monitor gain set vs. the ADC values is shown. A linear curve 810 is the computed curve that best fits the exemplary data acquired during performance of the procedure 700 (for convenience, the depicted gain range shown in the graph is −20 to 160, although the actual practicable gain value used herein for the energy monitor do not have a negative value). The resultant gain step vs. ADC counts curve may then be used to determine the gain step which will give, in some embodiments, approximately 3000 ADC counts. An ADC count of approximately 3000 (out of the available 4095 counts) provides good resolution while still allowing for some margin when laser energy is above normal. As will be described below in greater detail, when calibrating secondary energy monitors, a gain value that would result in an ADC count of 2000 (when the maximum therapeutic energy level is delivered to the patient) is computed. An ADC count of 2000 enables detection of energy level error (deviation) of +100% (i.e., double the therapeutic level) while still providing good resolution.

Having determined the relationship between the gain-step setting of the energy monitor and the resultant values outputted by the display 612 of the energy monitor 600 and by using an external energy meter to measure the output energy, the relationship between the gain setting 608 and the and the outputted values of the ADC 610 of the energy monitor 600 is determined. The energy setting where the gain vs. ADC counts is determined is the output of the laser for the primary energy monitor and the maximum energy for each laser function (PD or SLT) for the secondary energy monitors. In some embodiments, this procedure determines where to set the gain to get a count of 3000 at 16 mJ of output energy for the primary energy monitor and 2000 counts at the corresponding maximum energy output for the laser function (e.g., 11 mJ for PD, 3 mJ for SLT) for the secondary energy monitors. As noted, an assumption that may be made for the purpose of calibrating the energy monitors (e.g., the monitors 114 and/or 136 in FIG. 1 or the monitor 600 in FIG. 6) is that the energy detected by the photo detector of the energy monitor (e.g., the photodiode 602) is directly proportional to the energy of the actual radiation emissions (e.g., the laser pulses). It may also be assumed that this energy seen by the photodiode is a linear function of the ADC counts read from the converter.

Figure 9:
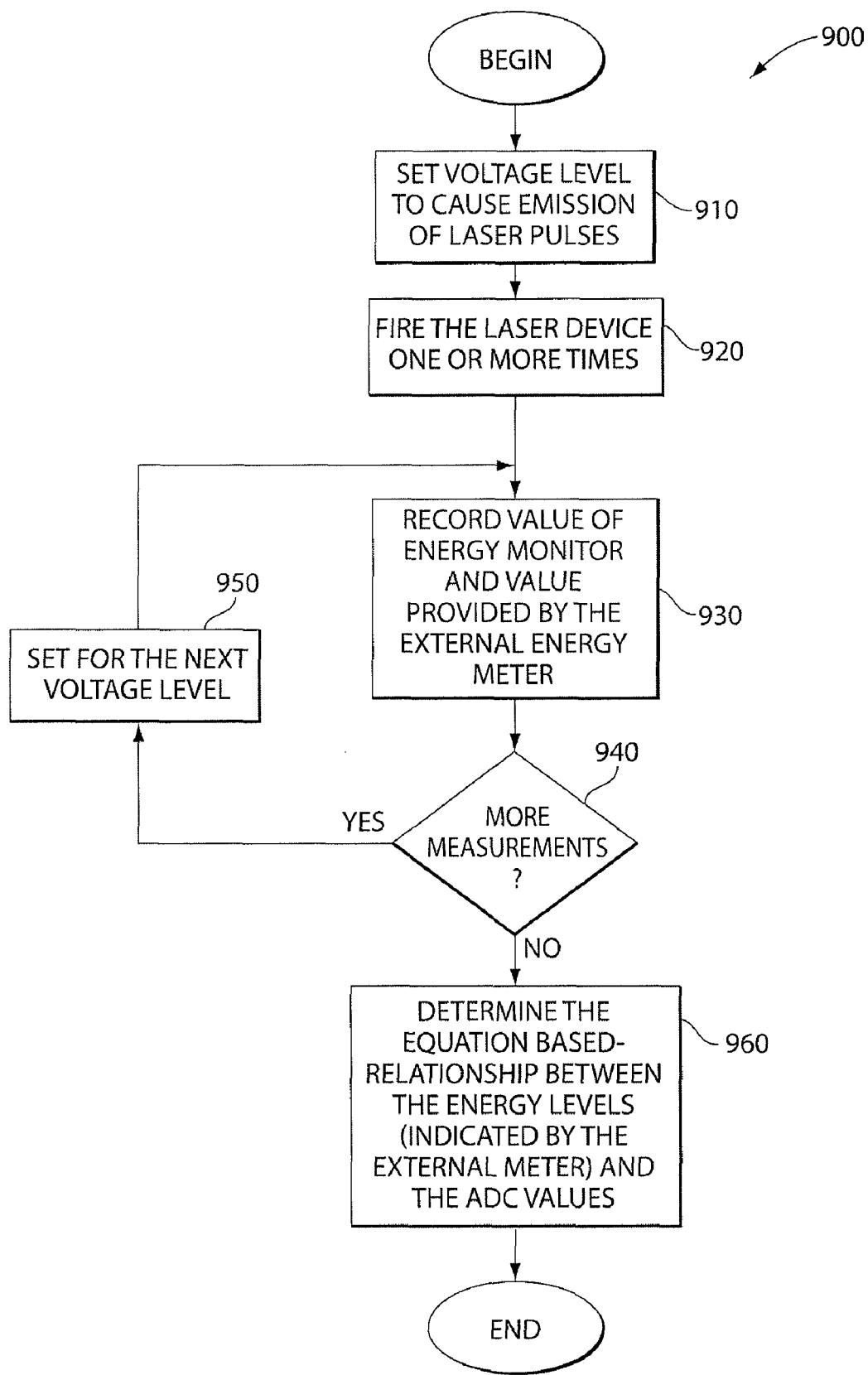
FIG. 9 is a flowchart of an exemplary energy level calibration procedure.

Referring to FIG. 9, a flowchart of an exemplary energy level calibration procedure 900 is shown. Initially, the attenuation effect of any attenuator, if one is used, is set to minimum. Additionally, an external calibrated energy meter (not shown) to provide the energy level of emitted radiation is positioned so that it can measure the energy level of the emitted radiation. The external energy meter communication with the calibration module 190 so that measured values can be communicated, for example, using physical communication links (e.g., conductive wires) or wirelessly, to the module 190. The HVPS 102 is set 910 to apply voltage levels that would result in the emission of a single, double and triple pulse. Such voltage levels may be determined using the threshold voltage calibration procedure 300 described herein. With the voltage level set to one of the appropriate threshold levels, the laser device 110 is fired 920 one or more times (e.g., four shots per voltage level). That is, when the voltage is set to cause the laser device 110 to emit a single pulse, and the number of shots to be fired is four, the laser device is fired four (4) times at that voltage level. For each fired shot, the resultant value displayed by the display 612 of the ADC 610 and the energy level measured and indicated by the external energy meter are recorded. A determination is made 940 as to whether more measurements are required (e.g., if the voltage level of the HVPS is to be set to the next level firing voltage), and if so the operations 920-940 are repeated for the next voltage level.

When all the measurements have been performed and recorded, the relationship between the energy level (as indicated by the external energy meter) and the ADC values indicated, for example, by the display 612 of the energy monitor 600 is determined 650. In some embodiments, the determination of this relationship is performed by computing a linear curve fit using, for example, a least squares technique. The resultant energy vs. ADC counts curve may thereafter be used to convert energy monitor ADC values (counts) to energy levels.

Figure 10:
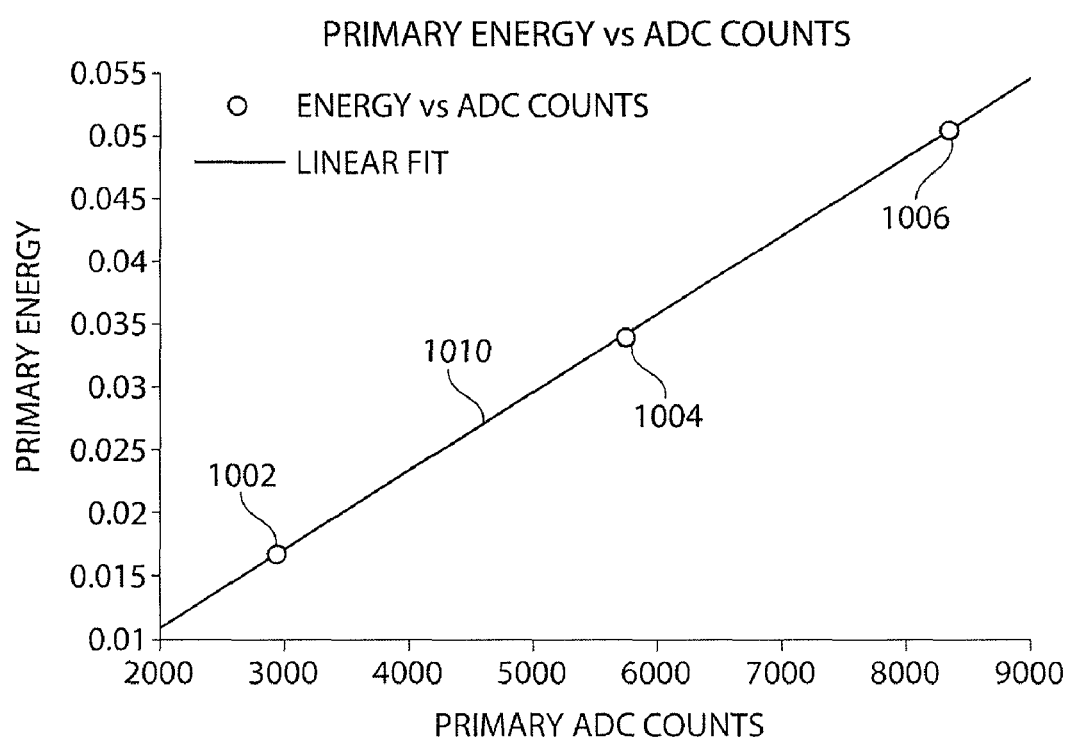
FIG. 10 is a graph showing an exemplary plot of the energy level and ADC values (count).

Referring to FIG. 10, a graph showing an exemplary plot of the energy level and ADC values (count) is shown. The points shown in the graph (indicated by circles) correspond to energy levels and ADC counts for one or more pulses. Particularly, the point 1002 corresponds to a single pulse, the point 1004 corresponds to two pulse emissions, and the point 1006 corresponds to a train of three pulses (i.e., the energy level and ADC counts are the sums of the individual energy levels and ADC counts of individual pulses in the train). A linear curve 1010 is the computed curve that best fits the exemplary data acquired during performance of the procedure 900.

As described herein, some energy monitors may be positioned so that they measure radiation corresponding to the unattenuated radiation emitted from the laser device 110 (so-called primary energy monitors), while other energy monitors may be positioned to measure energy level corresponding to the attenuated radiation outputted from, for example, the half-wave plate 120 (the so-called secondary energy monitors). As noted herein, in some embodiments, the energy monitors used in conjunction with the laser system 100 include twelve-bit 3.3V ADCs configured to output maximum count values of 4095. In circumstances in which the energy monitors are deployed so as to measure attenuated radiation level (i.e., secondary energy monitors), the energy monitors should be configured to measure a 100% over-energy condition (i.e., energy levels that are twice the typical energy level that those monitors measure). Therefore, such secondary energy monitors should be configured to output a count of approximately 2000 counts when a typical single radiation pulse that is to be applied to a body area to be treated is emitted. Typical single-pulsed radiation emissions used for performing Photodisruptive Procedure (PD) to treat, for example, secondary cataract, may have treatment energy levels of approximately 10 mJ. Typical single-pulse radiation emissions used for performing Selective Laser Trabeculoplasty (SLT) to treat, for example, glaucoma, may have treatment energy level of approximately 2 mJ.

In circumstance in which double or triple pulses are used to perform PD, the energy of the individual pulses are measured and added to give the total energy. That is, The system measures energy for each pulse that occurs in a pulse train by recording the ADC output from the energy monitor measuring the emissions. The energy monitors measure each pulse (s) energy output individually and the system (e.g., via a software implementation) adds the ADC counts together in circumstances where multiple pulses are emitted, and provides as output the aggregate result.

As also explained, the gain of the energy monitors are set using, for example, an eight bit digital potentiometer that is controlled by an adjustment control mechanism (digipot). The gain is assumed to be a linear function of the digipot resistance (or gain step). The gain step can be set to any value from 0 (minimum gain) to 255 (maximum gain). When calibrating the energy monitor to determine the relationship between the monitor's gain step and the monitor's ADC's count, the gain step resulting in an ADC count of approximately 2000 when the typical maximum treatment energy is applied is determined. A gain resulting in a count of 2000 will thus result in a count of 4000 when a 100% over-energy condition occurs. Over-energy conditions are indicative of system failure and/or the occurrence extraordinary conditions such as, for example, the placing of the attenuator in an incorrect position, the use incorrect firing voltages, the occurrence of a shutter failure, having the laser radiation travel down the wrong path (for example, firing in SLT mode and having the resultant radiation travel along the path corresponding to PD).

Determination of the gain step vs. ADC count relationship for secondary energy monitors is generally performed using the procedure 700 described above and depicted in FIG. 7. When calibrating secondary energy monitors, the attenuator that attenuates the source radiation emitted by the laser device 100 is set to give an approximate treatment energy level of 10 mJ (for PD) or 2 mJ (for SLT). As explained in relation to procedure 700, the gain step of the digipot is set 710 to 0 and the laser is fired 720 one or more times (e.g., 4) with this gain step. The particular gain step and corresponding ADC counts are recorded 730, and a determination is made 740 of whether additional measurements are required. If additional measurements are required, the operations 720-740 are repeated with a different gain step (set using the adjustment control mechanism 608 of the digipot). Additional measurements are taken until the maximum gain step (255) is reached or until the ADC values exceed 4000 counts. Generally, data from at least two gain steps measurement are required to determine the relationship between the gain step and the ADC count. In some embodiments, the determination of this relationship is performed by computing a linear curve fit using, for example, a least squares technique. The resultant gain step vs. ADC counts curve for the secondary energy monitors is then used to determine the gain step which will give approximately 2000 ADC counts at the typical treatment energy for the particular therapeutic procedure being performed (e.g., 10 mJ for a PD procedure, and 2 mJ for an SLT procedure).

Figure 11A:
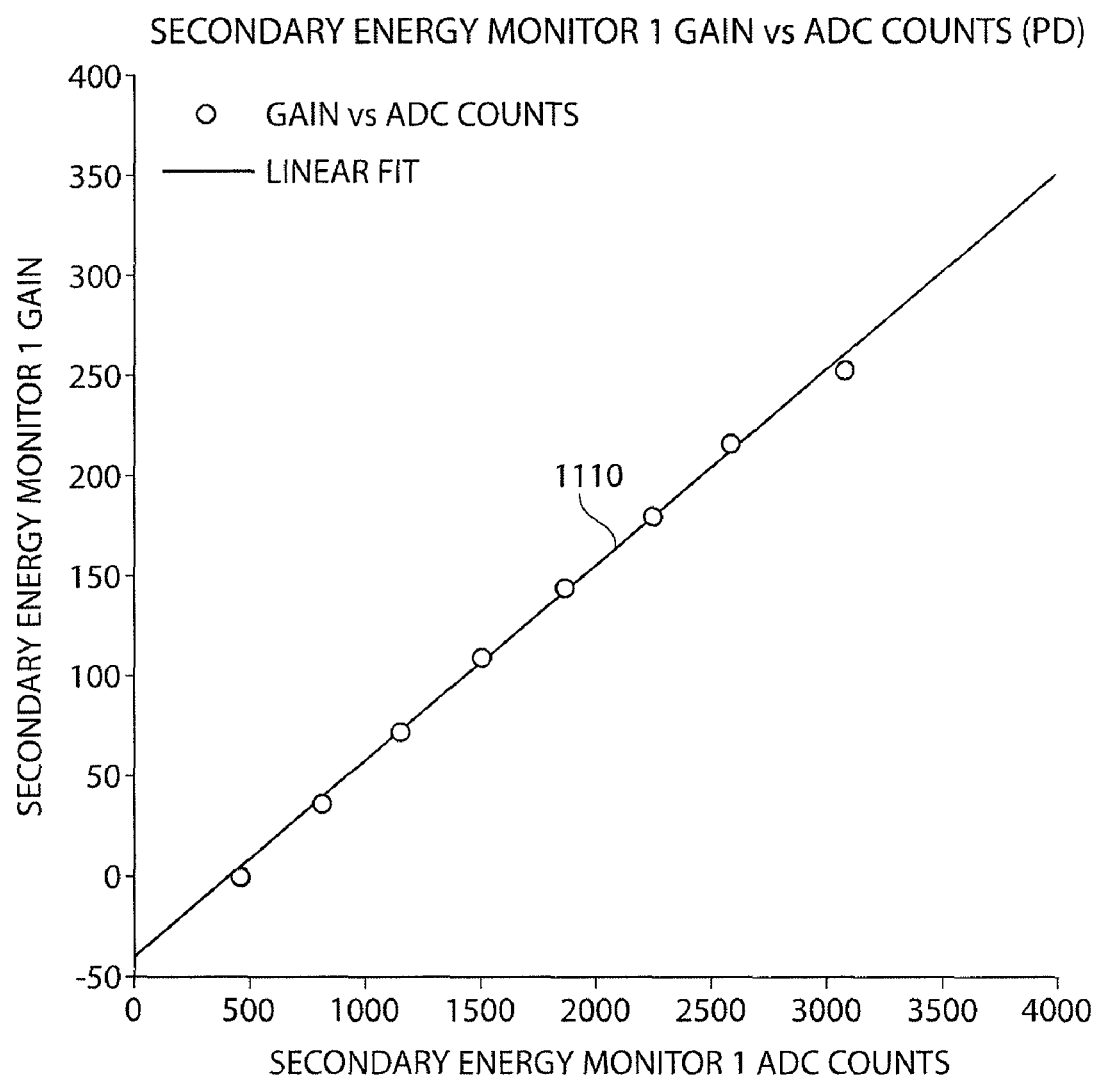
FIGS. 11A and 11B are graphs of exemplary plots of the energy monitor gain set vs. the ADC count value linear curves.
Figure 11B:
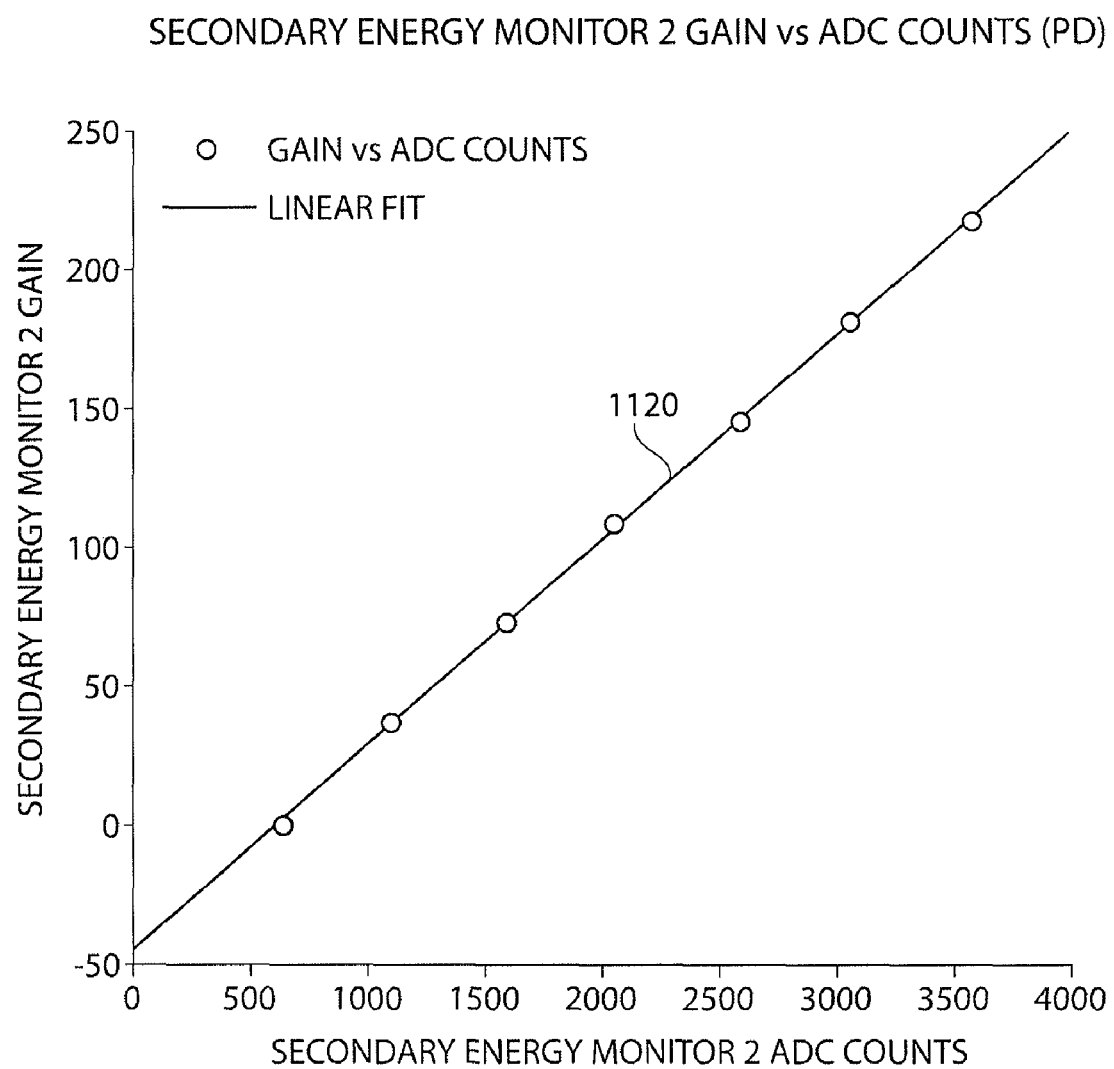

Referring to FIGS. 11A and 11B, graphs of exemplary plots of the energy monitor gain set vs. the ADC count value linear curves are shown. Particularly, FIG. 11A includes a linear curve 1110 which is the computed curve that best fits the exemplary data acquired during performance of the calibration procedure (e.g., a procedure similar to the procedure 700) for a PD secondary energy monitor 1 (there are two secondary energy monitors for PD, respectively called PD monitors 1 and 2, or PD main and alternate monitors, and two secondary energy monitors for SLT called SLT secondary energy monitor 1 or 2, or SLT main and alternate monitors). FIG. 11B, includes a linear curve 1120 which is the computed curve that best fits the exemplary data acquired during performance of the calibration procedure for a PD secondary energy monitor 2.

As explained in relation to FIG. 9, Once the relationship between the gain-step setting of the one or more secondary energy monitors and the respective resultant values outputted by the displays of the ADC of those energy monitors, the relationship between the energy levels of the radiation emissions and the outputted values of the of the energy monitors is determined (i.e., a determination of what energy level the values outputted by the respective ADCs of the secondary energy monitors represent or correspond to). Here too it is assumed that the energy detected by the respective photo sensors (e.g., photodiodes) of the energy monitors is proportional to the energy of the attenuated radiation outputted by the attenuator, and it is further assumed that detected energy sensed by the photo sensors is a linear function of the ADCs of the secondary energy monitors.

Figure 12:
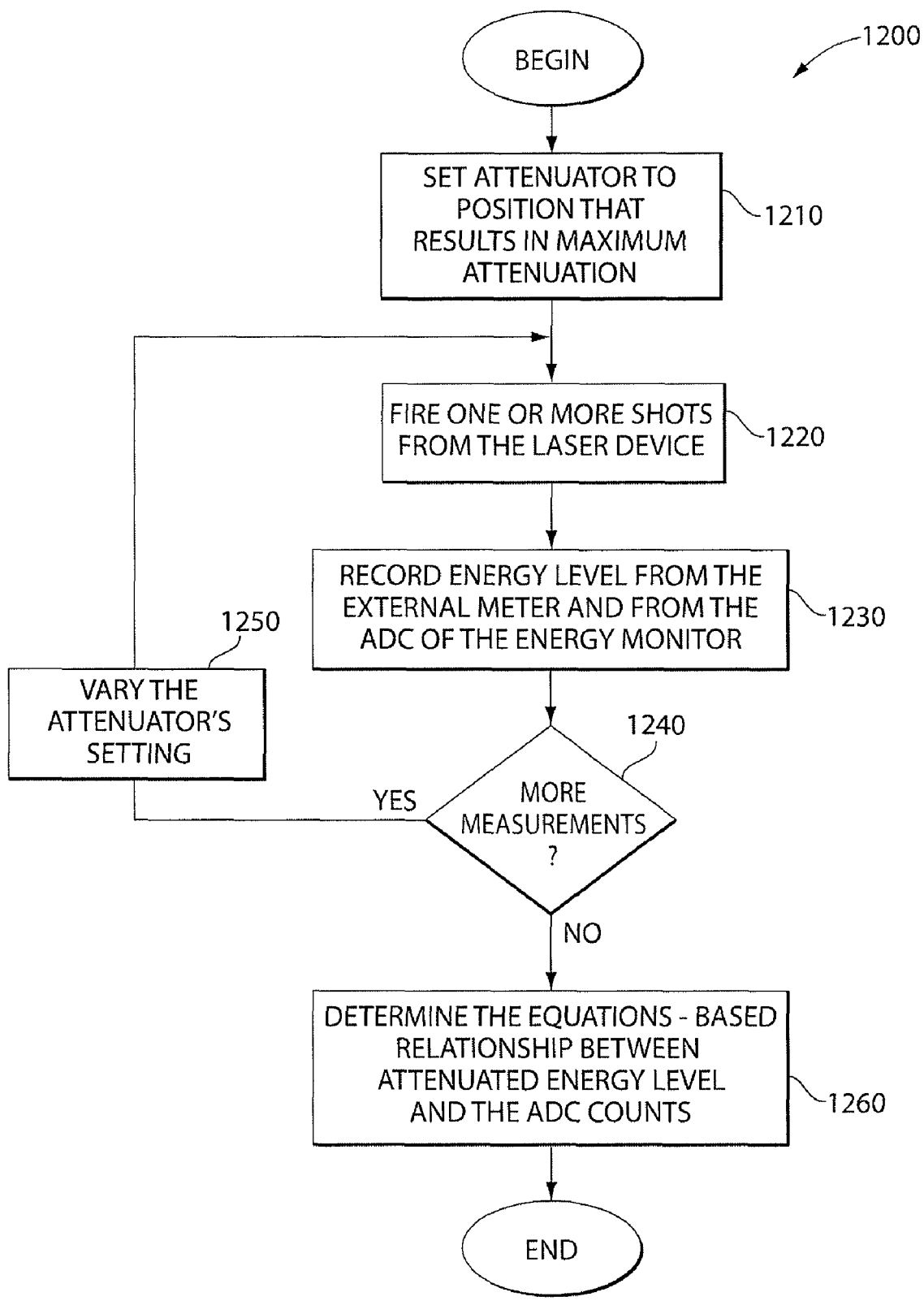
FIG. 12 is a flowchart of an exemplary procedure to perform energy level vs. ADC count calibration for secondary energy monitors.

Referring to FIG. 12, a flowchart of an exemplary procedure 1200 to perform energy level vs. ADC count calibration for secondary energy monitors is shown. Initially, the attenuator through which source radiation from the laser device 110 passes is set 1210 to a position and/or orientation that yields a minimum treatment energy level. Adjustment of a half-wave plate attenuator to control the energy level outputted by the attenuator will be described in greater details below. In some embodiments, the attenuator is adjusted so that an energy level of, for example, approximately 0.3 mJ is outputted by the attenuator in response to a source radiation emission having an energy level of, for example, 16 mJ. A calibrated external energy meter is positioned to enable the external energy meter to measure the attenuated treatment beam and thus enable determining the relationship between the energy levels outputted by the attenuator and the ADC counts of the energy monitors.

Once the attenuator has been set to a position/orientation that would yield a minimum starting-point energy level, the attenuator (e.g., the half-wave plate 120) is thereafter repeatedly adjusted to yield energy levels covering an energy range associated with a particular therapeutic treatment procedure until some energy level end point is reached. A suitable energy level end point for PD treatment procedure may be an energy level of 10 mJ, whereas a suitable energy end point corresponding to the application of an SLT treatment procedure may be 2 mJ.

Thus, one or more laser shots (e.g., 4) are fired 1220 for each attenuator setting. The voltage level of the HVPS 102 that will cause the laser device 110 to emit, for example, a single-pulsed laser radiation, may be determined prior to the commencement of the procedure 1200. For each shot fired the ADC count value from the secondary energy monitor being calibrated, and the energy from the external energy meter, are recorded 1230. A determination is then made 1240 if additional measurements are required, e.g., if it is determined that the attenuated energy level for radiation used for PD procedures has reached a pre-determined end point of, for example, 10 mJ. If additional measurements are required, the settings of the attenuator are varied (e.g., by changing its position/orientation) such that a higher energy level yield is outputted by the attenuator. The operations 1220-1240 are then repeated for the adjusted setting of the attenuator.

If no additional measurements are required, the data acquired during the calibration procedure of the particular energy monitor is used to determine 1260 the equation-based relationship between the energy levels outputted by the attenuator and the ADC counts. In some embodiments, this determination is performed by computing a linear curve that best fits the acquired data using, for example, a least square technique and/or some linear regression technique.

Figure 13A:
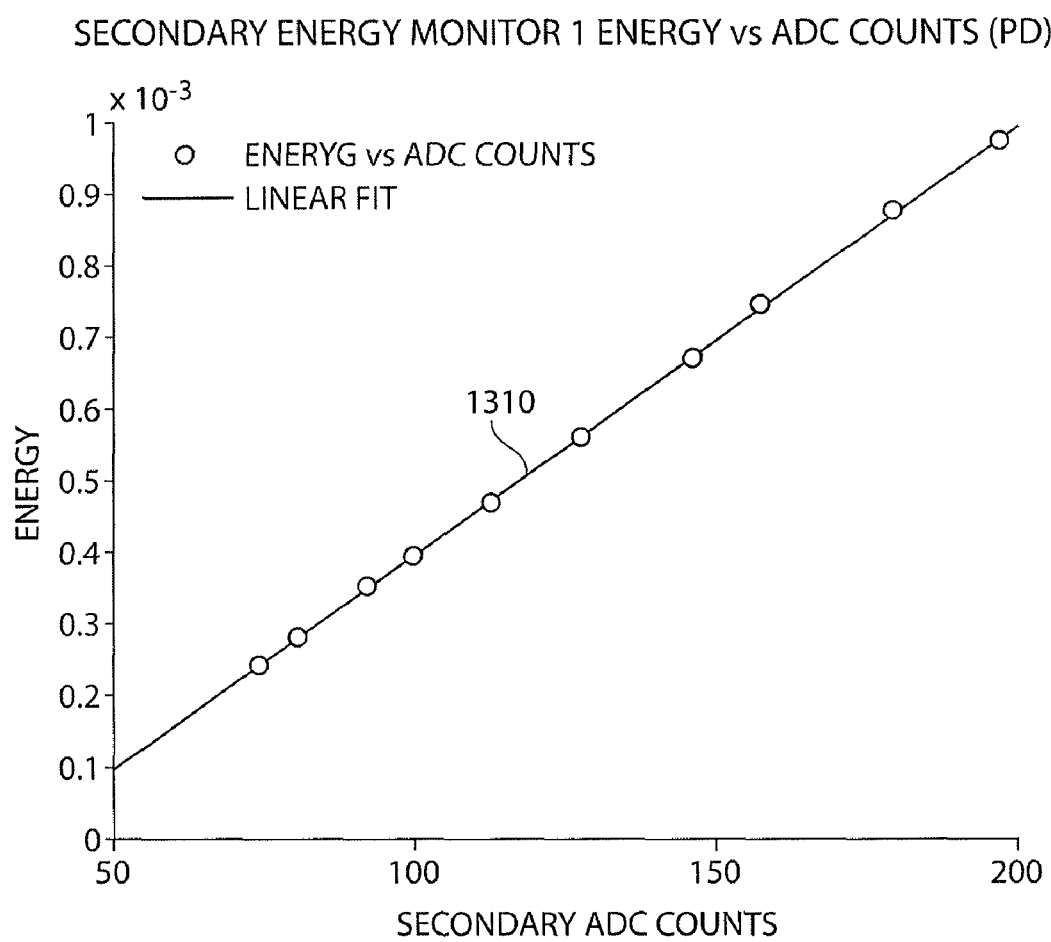
FIGS. 13A-D are graphs of exemplary plots of the energy level and ADC values (counts).
Figure 13B:
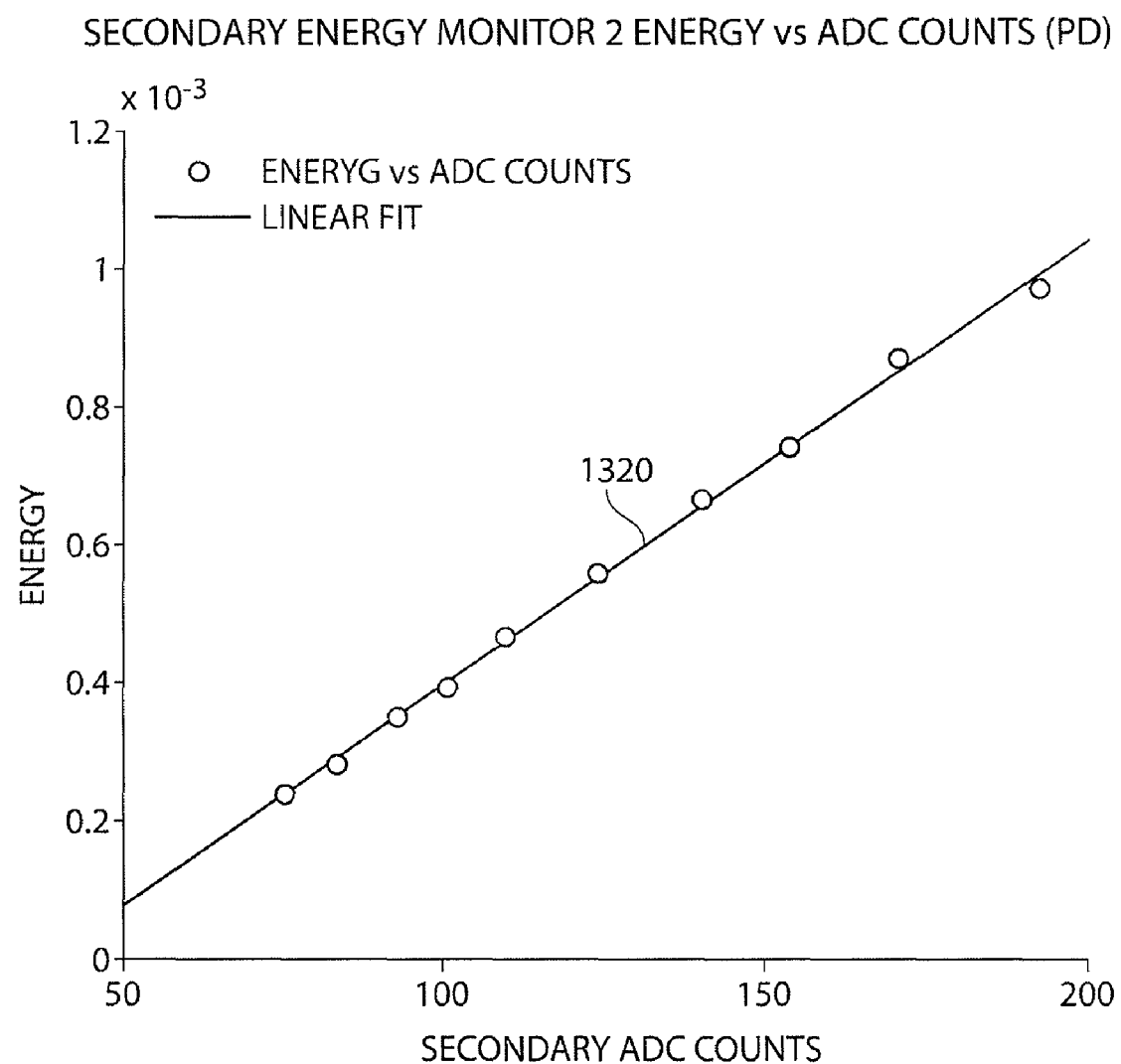
Figure 13C:
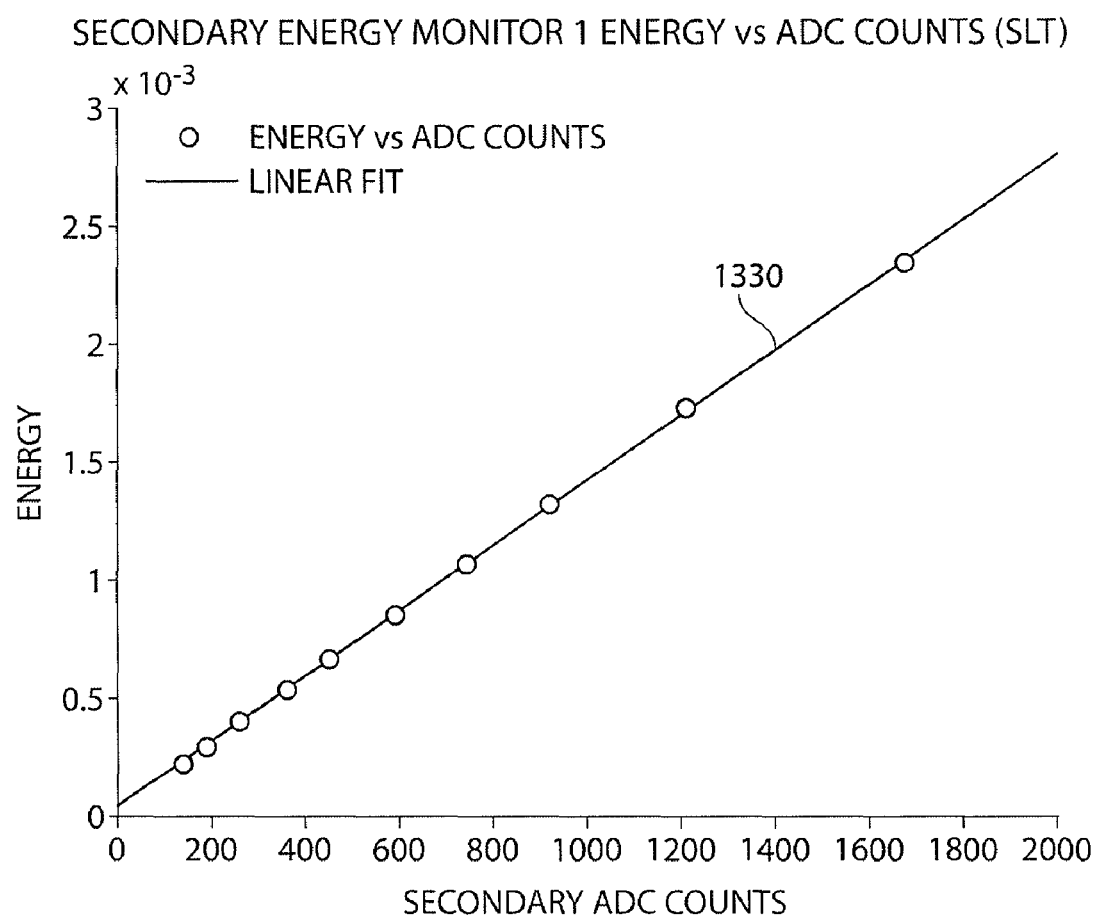
Figure 13D:
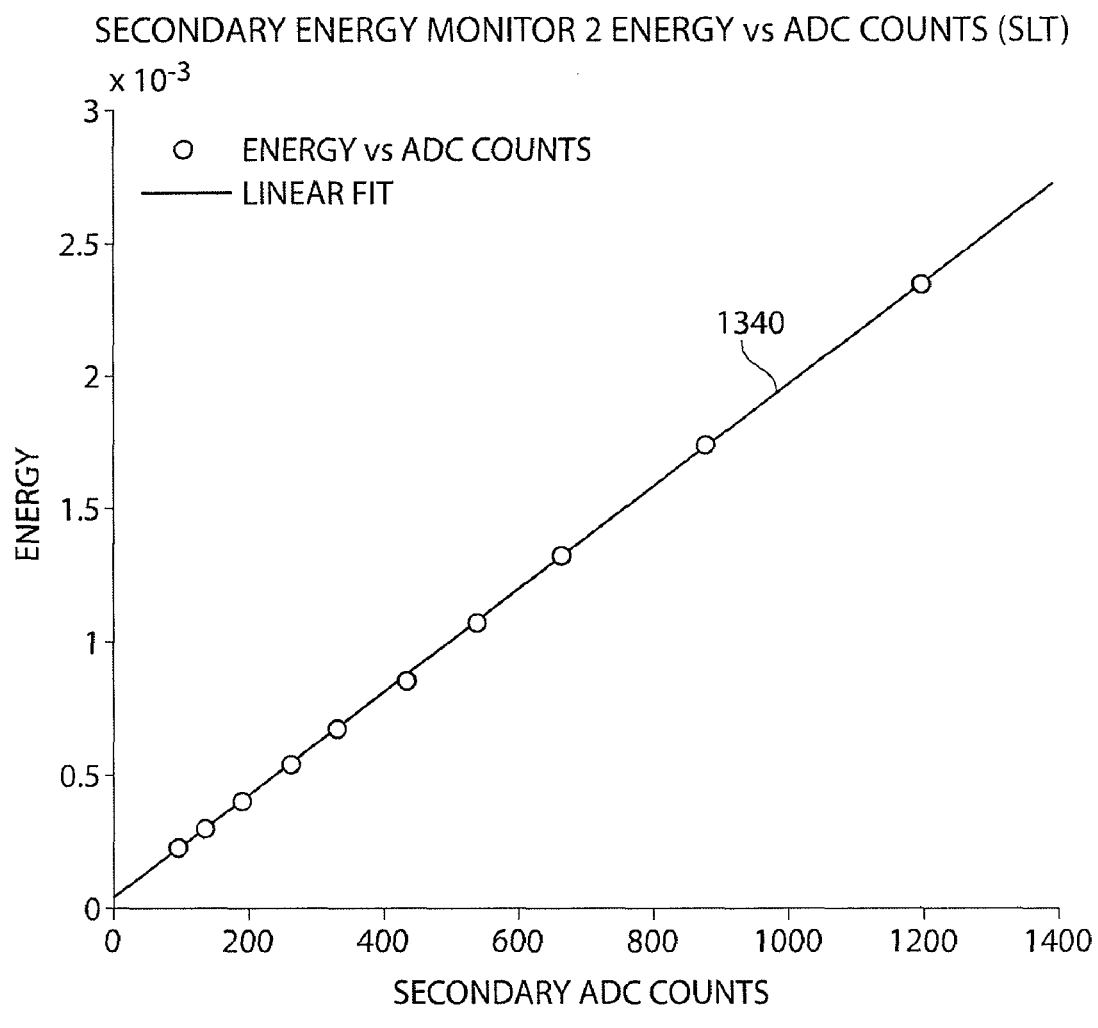

Referring to FIGS. 13A-D, graphs of exemplary plots of the energy level and ADC values (counts) are shown. The graphs of FIGS. 13A-D correspond to calibration data obtained for four secondary energy monitors, with two monitors (136 and 138, corresponding to main energy monitor 1 and alternate energy monitor 2) calibrated to operate in PD and, two monitors (146 and 148) calibrated to operate in SLT treatment procedure configuration. The data was obtained by performing measurements and calibration operations similar to those described in relation to the procedure 1200 depicted in FIG. 12. FIG. 13A shows a linear curve 1310 computed from data obtained with respect to energy monitor 1 to measure energy levels corresponding to radiation emissions applied with respect to PD treatment procedures. The linear behavior of the data is shown in the plot of FIG. 13A. FIG. 13B shows a linear curve 1320 computed from data obtained with respect to energy monitor 2 to measure energy levels corresponding to radiation emission for PD treatment procedures. FIG. 13C shows a linear curve 1330 computed from data obtained with respect to energy monitor 1 to measure energy levels corresponding to radiation emission for SLT treatment procedures. FIG. 13D shows a linear curve 1340 computed from data obtained with respect to energy monitor 2 to measure energy levels corresponding to radiation emission for SLT treatment procedures.

Attenuator Calibration

Attenuators, such as, for example, the half-wave plate attenuator 120 shown in FIG. 1, exhibit different behavior characteristics when operating on radiation emissions used in the course of applying PD treatment procedures than when operating on radiation emissions used in the course of applying SLT treatment procedures. Accordingly, any attenuator included in the laser system has to be calibrated separately for these two types of treatment procedures. In circumstances in which additional treatment procedures are used, further calibrations procedures may have to be performed.

The calibration procedure for the attenuator, be it to enable the attenuator to be used for PD treatment procedures, SLT treatment procedures or otherwise, includes determining the attenuators maximum attenuation position and determining an equation-based mathematical relationship to describe the attenuator step setting (which controls the attenuator's attenuation level) vs. attenuation calibration behavior.

As noted, the attenuator to be calibrated, such as the attenuator 120 shown in FIG. 1, is a rotateable polarization device that enables variable attenuation operation. The attenuator is configured to rotate the polarization of an incoming radiation beam (e.g., a laser beam) and thus determine the relative magnitudes of the parallel and perpendicular beam components. Generally, only the parallel polarized component will propagate onward towards the target, and thus, adjustment of the extent of polarization performed by the attenuator (e.g., through appropriate adjustments of the attenuator's rotational orientation) will controls the intensity of the propagating radiation emission transmitted to the target. In embodiments described herein, a birefringent half-wave plate, rotateable about an axis substantially parallel to the propagation path of the laser beam and having its optic axis aligned, for example, perpendicular to the axis of rotation, is used.

Generally, when the half-wave plate attenuator 120 is rotated to a position in which its optical axis is parallel or perpendicular to the polarization direction of the laser radiation beam, the laser radiation beam will pass through the half-wave plate without undergoing any polarization rotation. If the half-wave plate is rotated from that position by, for example, 45°, the polarization of the laser beam will be rotated by 90° as it passes through the half-wave plate. If the half-wave plate is rotated to an intermediate position, the laser beam will undergo an intermediate polarization rotation between 0-90°.

As further noted, in some embodiments, the relative angular position of the half-wave plate variable attenuator relative to the general propagation direction of the incoming input radiation emission is controlled, for example, using a rotational mechanism. Rotational mechanisms may include a motor (e.g., an electrical motor) rotates the half-wave waveplate.

In some embodiments, the rotational span of the half-wave plate can be divided into small angular intervals to which the half-wave plate can be rotated. For example, the rotational span for the half-wave plate attenuator 120 can be from 0-61° and be divided to 2400 angular (radial) intervals. The rotational mechanism can be controlled through control signals, provided, for example, through a user-interface or through a controller device, to cause the rotational mechanism to rotate the half-wave plate from a first angular position to a second angular position. In some embodiments, the half-wave plate position of the attenuator can be adjusted through an input interfacing mechanism through which the amount of rotation can be specified. Alternatively, a processor-based controller can generate control signals based on pre-programmed instruction or based on a pre-determined profile to control the rotation of the rotational mechanism. Thus, in the above example of a half-wave plate with a span of 0-61° divided into 2400 intervals (or steps), step 0 could correspond to the 0° radial position whereas the step (interval) 2400 could correspond to the 61° radial position.

Generally, half-wave plates, such as the half-wave plate attenuator 120 used with the laser system 100, are configured (e.g., structurally) during their manufacture to cause a maximum, or near-maximum attenuation at an actuator position corresponding to a specific position (for example approximately 500 steps from the home position, e.g., 0° or 0 step position). However, the exact location of the maximum attenuation position (i.e., the position that would minimize the intensity level of radiation exiting the half-wave plate in substantially the same direction of propagation of the incoming radiation emission) may not be capable of being precisely set, for example, during the assembly process the maximum attenuation position may be set to 500 steps with a manufacturing tolerance of plus or minus 100 steps. Accordingly, as part of the attenuator calibration procedure, the maximum, or near-maximum, attenuation position is determined.

Figure 14:
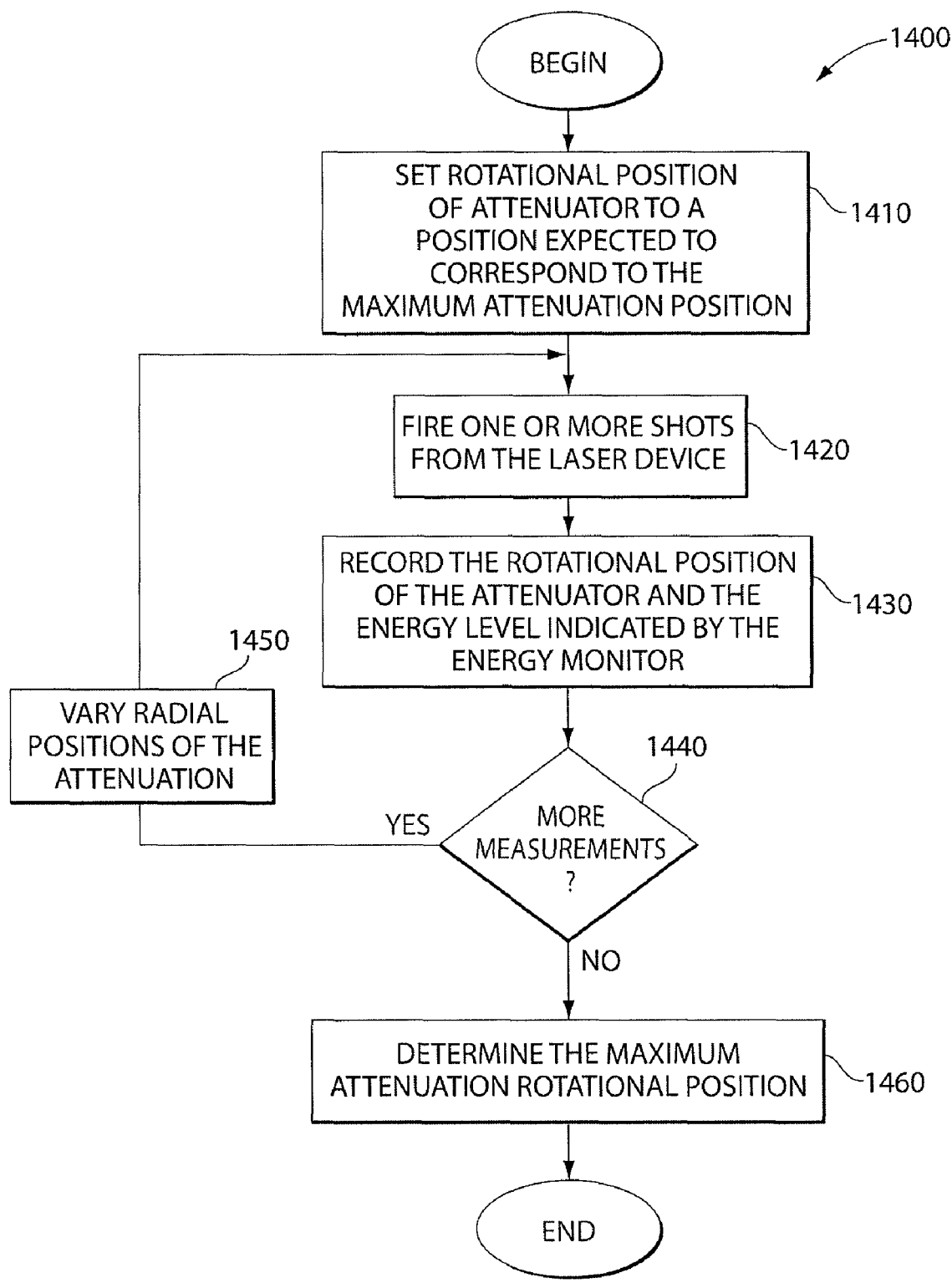
FIG. 14 is a flowchart of an exemplary maximum attenuation position determination procedure.

Referring to FIG. 14, a flowchart of an exemplary maximum attenuation position determination procedure 1400 is shown. Initially, the rotational position of the half-wave plate is set 1410 to a position less than the expected maximum attenuation position including tolerances, by the manufacturers of the half-wave plate 120. For example, if the expected maximum attenuation is 500 steps plus or minus 100 steps, the initial position may start at position 250. At the initial rotational position of the half-wave plate 120, the laser device 110 is fired one or more times (at 1420). The firing voltage level that the HVPS 102 applies to the laser device 110 is adjusted ahead of time so that upon applying that firing voltage level a single-pulsed emission, for example, is produced by the laser device 110. The radiation emission produced by the laser device 110 passes through the half-wave plate attenuator 120. The energy level of the resultant attenuated radiation beam exiting from the attenuator 120 is then sensed by one or more of the energy monitors (e.g., the secondary energy monitors 136). The rotational position of the half-wave plate attenuator 130 and the energy level indicated by the display device of the ADC of the energy monitor and the external calibrated energy meter are recorded 1430 by, for example, the calibration system 190.

Thereafter, if additional measurements are required, the rotational position of the half-wave plate attenuator 120 is adjusted so that it rotates a particular number of rotational steps (e.g., 25) from the initial position of the half-wave plate. The ending rotational position of the attenuator half wave plate should be above the expected maximum attenuation position set by the manufacturer. Thus, a determination is made 1440 of whether additional measurements are to be performed (if, for example, the half-wave plate attenuator has been rotated through the pre-determined step span for calibrating the attenuator). If additional measures are required, the rotational position of the half-wave plate attenuator is varied 1450 by an amount equal to one or more rotational steps taken in a particular direction. This adjustment of the rotational position of the half-wave plate can be effected by, for example, generating control signals that are transmitted to the rotational displacement mechanism of the half-wave plate to cause it to be rotated by the required amount. If no additional measurements are required, the acquired data is used to determine 1460 the maximum attenuation rotational position of the half-wave plate attenuator 130. Determination of the maximum attenuation position may be done, for example, by performing a least square technique to compute a quadratic curve that best fits the data collected in the course of making the measurements. Generally, the level of attenuation as a function of the rotational position in half-wave plates such as those used in the implementation described herein have a quadratic curve behavior.

Figure 15A:
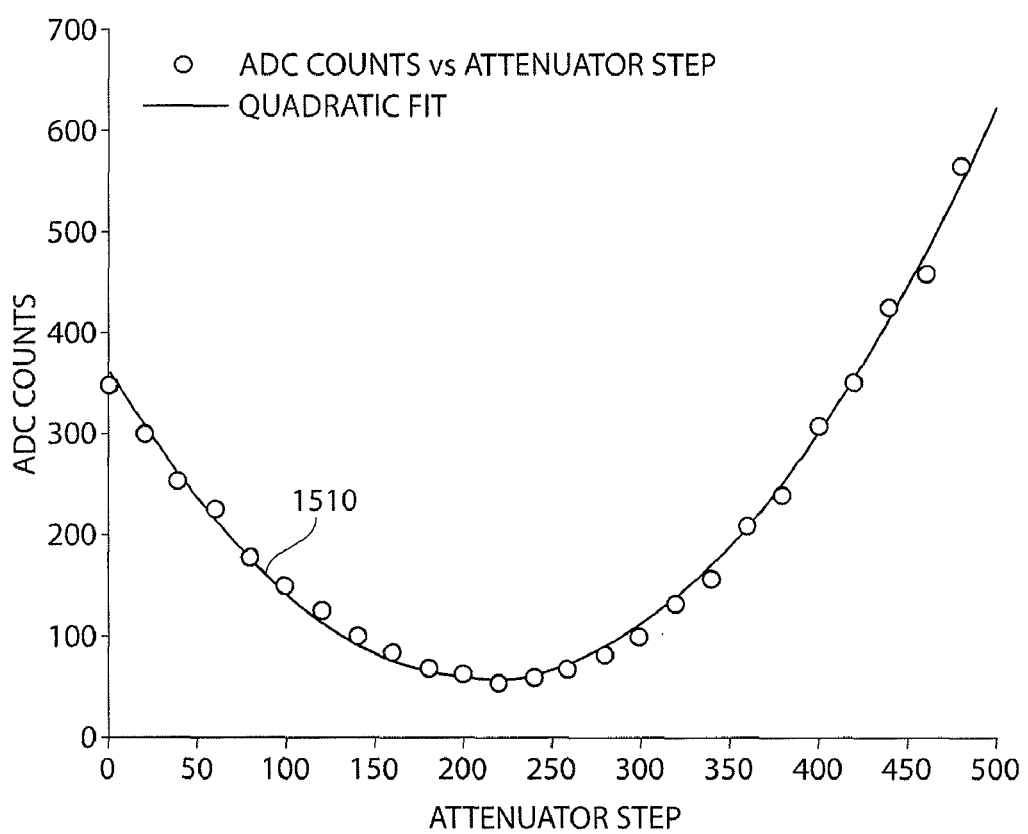
FIGS. 15A-D are graphs of exemplary plots of the energy levels (expressed as ADC counts) vs. the rotational positions of the attenuators.
Figure 15B:
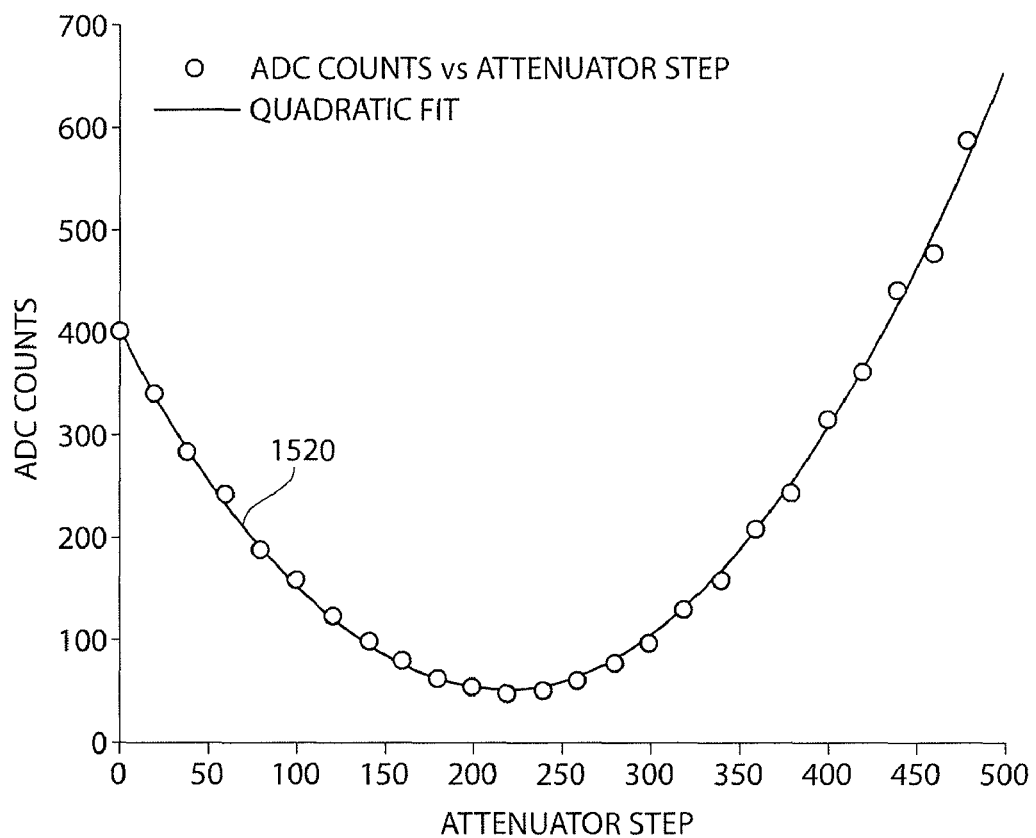
Figure 15C:
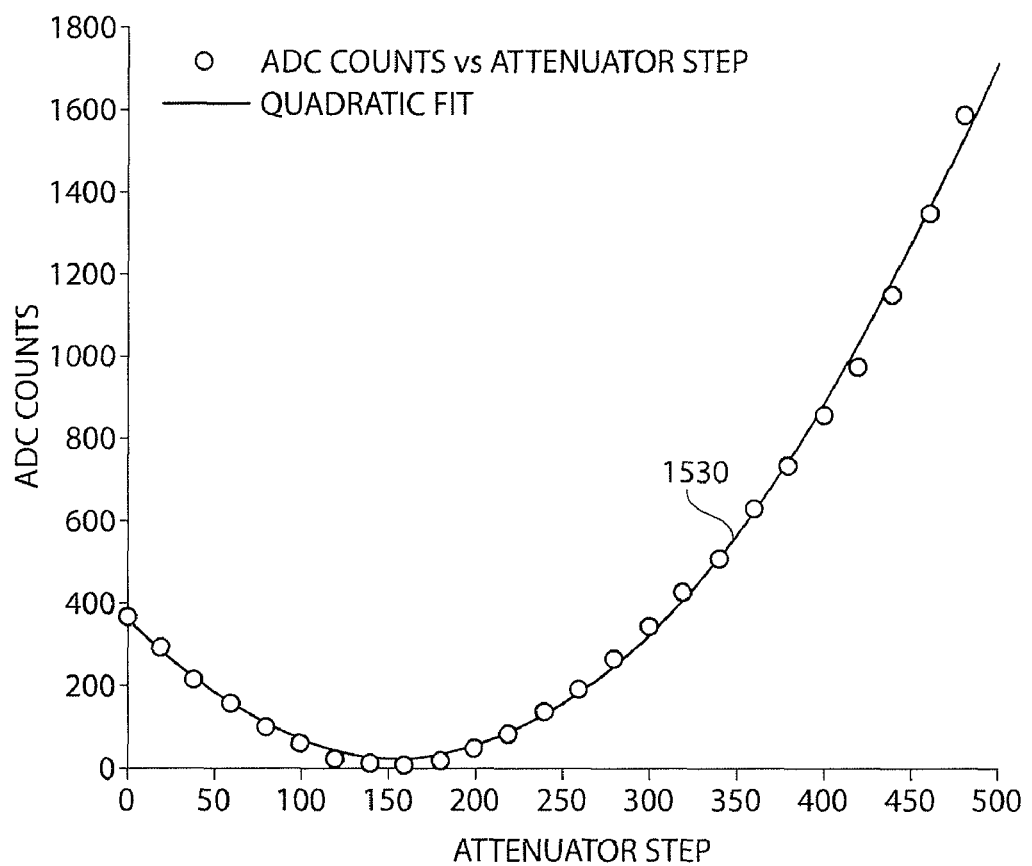
Figure 15D:
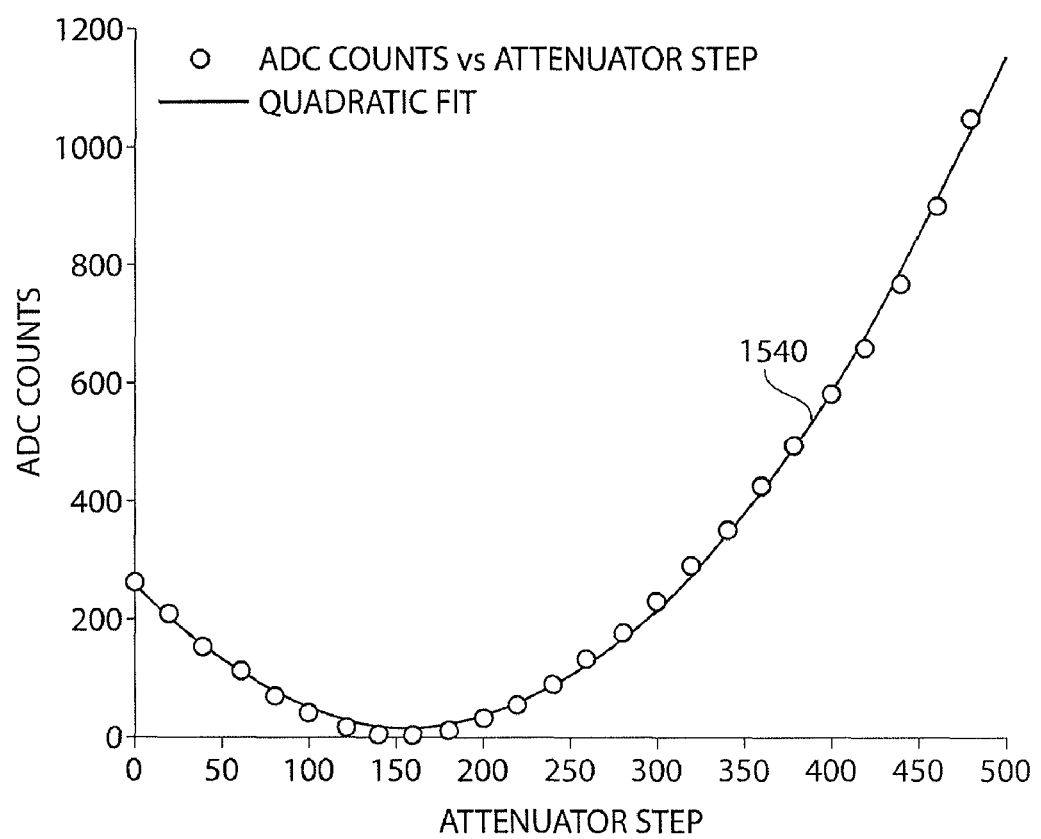

Referring to FIGS. 15A-D, graphs of exemplary plots of the energy levels (expressed as ADC counts) vs. the rotational positions of the attenuators are shown. The graphs of FIGS. 15A-D correspond to data obtained by each of two secondary energy monitors when the laser system was operated in the PD and SLT treatment procedure configurations. FIG. 15A includes a quadratic curve 1510 illustrating the quadratic relationship between the attenuated energy level recorded by energy monitor 1 and the rotational position of the attenuator when the laser system 100 was operated in the PD treatment procedure. FIG. 15B includes a quadratic curve 1520 illustrating the quadratic relationship between the attenuated energy level recorded by energy monitor 2 and the rotational position of the attenuator when the laser system 100 was operated in the PD treatment procedure. FIGS. 15C-D include quadratic curves 1530 and 1540 illustrating the quadratic relationship between the attenuated energy level recorded by energy monitors 1 and 2, respectively, and the rotational position of the attenuator when the laser system 100 was operated in the SLT treatment procedure.

The resultant equations derived using, for example, least squares technique, have the following form:

$$\text{ADC count} = a_0 + a_1 \cdot S + a_2 \cdot S^2 \qquad (10)$$

where ADC count is the secondary energy monitor ADC count (representative of attenuated energy level sensed and recorded by the energy monitor), S is the attenuator position (measured in steps) and $a_0$, $a_1$ and $a_2$ are the quadratic coefficients determined using the least squares computation. To determine the position at which the minimum energy is sensed by the energy monitors, the determined equation is differentiated and set to zero to determine the position corresponding to the minimum energy (and thus maximum attenuation). The position $S_{max}$, corresponding to the maximum attenuation, is thus computed as:

$$S_{max} = -a_1/(2 \cdot a_2) \qquad (11)$$

This maximum attenuation position is computed for all secondary energy monitors deployed in the laser system 100 and the average value is recorded. The above described procedure is performed for both PD and SLT treatment procedures.

To control the level of energy applied to a patient during therapeutic treatment, the relationship between the step positions (each associated with a particular radial position) of half-wave plate attenuator 120 and the level of attenuation associated with that position has to be determined. In addition to the attenuator position, the energy output is also affected by temperature the half wave plate, the laser and in SLT the KTP crystal.

In one embodiment the relationship between attenuator step and treatment energy can be determined at some "nominal" temperature; then, during normal operation of the system a "correction" factor can be applied to account for any changes in calibration due to temperature effects. The mechanism to determine this correction factor will be explained below.

Figure 16:
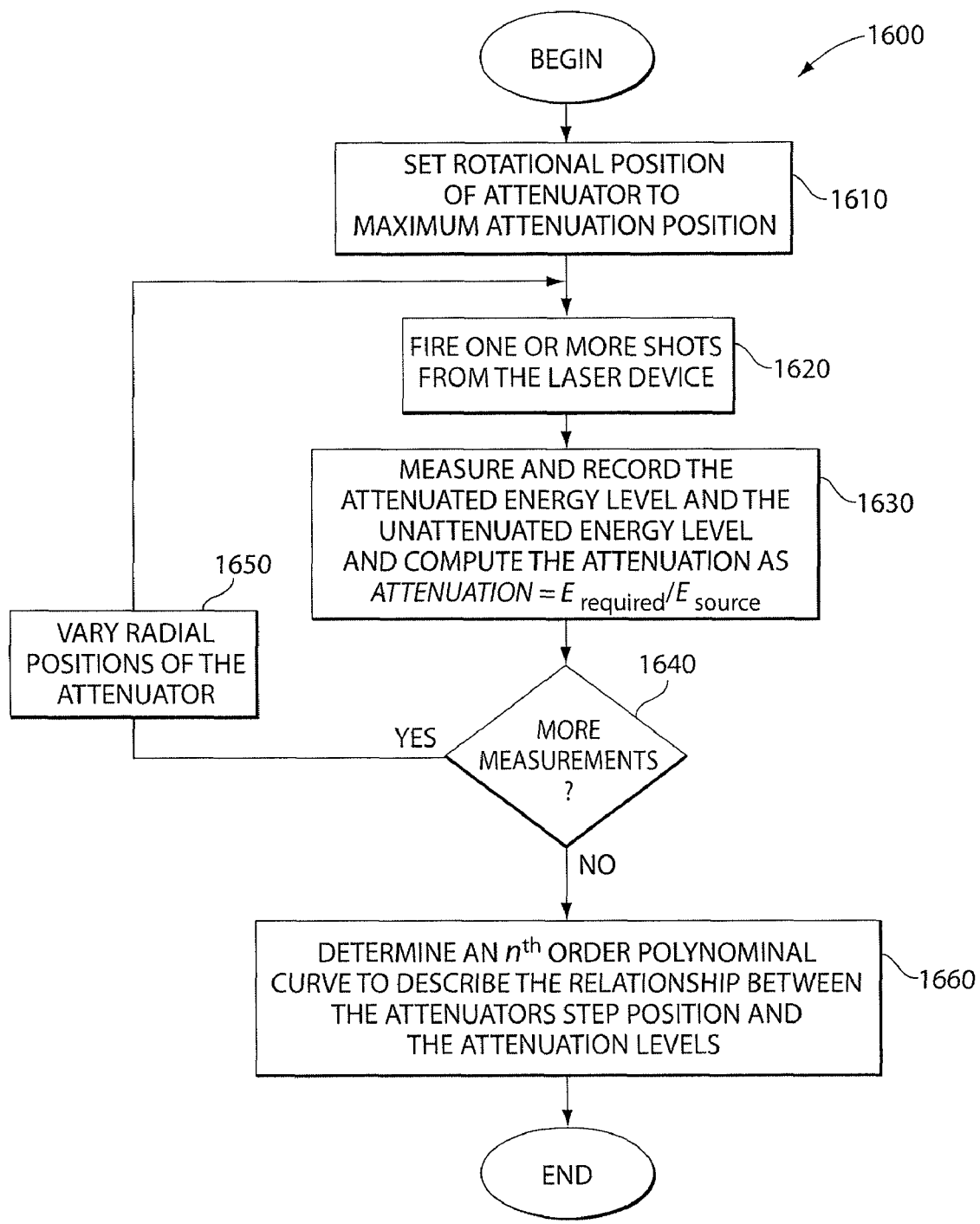
FIG. 16 is a flowchart of an exemplary attenuation step vs. attenuation level calibration procedure.

Referring to FIG. 16, a flowchart of an exemplary attenuation step vs. requested energy calibration procedure 1600 is shown. The determination of the equation-based relationship is performed by stepping the attenuator through a span of the attenuator's 120 step positions and measuring at each step the attenuated treatment energy level outputted by the attenuator from the minimum treatment energy step position to the maximum treatment energy step position. Initially, the rotational position of the half-wave plate attenuator 120 is set 1610 to its maximum attenuation position as determined, for example, by performing the procedure 1400. Also, the HVPS 102 is set to a firing voltage level that, when applied to the laser device 110, causes the laser device to emit, for example, a single-pulse radiation. At each of the attenuator 120 step positions (each corresponding to a particular radial position of the attenuator 120), one or more shots (e.g., 4 shots) are fired 1620. For each shot fired the treatment energy of the attenuated radiation exiting the attenuator 120 is measured 1630 by, for example, an external energy meter and recorded along with the attenuator step position.

After measuring the data for a particular attenuator step position and its associated energy output, a determination is made 1640 whether additional measurements are required to determine an equation-based relationship between the attenuator step position and the energy. The number of attenuator step positions with respect to which measurements are to be performed may be pre-defined (e.g., 500 positions). Alternatively, measurements may be performed with respect to all steps of the attenuator. Other criteria regarding the number of measurements to be performed may be used.

If a determination is made that additional requirements are required, the radial position of the attenuator 120 is varied 1650 (e.g., by one or more steps). Variation of the attenuator radial position may be controlled automatically by, for example, the calibration module 190 generating control signals to cause actuation of the motor controlling the rotational position of the half-wave plate attenuator 120. In other embodiments, an operator can vary a user input-interface device to cause actuation of the motor of the attenuator 120. Variation of the rotational position may be performed in one or more directions from the initial step position of the attenuator (e.g., clockwise or counterclockwise).

If no additional measurements are required, the acquired data is used to determine 1660 an $n^{th}$ order polynomial curve to describe the relationship between the attenuator's step positions (corresponding to radial positions) and the output energy respectively associated with those step positions. In some embodiments, a seventh ($7^{th}$) order polynomial may be used to describe the attenuator position vs. the attenuation level relationship when PD treatment procedure is performed. In some embodiments, a fourth ($4^{th}$) order polynomial may be used to describe the attenuator position vs. the attenuation level relationship when SLT treatment procedure is performed. The choice of the polynomial order may be based, for example, on scientific and/or empirical data describing patterns of data measurements. In some embodiments, several polynomials (each of a different order) may be determined through the applied regression analysis. The generated polynomial that then best fits the acquired data may then be selected on the equations best describing the attenuator's behavior. Different types of attenuators may exhibit different behaviors in relation to their respective attenuator step position vs. requested energy. The determination of the polynomial curve (e.g., determination of the polynomial's coefficients of) may be computed, for example, using least squares techniques, or by using other regression analysis techniques.

Having determined the equation-based relationship between the attenuator step position and the requested energy (for the types of treatment procedures, e.g., PD and/or SLT, that are to be performed), the determined equations of attenuator step vs. requested energy may be used to compute the step position required to give a desired energy output.

Figure 17A:
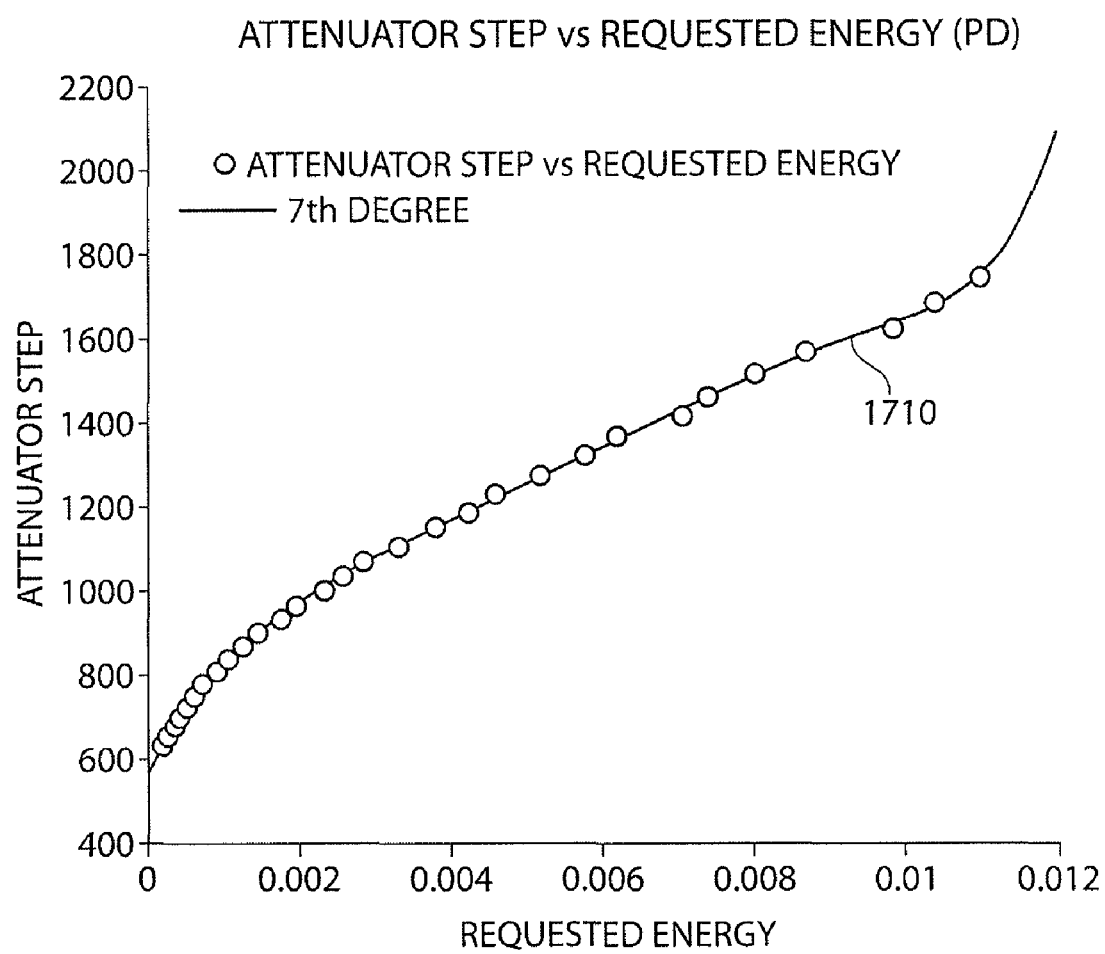
FIGS. 17A-B are graphs of exemplary plots of the attenuator step positions vs. attenuation levels.
Figure 17B:
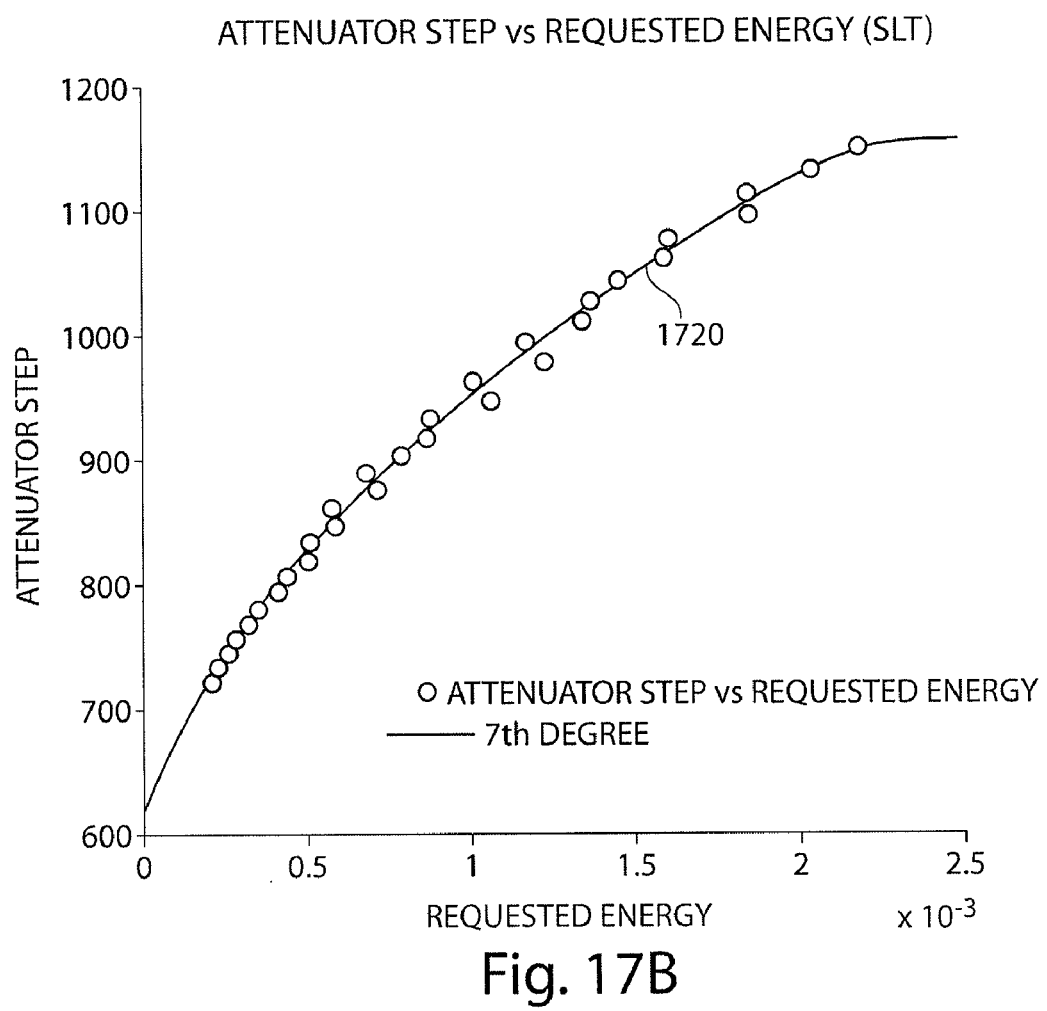

Referring to FIGS. 17A-B, graphs of exemplary plots of the attenuator step positions vs. requested energy is shown. The graphs of FIGS. 17A-B correspond to data obtained when the laser system 100 was operated in the PD and SLT treatment procedure configurations, respectively. FIG. 17A includes a curve 1710 illustrating the $7^{th}$ order polynomial relationship between the attenuator's step position and the requested energy of the attenuator when the laser system 100 was operated in the PD treatment configurations. FIG. 17B includes a curve 1720 illustrating the $4^{th}$ order polynomial relationship between the attenuator's step position and the requested energy of the attenuator when the laser system was operated in the SLT treatment configurations.

Calibration of the Aiming Beam Diode

In some embodiments, the system 100 also includes aiming beam diodes, such as the SLT aiming beam diode 170 and the PD aiming beam diode 172 shown in FIG. 1. Aiming beam diode(s) are provided in the system to target where the treatment laser fire will be applied. The output of this aiming diode is generally required to be variable and adjustable, as well as below a specific limit (e.g., 1 mW) for safety purposes. Typically, the diode's output varies linearly, in two separate regions, as the input voltage applied varies. There are two linear ranges for diode output: one when the diode is operating in a non-lasing range and another when operating in a lasing range. If the diode is operated across both regions, then when the input voltage is adjusted such that the diode light output moves from the non-lasing to the lasing region, the radiation output jumps up, resulting in unsmooth adjustment of the aiming beam output. The diode threshold current point is the boundary between spontaneous emission and the stimulated emission is typically shown on optical power output vs. forward current curve. Below the threshold current point, the output resembles the incoherent output from a LED. At or above the specified threshold current, the device begins to produce laser output. Once the threshold point is surpassed, stimulated emission is achieved and the optical output increases significantly for a small increase in forward current The aiming diode is generally operated in the lasing region to allow sufficient light output to cover the desired output range and also to allow a smooth linear output adjustment. The radiation output may be reduced by adding a filter which allows the diode to operate in a safe output range and in the linear lasing range which has sufficient light output to cover the desired light output. By operating the device near the maximum current and using a filter to reduce the maximum light output that could be applied to a patient's eye, the risk of accidentally exposing the patient to harmful levels of light is effectively mitigated in cases where the diode or its associated controls become shorted or operated incorrectly. The control of the diode voltage may be performed through user input, software and/or an FPGA that converts user's input requests into voltage levels that can be applied to the aiming diode.

In some embodiments, the user's input may vary from 0-100% with, for example 5% steps. Under those circumstances, the aiming beam's intensity setting may be determined according to the following equation:

$$\text{Aiming beam intensity setting} = \frac{\text{Aiming Beam Minimum} + \text{user input percent} \times (\text{Aiming beam Max} - \text{Aiming Beam Min})/\text{User range percent scalar}}$$

where the Aiming beam intensity setting is a numerical value representative of the aiming beam intensity and may be a value in the range of, for example, 0x000 to 0x3FF. The User input percent is a value in the range of 0 to 100%, and thus, in this case, the user range percent scalar is 100%

Thus, for example, if the aiming beam light output desired is 5 microwatts to 150 microwatts and it is determined, using, for example, an external energy meter, that for 5 microwatts a setting of 0x107 was required and for 150 microwatts a setting of 0x390 was required, then the aiming beam intensity may be computed as:

Aiming beam intensity setting=0x107+user input percent (0x390−0x107)/100%

Accordingly, with respect to this specific example, if the user's input was 0%, the aiming beam intensity setting would thus be equal to 0x107 (computed as 0x107+0(0x390−0x107)/100=0x107). If the user entered an input percent value of 50%, the computed aiming beam intensity setting would then be 0x248 (computed as 0x107+50(0x390−0x107)/100=0x248), and if the user entered an input percent of 100% the aiming beam intensity would be 0x390 (0x107+100(0x390−0x107)/100=0x390).

The type of diodes, the maximum and minimum output values used and the resulting equations representing the intensity setting relationships may vary depending on specific procedure performed by the laser system 100 (e.g., PD or SLT therapeutic procedures).

To implement the control hardware and/or software modules to control the aiming beam of the aiming diode, the output setting of a voltage control module, implemented, for example, using an FPGA, is adjusted (e.g., by increasing the control setting of the module) to cause variable voltage to be applied to the aiming diode. An external power meter may be used to measure the output radiation of the aiming diode. When the external meter indicates that the minimum power level of the desired range has been reached (e.g., 5 microwatts), the control module's setting that resulted in this output radiation is recorded (in the example used above, that controller setting was 0x107).

Next, the controller's settings are further adjusted until the external meter indicates that the maximum desired radiation level outputted by aiming diode has been reached (e.g., 150 microwatts). The controller's setting that resulted in this radiation level is also recorded. The respective range between the recorded setting corresponding to the minimum and maximum power levels is then divided by the number of steps desired by the user. In the example used above, the user can specify twenty (20) different settings within the range within which the aiming diode is to operate.

Verifying Calibration

To confirm the accuracy of the equation-based relationships determined for the various calibrated modules of the system 100, verification procedures may be performed. Verification of the calibration data (including the determined equations) may include verification of:

Primary energy monitor energy curves and equations (energy vs. counts);

PD secondary energy monitor curves and equations (energy vs. counts);

SLT secondary energy monitor curves and equations (energy vs. counts);

PD attenuator maximum attenuation offset;

SLT attenuator maximum attenuation offset;

PD attenuation curves and equations (steps vs. energy);

SLT attenuation curves (steps vs. energy); and

High voltage threshold curves and equations.

Figure 18:
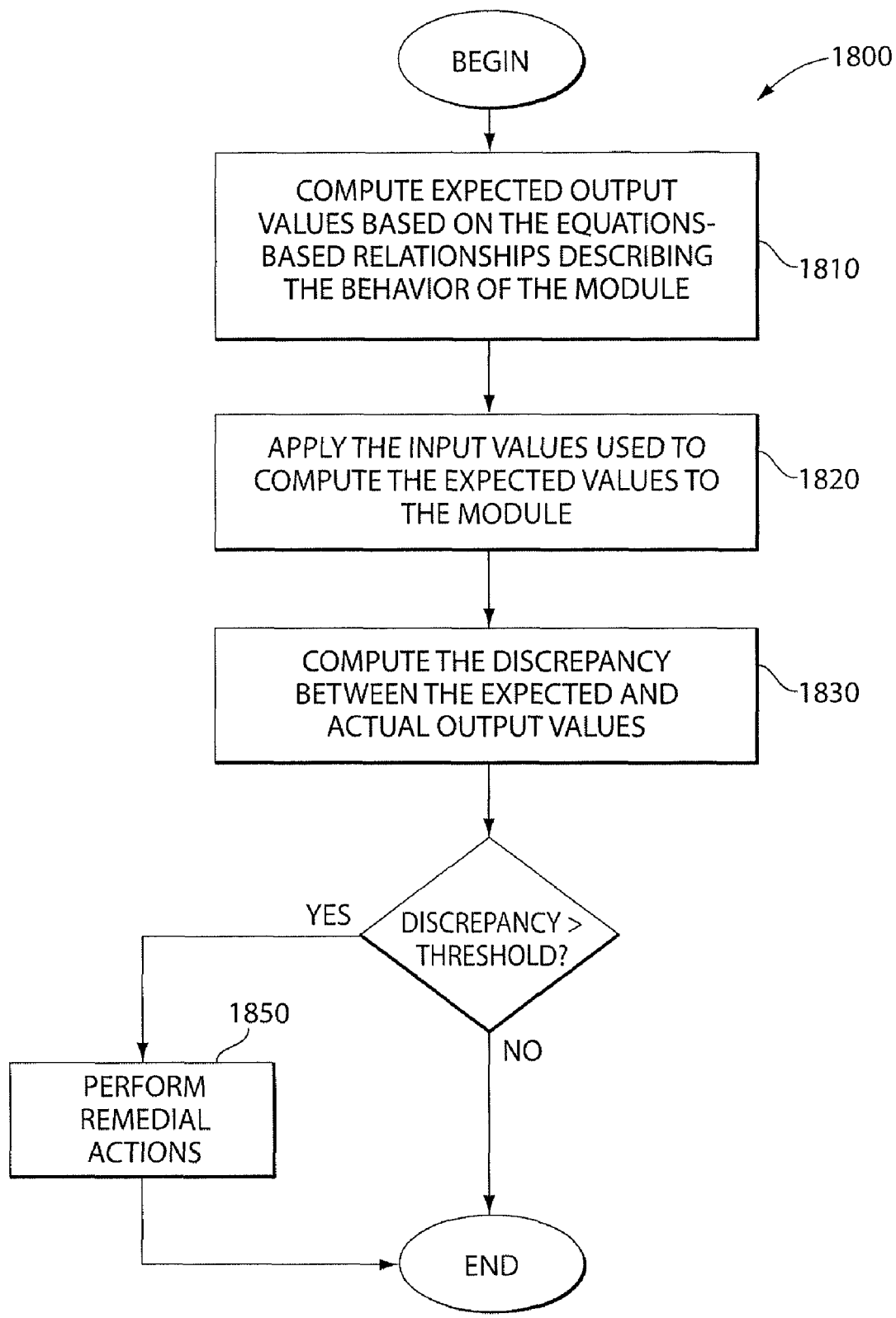
FIG. 18 is a flowchart of an exemplary verification procedure.

Referring to FIG. 18, a flowchart of an exemplary verification procedure 1800 is shown. Generally, for a particular subsystem (module) such as the attenuator or energy monitors, the predicted behavior is compared to the actual behavior of the particular module. The predicted behavior is determined based on the equations (determined by performing the pertinent calibration procedures, as described herein), and comparing it to the actual behavior. Thus, expected one or more output values for the module in question are computed 1810 based on the determined equation describing the output behavior of that module. The input predicted to yield the computed one or more expected output values are applied 1820 to the module, thus resulting in corresponding actual output values. Having obtained the actual output values, the discrepancy between the one or more expected output values and their respective actual one or more output values is determined 1830. Determination of the discrepancy between the expected and actual values may be performed, for example, by computing an error measure individually for each set of the expected and actual output values (e.g., discrepancy=(actual output−expected output)/expected output), and taking an average of all the computed error measures. Alternatively, the discrepancy can be determined by taking a weighted average of the individual error measures of the sets of expected and actual values, determining the maximum error from the sets of expected and actual output values, etc. Other techniques for determining the discrepancy between the expected and actual output values for the module in question may be used.

Based on the computed discrepancy, a determination is made as to whether remedial action is required. Such a determination may be performed, for example, by determining 1840 if the computed discrepancy exceeds some pre-determined threshold (e.g., if the discrepancy exceeds 1%). If the discrepancy does exceed the pre-determined threshold, remedial action is performed 1850. Such remedial action may include, in some embodiments, re-performing the calibration procedure for that module, making adjustments to the equation(s) determined from the data used to calibrate the module (e.g., performing further iterations in relation to the regression analysis performed on the data), making manual adjustments to parameters of the equation-based relationship determined from the data, etc. Additionally, the particular remedial action taken may also be based on the extent of the discrepancy. Thus, for example, if the discrepancy is relative modest (1-5% deviation between expected and actual output values), adjustment of the equation(s) used to describe the behavior of the module may be performed, whereas if the computed discrepancy is higher than that, a complete re-calibration procedure for that module may be performed.

Thus, for example, in some embodiments, to verify the accuracy of the equation-based relationship determined to describe the behavior of the primary energy monitor the laser device 100 is fired with the half-wave plate attenuator set to minimum attenuation level. The resultant energy level exiting the attenuator is measured, for example, with an external energy meter. The energy level indicated by ADC converter 610, computed based on the equation corresponding to energy vs. ADC counts curve (such curve having been derived by performing, for example, the procedure 900) is compared to the energy level recorded by the external meter. If there is a discrepancy between the energy level measured by the external meter and the level indicated by the energy monitor that exceeds some pre-determined threshold (e.g., more than 1% error), the calibration procedure 900 to calibrate the primary energy monitor may be performed again.

To verify the accuracy of equation-based relationships determined to describe the behavior of respective secondary monitor deployed in the system 100, in some embodiments, the laser is fired while stepping the attenuator so that the outputted energy level is increased from an initial minimum treatment energy to a higher treatment energy level. At each attenuation level, the energy level indicated by secondary energy monitors of the system 100 in response to the radiation level outputted by the attenuator (computed based on the respective equations corresponding to the energy vs. ADC counts curves obtained using, for example, the procedure 1200) is compared to energy levels measured by an external energy meter. If there is a discrepancy between the energy level measured by the external meter and the level indicated by a particular secondary energy monitor that exceeds some pre-determined threshold (e.g., more than 1% error), the calibration procedure 1200 to calibrate that secondary energy monitor may be performed again.

To verify the accuracy of equation-based relationships determined to describe the behavior of the attenuator 120, in some embodiments, an operator specifies an energy range to be tested by selecting a starting energy level and an energy step size. The laser device 110 is then fired for each energy level step in the range. At each energy level step, the measured energy level indicated by one or more of the secondary energy monitors used to measure the energy level outputted by the attenuator (computed, for example, based on the respective equations corresponding to the energy vs. ADC counts curves obtained using, for example, the procedure 1200) is compared to the expected energy level that was supposed to be outputted by the attenuator according to the attenuator step vs. attenuation curve equation determined using the procedure 1400. If there is a discrepancy between the expected energy level computed for the attenuator and any secondary energy monitor measuring the energy level of the attenuator that exceeds some pre-determined threshold (e.g., more than 1% error), the calibration procedures to calibrate that secondary energy monitor and/or the attenuator may be performed again. In some embodiments, the actual energy level, measured by an external calibrated energy meter may be recorded and/or compared to the values computed through the attenuator and secondary energy monitor equations. If there is a discrepancy between the actual energy level and either the secondary energy monitor or the attenuator (or both), calibration procedure to recalibrate the module with respect to which a discrepancy exists may be re-performed.

Additionally, recalibration and/or calibration procedures may also be performed if the system's components, including the system's optical, electrical or mechanical components, and also the system's measuring equipment are adjusted or replaced.

In some embodiments, during performance of the calibration procedure, at least some of the calibration data obtained (e.g., ADC count values, energy levels measured by an external energy meter, etc.) and determined calibration curve equations may be displayed on a remote display device to enable a user to monitor the calibration procedures. The data and equations may be communicated to such a remote display device using, for example, through a communications interface such as an RS-232 serial interface on the calibration module 140, or through any other type of a communication interface and/or protocol. The communication interface can be used to transmit the data to a computing device that operates remotely from the laser system 100. The transmitted data and/or other information (determined equations) can subsequently be used to verify the calibration results independently of the calibration software.

Post Calibration Operation

Figure 19A:
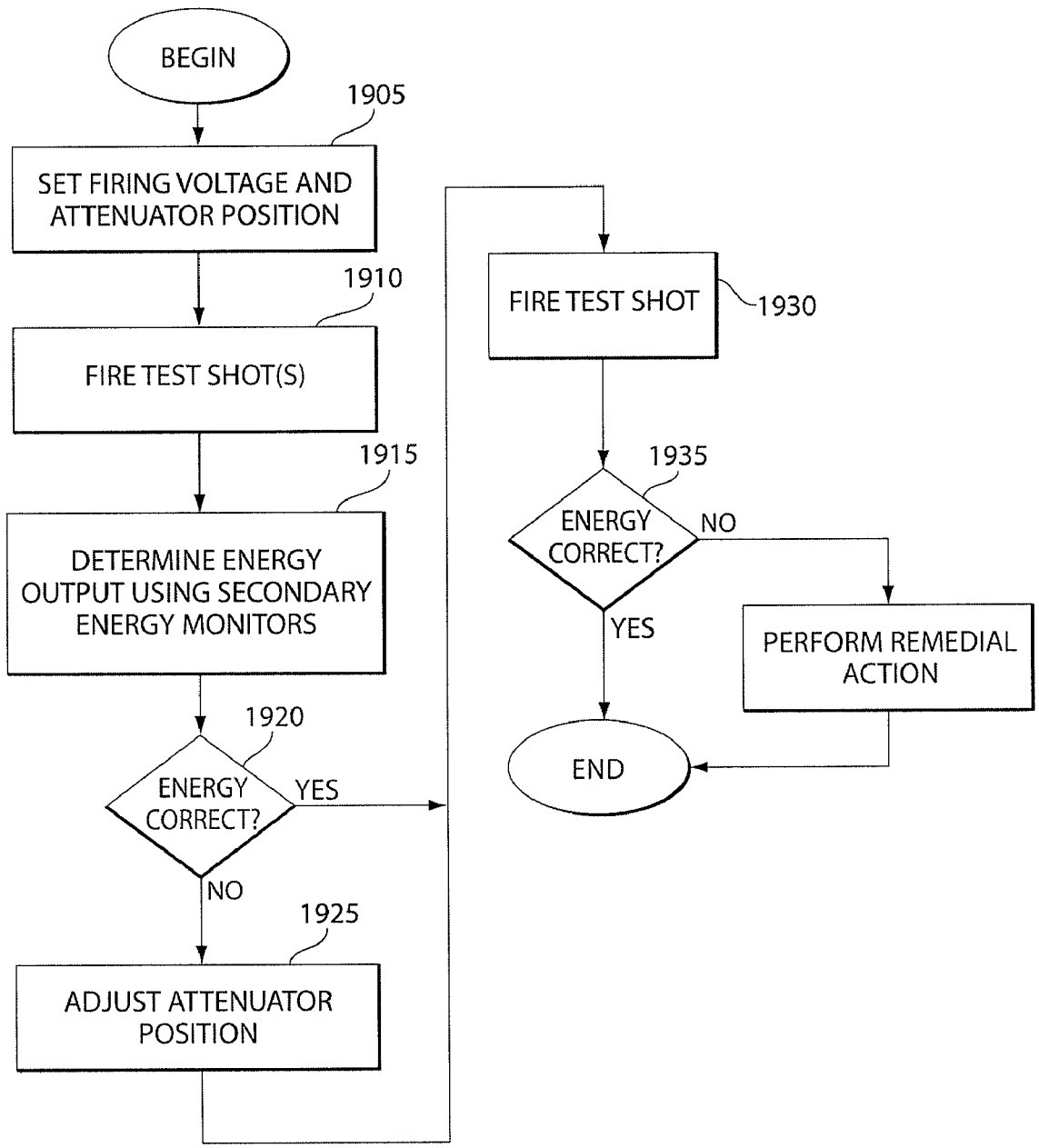
FIG. 19A is a flowchart of an exemplary procedure for calibration testing operations of a laser system.

Once the calibration of the laser system 100 and/or verification of the calibration, have been completed, regular operation of the laser system 100 may commence. Referring to FIG. 19A, a flowchart of an exemplary procedure 1901 for calibration testing operations of a laser system (such as laser system 100) is shown. Initially, test shots of the laser are generally fired to verify correct positioning of the attenuator and to allow for adjustments of the attenuator position to compensate for temperature effects and the resulting output energy. When the user places the system in Ready mode, test shots will be fired with the shutter closed (i.e., when the laser system's safety shutter is closed so that radiation is not delivered externally to the system).

The energy level required by the user is used to determine 1905 the attenuator step position using the equation corresponding to the attenuator step vs. required energy (for one of the curves obtained for PD and SLT procedures) that was determined, for example, by performing procedure 1400 and 1600 and the requested number of pulses is used to determine the firing voltage.

Having set the attenuator's rotational position to the position determined at 1905, and the firing voltage level, the laser device is test fired 1910 (with the shutter closed) one or more times.

The attenuated energy level is determined 1915 using one or more of the secondary energy monitors used with the system 100 by, for example, computing the attenuated energy level outputted by the attenuator using, for example, the respective equations corresponding to the energy vs. ADC counts curves obtained for each of the one or more secondary energy monitors used to measure the energy level of the attenuated radiation. This computed energy level is used to determine 1920 if any error occurred on the second test shot and verify that the attenuator is positioned correctly. If it is determined that an error has occurred (e.g., there is a discrepancy that exceed 1% between the energy level indicated by any one the energy monitors and the expected attenuated energy value) the rotational position of the attenuator may be adjusted 1925 (e.g., adjusting the setting by one or more positional step.

After the attenuator adjustment or in the case where an adjustment of the attenuator was not required, a final test shot is performed 1930 to verify the correct position of the attenuator and the energy output which is measured by the energy monitors and compared to the expected or requested energy. If the energy is still not correct (as determined at 1935), remedial action is performed 1940. Otherwise the laser can be used to perform the therapeutic treatment shot.

Figure 19B:
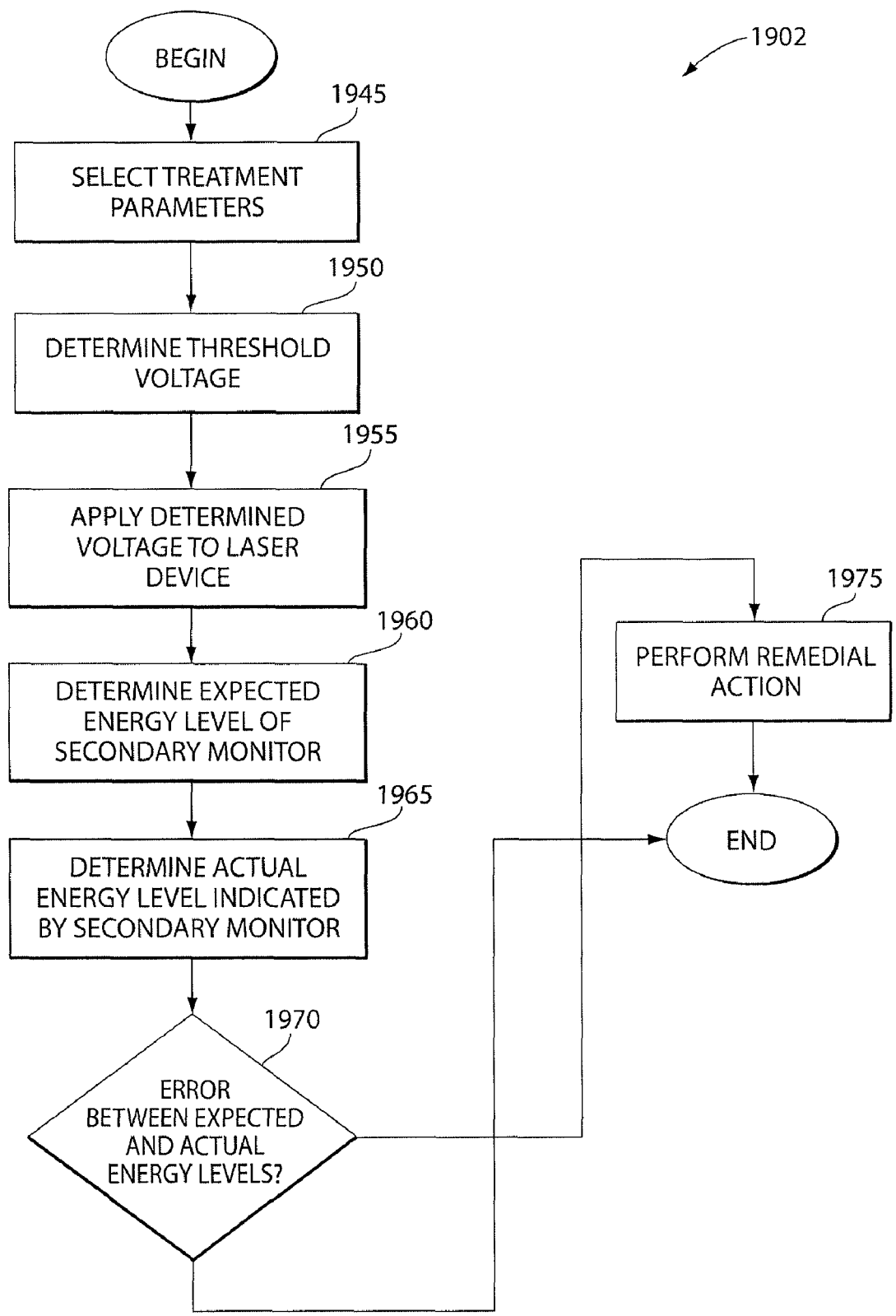
FIG. 19B is a flowchart of an exemplary procedure for performing therapeutic operations once the procedure of FIG. 19A has been completed.

Once the proper position of the attenuator has been determined, the laser system can be used to perform therapeutic treatment procedures. Referring to FIG. 19B, a flowchart of an exemplary procedure 1902 for performing therapeutic operations using the system 100 once the procedure 1902 has been completed is shown. Thus, an operator (technician, physician, etc.) selects 1945 the desired treatment parameter including the desired therapeutic treatment procedure (a PD treatment or an SLT treatment), the desired number of pulses to be emitted upon application of power to the laser device 110. The selection of those parameters may be done through a suitable user-interface for controlling the laser system 100.

The configuration of the laser, which controls the operating mode upon the application of power to the system, and allowable configurations, in some embodiments, is configured by setting laser configuration switches which enable mode selection (e.g., Normal mode, Service mode, Calibration mode, Diagnostics mode, etc.) and function (e.g., SLT, PD, or PD and SLT) of the laser system 100. These switch configurations may be checked by system software during start-up to determine whether the switches are set in valid configuration. In some embodiments, if the mode switches are set to a mode other than Normal mode, powering-up of the system 100 is halted until the operator has switched the selected mode switch to the off position. This prevents an operator from powering up the system in anything but normal mode and also prevents a technician or service personnel from accidentally leaving the system in anything but normal mode.

Prior to firing the laser device, the temperature of the laser device is determined (for example, using a temperature sensor in thermal communication with the laser device 110) to compute 1950 the firing voltage required to achieve the required number of pulses (e.g., one, two or three pulses). Computation of the firing voltage that would result in one or more pulses is based on the equations corresponding to the threshold voltages vs. temperature curves determined using, for example, the procedure 400 and/or the firing voltage equations that are based on the threshold voltages (see, for example, Equations (7)-(9)). The expected ADC values are used to program limit comparators (e.g., of an FPGA). That is, values corresponding to, for example, +100%, −70% of the expected energy values may be programmed into an FPGA. These programmed values are subsequently used, during the firing sequence, to determine if there was a critical error of +100% or −70%.

In some embodiments, during normal operation the value to set the high voltage power supply to achieve the desired number of pulses may be determined by calculating a new curve based on the calibration threshold curves. The new linear curves (firing voltages vs. temperature), are set between the thresholds for single, double and triple pulse and by an offset above triple pulse threshold. Use of such computed linear curves may thus enable delivering the desired number of pulses consistently. If the firing voltage is set too low (i.e., too close to the threshold), the number of pulses emitted may be lower than required number of pulses and thus the laser system 100 may not deliver enough pulses. On the other hand, if the voltage to be applied it is set too high, the system may deliver too many pulses. The system software may also set the number of expected pulses as well as the energy limits which allow the FPGA to snub (or discharge) any energy remaining on the High Voltage power supply after the expected number of pulses has been detected during the firing sequence.

The appropriate voltage level is then applied 1955 to the laser device to cause the desired number of laser pulses to be emitted. Using the expected energy level set by the user 1960 and for each shot fired, the output energy is measured by the secondary energy monitors used (i.e., the PD monitors if PD treatment is being applied, or the SLT monitors if an SLT treatment procedure is applied) and is computed 1965 based on the equations corresponding to the ADC counts vs. energy curves for the secondary energy monitors used.

The secondary energy monitors determine 1965 the energy level of the actual attenuated radiation exiting the attenuator 120. This determination is based on computing the energy level based on the equations corresponding to the energy vs. ADC count curves of the respective energy monitors. The requested energy value(s) is compared 1970 to the actual energy level values outputted by the monitors and using the ADC counts vs. energy curves for the corresponding energy monitors. If there is an error between the requested and outputted energy level values, remedial action may be taken 1975. That remedial action may include adjusting the rotation position of the attenuator, re-calibrating one or more of the modules of the system 100, etc.

Thereafter, each time the operator fires a treatment shot, the energy from the current or previous shot may be used to predict the energy levels expected to be outputted by the secondary energy monitors, and thus enable determination of operational errors.

In some embodiments, when the energy measured varies from the expected output by certain amount, these conditions are reported to the operator and may result in a shutdown of the system for critical safety issues, or warnings or cautions such as visual or visual and audible indications. For example, under some circumstances, the following variation between the measured energy level and the expected energy levels may result in the following types of alerts:

| Energy Variation from Expected Energy | status |
|---|---|
| + or −20% | visual alert |
| + or −50% | visual & audible alert |
| +100%, −70% | visual & audible alert & disable system |
| If both secondary energy monitors mismatch | visual & audible alert & disable system. |

Figure 20:
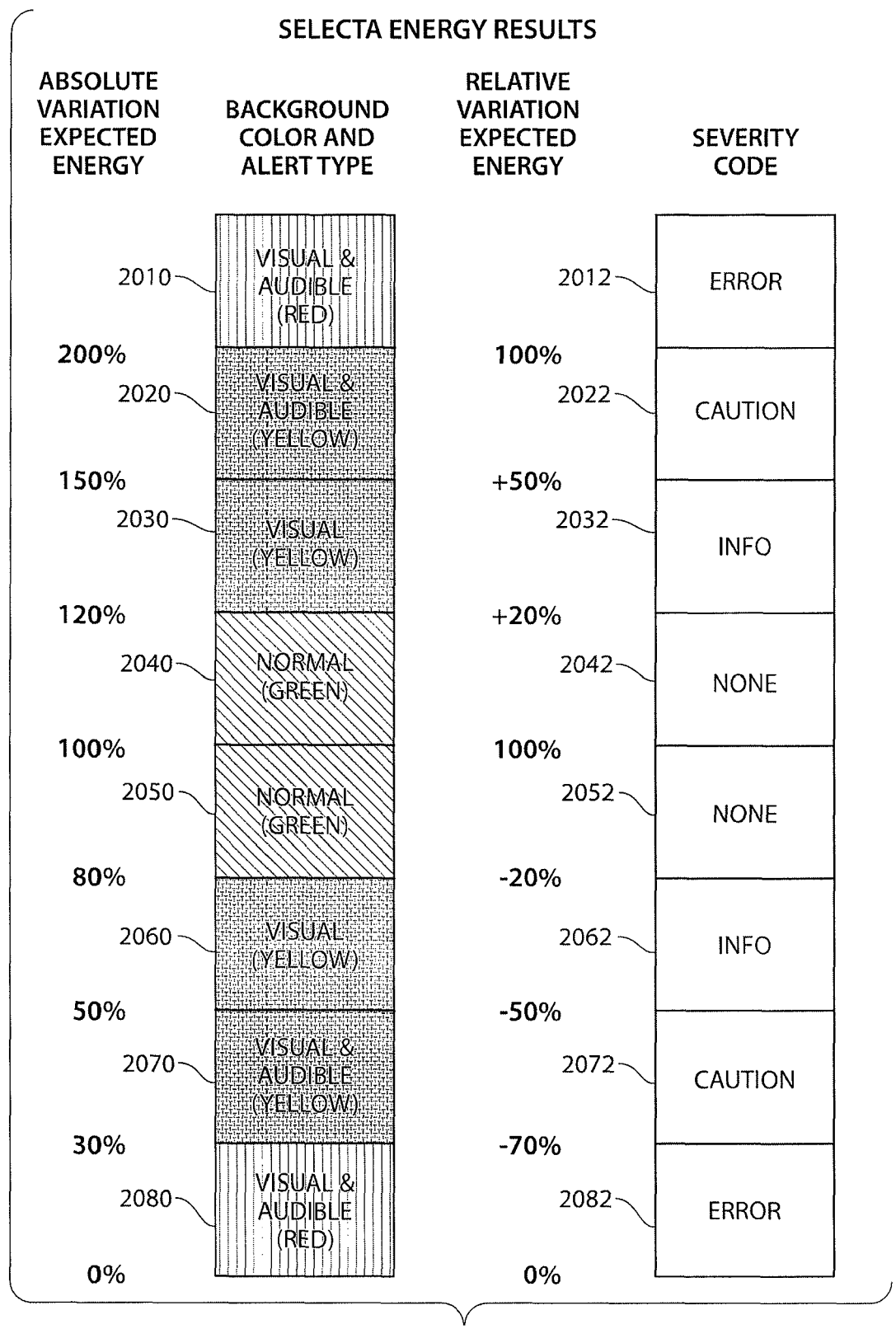
FIG. 20 is a chart of exemplary alert indicators.

Referring to FIG. 20, a chart 2000 of exemplary alert indicators is shown. The chart 2000 depicts the alert types that may be generated for respective ranges of variation between expected and measured energy level results. For example, in circumstance in which the measured energy is 200% of the expected energy (i.e., the variation exceeds 100%), a red alert indicator 2010 may be invoked, indicating an error. The alert may be provided visually and audibly (e.g., high pitched alarm) and correspond to an Error state 2012 that may result in the performance of certain remedial actions (e.g., system shut down). A similar red alert indicator 2080 may be invoked in circumstances in which the measured energy is 30% of the expected energy (corresponding to a relative variation of −70%). Here too, this alert may be provided visually and audibly and may correspond to an Error state 2082.

In circumstances in which a less extreme variation between expected and measured energy occur, a yellow alert indicator may be invoked. This alert level may correspond to situations in which the measured energy is 150-200% of the expected energy (alert indicator 2020, which may be used in conjunction with visual and audible alarms), situations in which the measured energy is between 120-150% of the expected energy (alert indicator 2030 which may be used in conjunction with a visual alarm), situations in which the measured energy is 30-50% of the expected energy (alert indicator 2070, which may be used in conjunction with visual and audible alarms) and situations in which the measured energy is 50-80% of the expected energy (alert indicator 2060, which may be used in conjunction with a visual alarm). Yellow alerts 2020 and 2070 may correspond to Caution states 2022 and 2062, respectively, that could cause the performance of particular actions (e.g., remedial operations). Yellow alerts 2030 and 2060 may correspond to Info states 2032 and 2062, respectively, which may cause the performance of other types of remedial actions (e.g., providing information to the operator along with suggested courses of action that may be taken by the operator). Circumstances in which the measured energy is 80-120% of the expected energy may be deemed to be within the normal range of variation, and can be indicated by a green alert indicator such as indicators 2040 and 2050. These green alerts may not require that any action be taken and thus correspond to the None states 2042 and 2052.

Figures 1, 21:
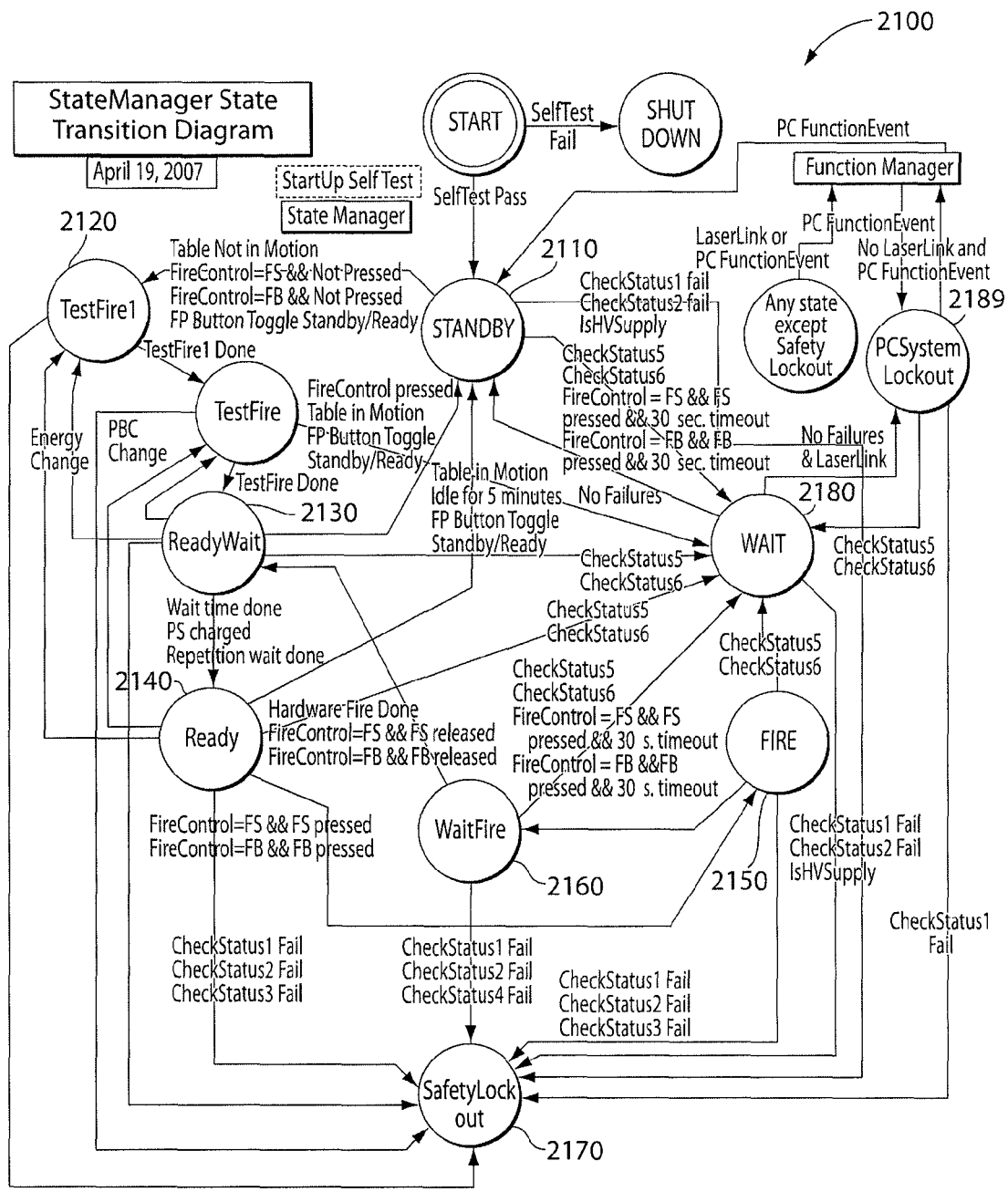
FIG. 21 is a state transition diagram of an exemplary embodiment of internal software states and the transitions between them during operation of the system of FIG. 1.
Figures 2, 21:
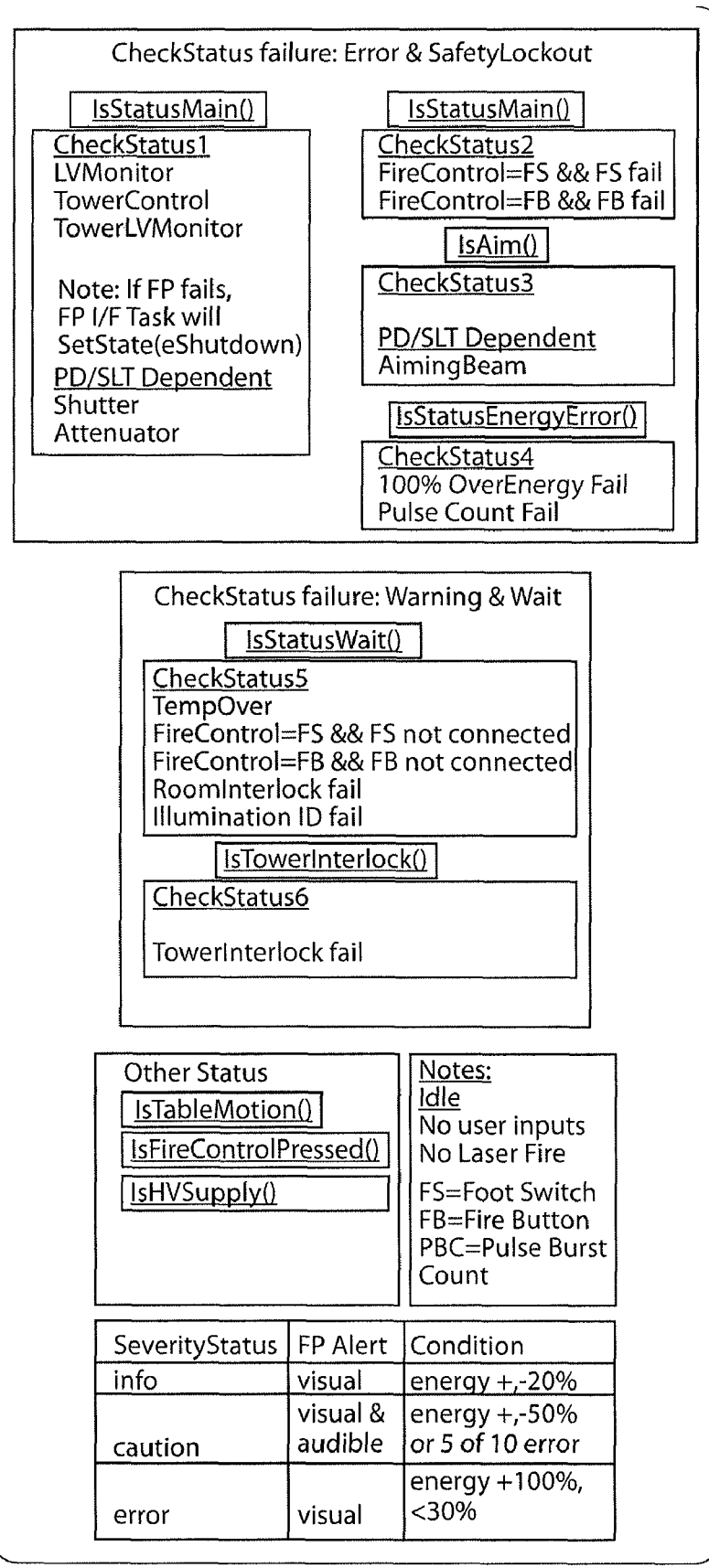

Referring to FIG. 21, a state transition diagram 2100 of an exemplary embodiment of internal software states and the transitions between them that are used during normal operation of the system 100 is shown. In some embodiments, overall operation of the system may be performed using a processor-based device on which a system control software application is executing.

After starting and passing the startup tests the system will enter a Standby state 2110. When the user presses a toggle standby to ready button, the state will enter a Testfire states (e.g., 2120) where test fires and evaluation of energy output is performed. Next, at the Readywait state 2130 the high voltage power supply is charged and the timing controls of the overall rate of fire between shots is set. The system may then enter a Ready state 2140 where the system is ready for firing by the user. When the user presses a fire control (e.g., fire button or foot switch) the laser device fires a treatment shot with the shutter open to deliver energy to the patient's eye (see the Fire state 2150). The system may subsequently enter a Waitfire state 2160 where it waits for the FPGA to indicate that firing is complete and ADC counts (representing the actual energy delivered) are available. Energy values are determined, for example, from the ADC vs. energy curves and the delivered energy is reported to the user on the display. The system then returns to the Readywait state 2130 to begin charging the high voltage supply for the next treatment shot.

During any of these states, critical system parameters, such as voltage levels and shutter status, are checked. If any critical system fails, the system may enter the SafetyLock state 2170 in which the laser and any operations thereof are disable while power is being turned off. On the other hand, if it is determined that any non-critical systems (modules) are reporting failure, the system 100 will enter a Wait state 2180, to enable either the system or the user to potentially correct the problem and return to the Standby state 2110. For example, if the laser gets too hot or if a room interlock is indicated, these conditions may be remedied without having to perform a complete system shutdown. In some embodiments, the system 100 may enter a PCSystem Lockout state 2185. This state is associated with use of a laserlink device (a slit lamp adapter to deliver laser light in a determined range of spot size to the focal plane of the family of Lumenis Selecta Slit lamp microscopes and is intended for use with Lumenis visible wavelength, e.g., 532 nm, Photocoagulators) that is attached to the laser system, or if a user selects laserlink function on a remote interface. If the system enters the PCSystem Lockout state 2185, the system 100 may not be operated until the laserlink is removed and the user selects to return to either PD or SLT function.

A number of embodiments of the invention have been described. Nevertheless, it will be understood that various modifications may be made without departing from the spirit and scope of the invention. Accordingly, other embodiments are within the scope of the following claims.

What is claimed is:

1. A method implemented using one or more processor-based devices to determine behavior characteristics of one or more modules of a laser system, the method comprising:
    applying inputs to the one or more modules of the laser system using the one or more processor-based devices;
    measuring, using the one or more processor based devices, outputs generated by the one or more modules of the laser system resulting from the application of the respective inputs applied to the one or more modules of the laser system; and
    calibrating the one or more modules of the laser system, including determining, using the one or more processor-based devices, one or more equation-based mathematical relationships describing operational behavior of the one or more modules of the laser system by relating the inputs to the resultant outputs generated by the one or more modules of the laser system;
    wherein determining the one or more equation-based mathematical relationships describing the operational behavior of the one or modules of the laser system includes
        determining a first equation-based mathematical relationship that comprises a threshold voltage equation-based mathematical relationship relating threshold voltage levels required to cause a laser device to emit laser pulses and respective firing voltage levels,
        determining a second equation-based mathematical relationship that comprises a gain step equation-based mathematical relationship relating gain step value applied to a sensor signal generated by a sensor in response to one or more laser shots, the gain step equation-based mathematical relationship relates to a relationship between step-settings of an adjustment control mechanism and a resultant gain realized by a corresponding amplification stage, and
        determining a third equation-based mathematical relationship that comprises a half-wave plate attenuation equation-based mathematical relationship relating attenuation levels at multiple radial portions of a half-wave plate.

2. The method of claim 1 wherein determining the mathematical relationship comprises applying a regression technique to the inputs and to the measured outputs resulting from the application of the inputs.

3. The method of claim 2 wherein applying the regression technique comprises applying a least-squares technique to the inputs and to the measured outputs to determine the equation-based mathematical relationship.

4. The method of claim 2 wherein applying the regression technique comprises applying a singular value decomposition (SVD) technique.

5. The method of claim 1 wherein applying inputs to the one or more modules of the laser system comprises applying incremental voltage step levels to the laser device of the laser system to determine the threshold voltage levels required to cause the laser device to emit the laser pulses and the respective firing voltage levels, the firing voltage levels having values that are higher than the values of the respective threshold voltage levels.

6. The method of claim 5 wherein determining the threshold voltage levels and firing voltages required to cause the laser device to emit laser pulses comprises determining the firing voltage levels required to cause the laser device to emit one or more of: a single pulse, a double pulse and a triple pulse.

7. The method of claim 5 wherein determining the threshold voltage levels and firing voltage levels required to cause the laser device to emit laser pulses comprises determining the firing voltage levels required to cause the laser device to emit laser pulses as a function of temperature of the laser system.

8. The method of claim 7 wherein applying inputs to the one or more modules comprises:
    causing the laser device to be fired to increase the temperature of the laser device.

9. The method of claim 7 wherein measuring the outputs resulting from the application of the inputs comprises measuring the temperature of the laser device corresponding to the voltage level required to cause the laser device to emit one or more of: a single pulse, a double pulse and a triple pulse.

10. The method of claim 1 wherein applying inputs comprises causing the laser device of the laser system to emit one or more laser shots to determine the gain step value applied to the sensor signal generated by the sensor in response to the one or more laser shots.

11. The method of claim 10 wherein determining the gain step value is based on one of: an attenuated signal of the one or more laser shots and an unattenuated signal of the one or more laser shots.

12. The method of claim 10 wherein the sensor is a photodiode configured to generate electrical current in response to laser radiation incident on the photodiode.

13. The method of claim 10 wherein determining the gain step value comprises:

repeatedly incrementing the gain step from an initial value; and for every incremented gain step value, recording a resultant value generated by a monitor in response to a monitor input signal generated using the sensor signal and the current gain step value.

14. The method of claim 13 further comprising:
computing a linear gain curve based on the recorded values generated by the monitor.

15. The method of claim 14 further comprising:
selecting the linear gain setting for the monitor from the gain curve which allows sufficient resolution for accurate energy measurements and sufficient range for determining when energy outputs exceed or are below expected outputs.

16. The method of claim 1 wherein applying inputs comprises causing the laser device of the laser system to emit one or more laser shots, and wherein determining the equations-based mathematical relationship comprises determining a maximum attenuation position of a half-wave plate relative to an output port of the laser device such that radiation output from the half-wave plate is minimized.

17. The method of claim 1 wherein applying inputs comprises causing the laser device of the laser system to emit one or more laser pulses to determine the attenuation levels at multiple radial portions of the half-wave plate.

18. The method of claim 17 wherein determining the attenuation levels at multiple positions of the half-wave plate comprises:
rotating the half-wave plate to a plurality of radial positions that are each at different orientations with respect to an output port of the laser device; and
at each of the plurality of radial positions causing a series of laser radiation shots to be emitted at the half-wave plate.

19. The method of claim 18 further comprising:
at each of the plurality of positions:
measuring a level of laser radiation exiting the half-wave plate; and
computing an associated attenuation value based on the measured level of laser radiation exiting the half-wave plate and the level of the series of laser radiation shots emitted at the output port of the laser device.

20. The method of claim 19 further comprising:
computing from the respective associated computed attenuation values at least one of a cubic, quadratic, and nth order polynomial equation, each of the at least one computed equation representing the relationship between attenuation level and the radial position of the half-wave plate.

21. The method of claim 20 further comprising:
selecting from the at least one computed equation the equation representing the relationship between the attenuation level of the half-wave plate and the radial position of the half-wave plate that best matches actual expected output.

22. A laser system comprising:
one or more laser system modules;
an adjustment control mechanism;
an amplification stage corresponding to the adjustment control mechanism; and
a calibration module to calibrate one or more modules of the laser system, the calibration module comprising:
a processor-based device; and
a storage device comprising computer instructions that when executed on the processor-based device cause the processor-based device to:

record measured outputs generated by the one or more modules of the laser system resulting from inputs applied to the one or more modules of the laser system; and calibrate the one or more modules of the laser system, including determine one or more equation-based mathematical relationships describing operational behavior of the one or more modules of the laser system by relating the inputs to the resultant outputs generated by the one or more modules of the laser system;

wherein the computer instructions to cause the processor-based device to determine the one or more equation-based mathematical relationships describing the operational behavior of the one or modules of the laser system include computer instructions to cause the processor-based device to:

determine a first equation-based mathematical relationship that comprises a threshold voltage equation-based mathematical relationship relating threshold voltage levels required to cause a laser device to emit laser pulses and respective firing voltage levels, determine a second equation-based mathematical relationship that comprises a gain step equation-based mathematical relationship relating gain step value applied to a sensor signal generated by a sensor in response to one or more laser shots, the gain step equation-based mathematical relationship relates to a relationship between step-settings of the adjustment control mechanism and a resultant gain realized by the corresponding amplification stage, and determine a third equation-based mathematical relationship that comprises a half-wave plate attenuation equation-based mathematical relationship relating attenuation levels at multiple radial portions of a half-wave plate.

23. The system of claim 22 wherein the computer instructions that cause the processor-based device to determine the equation-based mathematical relationship comprise computer instructions that cause the processor-based device to apply a regression technique to the inputs and to the recorded measured outputs resulting from the application of the inputs.

24. The system of claim 23 wherein the computer instructions that cause the process-based device to apply a regression technique comprise computer instructions that cause the processor-based device to apply a least-squares technique to the inputs and to the recorded measured outputs to determine the equation-based mathematical relationship.

25. The system of claim 22 wherein the computer instructions that cause the processor-based device to record measured outputs resulting from the inputs applied to the one or more modules of the laser system comprise computer instruction that cause the processor-based device to record measured outputs in response to incremental voltage step levels applied to the laser device of the laser system to determine the threshold voltage levels required to cause the laser device to emit the laser pulses and the respective firing voltages having values that are higher than the values of the respective threshold voltage levels.

26. The system of claim 22 wherein the computer instructions that cause the processor-based device to determine the gain step value applied to the sensor signal generated by the sensor comprise computer instructions that cause the processor-based device to determine the gain step value applied to the sensor signal in response to one or more emitted laser shots.

27. The system of claim 22 wherein the computer instructions that cause the processor-based device to determine the attenuation levels at the multiple radial portions of the half-wave plate comprise computer instructions that cause the processor-based device to determine the attenuation levels at the multiple radial portions of the half-wave plate in response to one or more emitted laser shots.

28. A computer program product to calibrate one or more modules of a laser system comprising computer instructions stored on a non-transitory computer readable medium, the computer instructions, when executed, cause a processor-based device to:
   record measured outputs generated by the one or more modules of the laser system resulting from inputs applied to the one or more modules of the laser system; and
   calibrate the one or more modules of the laser system, including determine one or more equation-based mathematical relationships describing operational behavior of the one or more modules of the laser system by relating the inputs to the resultant outputs generated by the one or more modules of the laser system;
   wherein the computer instructions to cause the processor-based device to determine the one or more equation-based mathematical relationships describing the operational behavior of the one or modules of the laser system include computer instructions to cause the processor-based device to:
   determine a first equation-based mathematical relationship that comprises a threshold voltage equation-based mathematical relationship relating threshold voltage levels required to cause a laser device to emit laser pulses and respective firing voltage levels,
   determine a second equation-based mathematical relationship that comprises a gain step equation-based mathematical relationship relating gain step value applied to a sensor signal generated by a sensor in response to one or more laser shots, the gain step equation-based mathematical relationship relates to a relationship between step-settings of an adjustment control mechanism and a resultant gain realized by a corresponding amplification stage, and
   determine a third equation-based mathematical relationship that comprises a half-wave plate attenuation equation-based mathematical relationship relating attenuation levels at multiple radial portions of a half-wave plate.

29. The computer program product of claim 28 wherein the computer instructions that cause the processor-based device to determine the equation-based mathematical relationship comprise computer instructions that cause the processor-based device to apply a regression technique to the inputs and to the recorded measured outputs resulting from the application of the inputs.

30. The computer program product of claim 29 wherein the computer instructions that cause the processor-based device to apply a regression technique comprise computer instructions that cause the processor-based device to apply a least-squares technique to the inputs and to the recorded measured outputs to determine the equation-based mathematical relationship.

31. The computer program product of claim 28 wherein the computer instructions that cause the processor-based device to record measured outputs resulting from the inputs applied to the one or more modules of the laser system comprise computer instructions that cause the processor-based device to record measured outputs in response to incremental voltage step levels applied to the laser device of the laser system to determine the threshold voltage levels required to cause the laser device to emit the laser pulses and the respective firing voltages having values that are higher than the values of the respective threshold voltage levels.

32. The computer program product of claim 28 wherein the computer instructions that cause the processor-based device to determine the gain step value applied to a sensor signal generated by the sensor comprise computer instructions that cause the processor-based device to determine the gain step value applied to a sensor signal generated by the sensor in response to one or more emitted laser shots.

33. The computer program product of claim 28 wherein the computer instructions that cause the processor-based device to determine the attenuation levels at the multiple radial portions of the half-wave plate comprise computer instructions that cause the processor-based device to determine the attenuation levels at the multiple radial portions of the half-wave plate in response to one or more emitted laser shots.

* * * * *